(12) United States Patent
Mai et al.

(10) Patent No.: US 11,697,125 B2
(45) Date of Patent: Jul. 11, 2023

(54) SCANNING OPPOSED MIGRATION AEROSOL CLASSIFIER

(71) Applicant: California Institute of Technology, Pasadena, CA (US)

(72) Inventors: Huajun Mai, Pasadena, CA (US);
Richard C. Flagan, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 900 days.

(21) Appl. No.: 16/555,049

(22) Filed: Aug. 29, 2019

(65) Prior Publication Data

US 2020/0070076 A1 Mar. 5, 2020

Related U.S. Application Data

(60) Provisional application No. 62/726,012, filed on Aug. 31, 2018.

(51) Int. Cl.
*B03C 3/014* (2006.01)
*B01D 21/00* (2006.01)
*B03C 3/017* (2006.01)
*G01N 15/02* (2006.01)
*G01N 15/00* (2006.01)

(52) U.S. Cl.
CPC .............. *B03C 3/014* (2013.01); *B01D 21/00* (2013.01); *B03C 3/017* (2013.01); *G01N 15/02* (2013.01);
(Continued)

(58) Field of Classification Search
CPC ......... B03C 3/014; B03C 3/017; B01D 21/00; G01N 15/02; G01N 15/0266; G01N 2015/0046
(Continued)

(56) References Cited

U.S. PATENT DOCUMENTS 5,596,136 A * 1/1997 Flagan ............... G01N 15/0266
324/452
5,922,976 A * 7/1999 Russell ................. G01N 15/02
73/865.5
(Continued)

FOREIGN PATENT DOCUMENTS

DE 102014016413 A1 * 5/2016 ......... G01N 15/1031
WO WO-2015020611 A * 2/2015 ............. G01N 15/06

OTHER PUBLICATIONS

Cleveland, W., "Robust Locally Weighted Regression and Smoothing Scatterplots", Journal of the American Statistical Association, Dec. 1979, pp. 829-836, vol. 74, No. 368.
(Continued)

*Primary Examiner* — Gene O Crawford
*Assistant Examiner* — Muhammad Awais
(74) *Attorney, Agent, or Firm* — Gates & Cooper LLP

(57) ABSTRACT

An opposed migration classifier classifies particles suspended in a sample fluid that are passed through a classification channel defined by two permeable walls. Sample flow distribution input and output channels are located asymmetrically with respect to a center of the classification channel such that trajectories of the one or more particles in the sample fluid deviate from constant voltage operation trajectories. A cross-flow fluid enters the classification channel through a permeable wall and exits through the other permeable wall. An imposed field, created by a time varying filed imposed in a direction normal to the permeable walls, causes the particles to migrate in a direction opposite to that of the cross-flow fluid, such that the particles travel between the permeable walls. The particles in the sample are classified based on their mobility. The sample fluid enters and exists through or within a threshold distance of the permeable walls.

17 Claims, 30 Drawing Sheets

(52) U.S. Cl.
CPC . *G01N 15/0266* (2013.01); *G01N 2015/0046* (2013.01)

(58) Field of Classification Search
USPC ............................................... 209/143
See application file for complete search history.

(56) References Cited

U.S. PATENT DOCUMENTS

| | | | | |
|---|---|---|---|---|
| 6,003,389 | A * | 12/1999 | Flagan | G01N 15/0266 73/865.5 |
| 6,905,029 | B2 * | 6/2005 | Flagan | B03C 1/035 95/71 |
| 9,095,793 | B2 * | 8/2015 | Flagan | B01D 21/00 |
| 9,138,663 | B2 * | 9/2015 | Flagan | G01N 15/0266 |
| 9,177,774 | B2 * | 11/2015 | Brunelli | G01N 27/624 |
| 9,534,998 | B2 * | 1/2017 | Tsunoda | G01N 15/0266 |

OTHER PUBLICATIONS

Flagan, R.C., "On Differential Mobility Analyzer Resolution", Aerosol Science & Technology, 1999, pp. 556-570, vol. 30, No. 6.

Flagan, R.C., "Opposed Migration Aerosol Classifier (OMAC)", Aerosol Science and Technology, 2004, pp. 890-899, vol. 38.

Iida, K., et al., "Effect of Working Fluid on Sub-2 nm Particle Detection with a Laminar Flow Ultrafine Condensation Particle Counter", Aerosol Science and Technology. 2009, pp. 81-96, vol. 43, No. 1.

Mui, W., et al., "Design, simulation, and characterization of a radial opposed migration ion and aerosol classifier (ROMIAC)", Aerosol Science and Technology, 2017, pp. 801-823, vol. 51, No. 7.

Wang, S.C., et al., "Scanning Electrical Mobility Spectrometer", Aerosol Science and Technology, 1990, pp. 230-240, vol. 13, No. 2.

Merritt, M., et al., "An interior-point gradient method for large-scale totally nonnegative least squares problems", Journal of Optimization Theory and Applications, 2005, pp. 191-202, vol. 126, No. 1.

Mai, H., "Scanning DMA data analysis II. Integrated DMA-CPC instrument response and data inversion", Aerosol Science and Technology, 2018, pp. 1400-1414, vol. 52, No. 12.

Mui, W., et al., "Ion Mobility-Mass Spectrometry with a Radial Opposed Migration Ion and Aerosol Classifier (ROMIAC)", Analytical Chemistry, 2013, pp. 6319-6326, vol. 85.

Mai, H., et al., "Scanning DMA Data Analysis I. Classification Transfer Function", Aerosol Science and Technology, 2018, pp. 1382-1399, vol. 52, No. 12.

* cited by examiner

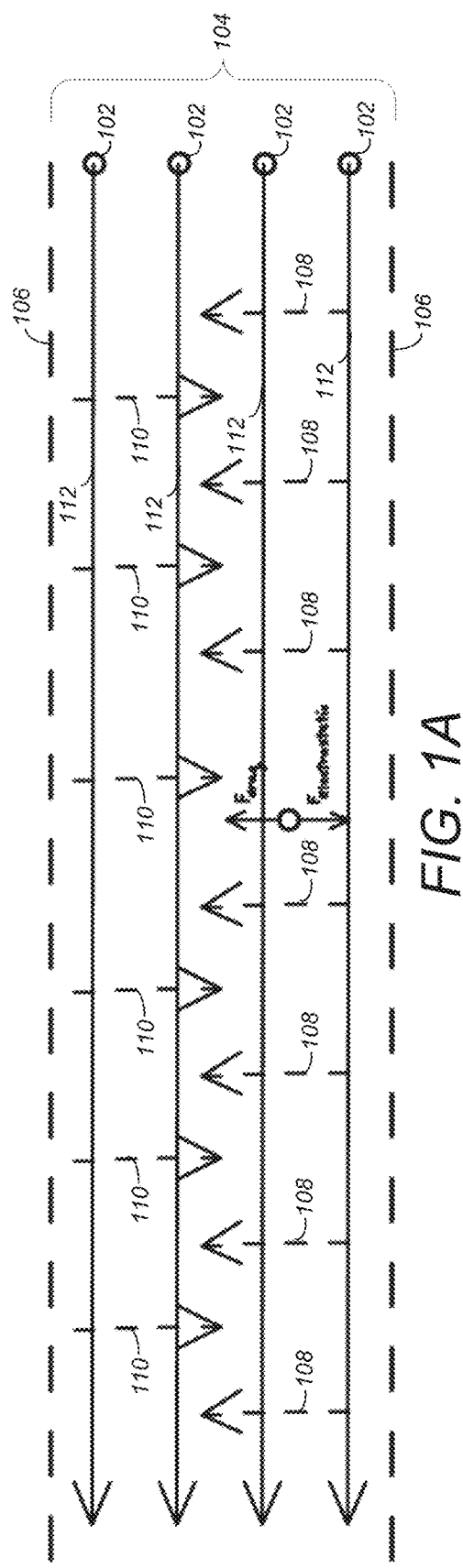
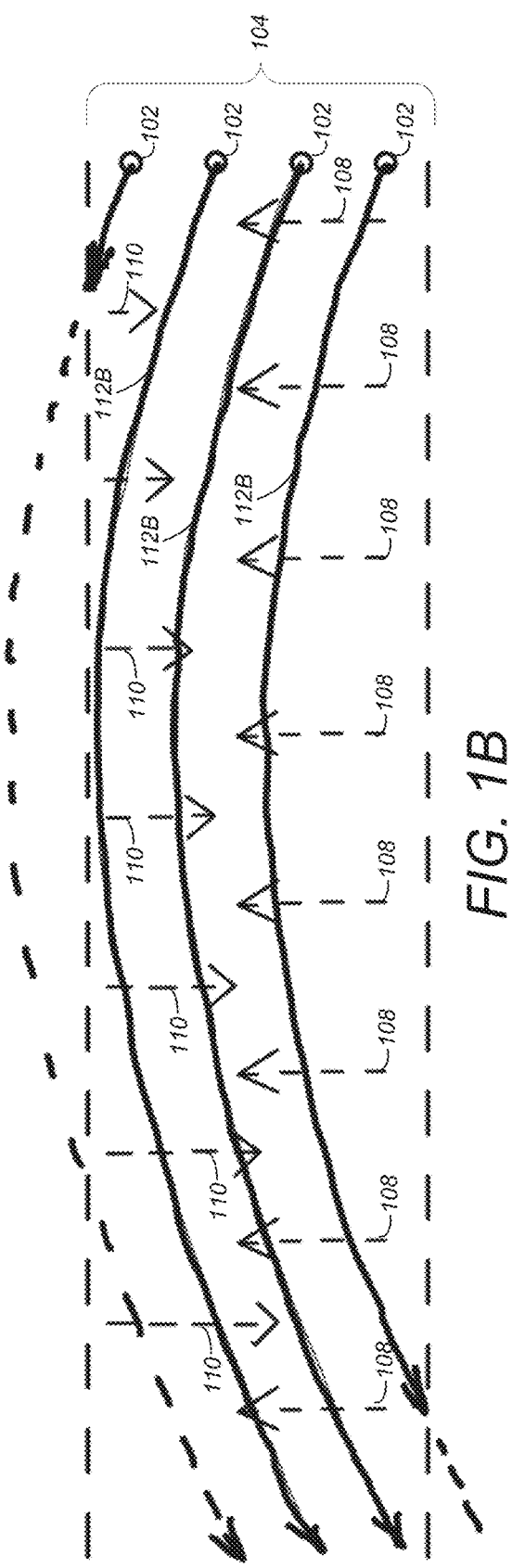
FIG. 1A (PRIOR ART)
FIG. 1B

SCANNING OPPOSED MIGRATION AEROSOL CLASSIFIER

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/726,012, filed on Aug. 31, 2018, with inventor(s) Huajun Mai and Richard C. Flagan, entitled "Scanning Opposed Migration Aerosol Classifier."

This application is related to the following patents and patent applications, which are incorporated by reference herein:

U.S. patent application Ser. No. 16/162,047, filed on Oct. 16, 2018, which issued Sep. 15, 2020 as U.S. Pat. No. 10,775,290 with inventor(s) Richard C. Flagan, Stavros Amanatidis, and Changhyuk Kim, entitled "A Highly Portable Radial Differential Mobility Analyzer," which application claims the benefit under 35 U.S.C. Section 119(e) of commonly-assigned U.S. Provisional Patent Application Ser. No. 62/573,051 filed on 5 Oct. 16, 2017, entitled "HIGHLY PORTABLE RADIAL DIFFERENTIAL MOBILITY ANALYZER," by Richard C. Flagan, Stavros Amanatidis, and Changhyuk Kim;

U.S. Pat. No. 9,095,793 filed on Feb. 15, 2013 and issued on Aug. 4, 2015, with inventor(s) Richard C. Flagan, Wilton Mui, and Andrew Downard, entitled "Radial Opposed Migration Aerosol Classifier with Grounded Aerosol Entrance and Exit";

U.S. Pat. No. 9,138,663 filed on Feb. 15, 2013 and issued on Sep. 22, 2015, with inventor(s) Richard C. Flagan, Wilton Mui, and Andrew Downard, entitled "Opposed Migration Aerosol Classifier Gas and Heat Exchanger";

U.S. Pat. No. 9,177,774 filed on Jan. 18, 2011 and issued on Nov. 3, 2015, with inventor(s) Nicholas brunelli, Konstantinos P. Giapis, Richard C. Flagan, Jesse L. Beauchamp, and Evan Neidholdt, entitled "Continuous Flow Mobility Classifier Interface with Mass Spectrometer"; and U.S. Pat. No. 6,905,029 filed on Aug. 29, 2003 and issued on Jun. 14, 2005 with inventor(s) Richard C. Flagan, entitled "Cross-Flow Differential Migration Classifier".

STATEMENT REGARDING FEDERALLY SPONSORED RESEARCH AND DEVELOPMENT

The invention was made with Government support under Grant No. AGS 1602086 awarded by the National Science Foundation. The Government has certain rights in this invention.

BACKGROUND OF THE INVENTION

1. Field of the Invention

The present invention relates generally to separating and measuring particles and molecules in fluids, an in particular, to a scanning opposed migration ion/aerosol classifier.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

The primary method for measuring the particle size distribution of aerosol particles is differential mobility analysis. Efforts to measure incipient particles as they form from gas phase precursors have extended the method to molecular sizes so that even gas ions can be characterized by differential mobility analysis. The method employs a classifier in which charged particles that migrate within a narrow range of velocities in an applied electric field are selected from a sample that contains particles or ions that migrate at different velocities. The property on which this separation is based is the so-called electrical mobility, which is the steady-state migration velocity divided by the electric field strength in which that migration is taking place. The classical device in which this separation is performed is a differential mobility analyzer (DMA) in which a particle/ion-free sheath gas flows between two parallel, or nearly-parallel, impermeable electrodes. Charged particles or ions (hereafter labeled particles) of appropriate polarity (positive or negative) are introduced at an upstream location through, or near one of the electrodes, and caused to migrate toward the counter-electrode by the electric field that is created when a voltage difference is applied between the two electrodes. As the charged particles migrate, they are carried along the channel formed by the two electrodes toward a downstream location where a classified charged-particle sample is extracted through a port in or near the counter electrode. The numbers of such classified particles can then be counted using a detector such as a condensation particle counter (CPC) or inferred from measurements of the charge that they carry using a Faraday-cup electrometer (FAE), or other devices.

In one prior art system, the applied voltage is kept constant until the particles pass through the entire classification region and are subsequently counted. The voltage is then stepped to make a sequence of measurements, each at constant voltage. Each voltage step introduces a time delay to allow particles to transit through the classifier before being measured. An alternate approach is to continuously scan the applied voltage, and to continuously count the transmitted particles into successive time bins, ideally using an exponential voltage ramp so that all particles experience the same relative electric-field-strength change as they pass through the classification range. The resulting instrument is known as the scanning electrical mobility spectrometer (SEMS; also known as the scanning mobility particle sizer, SMPS), and has become the primary method used for mobility analysis of aerosol particles.

Owing to particle diffusion from the narrow range of particle paths across the classification region of the DMA, the ability of the DMA to resolve differences in particle size is limited. An alternate form of mobility classifier reduced this diffusional degradation of its performance by eliminating the sheath flow of the DMA that flows in the same direction as the gas that carries the charged particles into and out of the classification region. The parallel sheath flow was replaced with a cross flow that enters through one porous or permeable electrode (which may be a screen or other material or structure that allows a fluid to pass through the surface of the electrode that defines the primary flow channel), and exits through a porous or permeable counter electrode. A voltage difference applied between these porous electrodes induces charged particles to migrate in a direction that is opposite to a flow of a clean, particle-free fluid that enters through one of said permeable electrodes and exits through the second permeable electrode. The charged particle sample is introduced at an upstream location of this opposed migration ion and aerosol classifier (OMIAC) and flows toward a downstream location where the classified particles are extracted.

With the voltage held constant, the migration velocity and the opposing cross flow balance one another for particles of one particular mobility for either parallel, planar porous electrodes, or for coaxial cylindrical electrodes; particles of that particular mobility are carried by the sample flow in a direction that is parallel to the electrode surfaces. Because of that parallel motion, large, non-diffusive particles of that particular mobility, denoted Z* are, ideally, transmitted through the classification region without losses. Particles with whose mobility, Z, has a magnitude that is greater than that of Z*, (which can be positive or negative; hereafter we describe the migration for positive mobility Z) migrate with higher velocities in the direction toward the permeable electrode through which the cross-flow enters the classification region. Those with lower mobilities are carried by the cross-flow toward the cross-flow outlet permeable electrode. Thus, some or all of the particles with mobilities different from Z* are lost from the flow between the electrodes. The fraction of particles of mobility Z that are transmitted when the voltage corresponds to a particular value of Z*, f(Z,Z*), is known as the transfer function of the classifier.

The performance of a DMA or OMIAC can be characterized in terms its resolution which is defined as the ratio of Z*, the mobility of the particles that are transmitted with the highest efficiency, to the full width of the region of the transfer function in which particles are transmitted with at least one-half of that efficiency, i.e., $$R = \frac{Z*}{\Delta Z_{fwhm}}$$

The OMIAC can maintain its ideal resolution (also known as resolving power) at much lower electrode voltages than the differential mobility analyzer (DMA) [Flagan, 1999] [Flagan, 2004]. A radial-flow version of this instrument, called the radial opposed migration ion and aerosol classifier (ROMIAC) can classify sub-2 nm ions [Mui, Thomas, et al., 2013], and even separate peptide stereoisomers [Mui, Mai, et al., 2017]. The ROMIAC has been used as a particle classifier in the measurement of particle size distributions during atmospheric nucleation events owing to its high resolving power in the nucleated particles size domain. To measure particle size distributions, the classification voltage was stepped to obtain particle concentration over a range of discrete mobilities. As described above, voltage stepping makes size distribution measurements slow due to the time one must wait between channels. By continuously scanning the voltage, [Wang and Flagan 1990] accelerated DMA measurements in the scanning electrical mobility spectrometer (SEMS). However, because scanning alters the ideal trajectory the successfully classified particles follow in the OMIAC, voltage scanning of the OMIAC can be expected to increase losses relative to constant voltage classification. For a voltage scan in which the voltage increases with time, the particles that are transmitted with the highest efficiency, i.e., those with mobility Z*, initially migrate with a velocity that is smaller than the opposing cross-flow velocity, and later migrate at velocities greater than the cross flow velocity. As a result, the migrating particles follow curved trajectories. If the particles were to fill the space between the two permeable electrodes as in the original [Flagan, 2004] OMAC, a scan that is rapid compared to the time required to pass from the sample inlet port to the sample outlet port would lead to many of the particles in the inlet flow migrating to the cross-flow inlet permeable electrode and be lost. During a decreasing-voltage scan, particles would initially migrate slowly toward the cross-flow outlet permeable electrode, and be lost to that electrode.

FIG. 1A illustrates the particle trajectories in an OMAC of the prior art. Particles 102 flow through the classification channel 104 formed by porous or permeable electrodes 106. The electrodes 106 provide an electric field that induces a migration velocity 108 that balances the cross-flow velocity 110 to enable the particles 102 to flow through the channel 104 along particle path trajectories 112. As described in the cross-referenced patents recited above, the ideal particle path 112 is essentially parallel to the electrodes 106 in the case of constant flows and electric field. FIG. 1B shows the shows the trajectories 112B for particles 102 of mobility Z* when the electric field is increased with time as the particles 102 are carried by the sample flow. As the particles 102 transit the length of the classification region 104, the migration velocity 110 increases from lower than that of the cross flow 108 to greater than that of the cross flow 108. Particles 102 are initially carried by the cross-flow toward the cross-flow outlet, but as they are carried along the length of the classification region 104, their migration velocity 110 increases due to the increase in the electric field strength with time, carrying them toward the cross-flow inlet electrode. This variation of the migration velocity causes the particles 102 to follow curved trajectories 112B, some of which intersect one of the porous electrodes 106 (i.e., the top and bottom paths 102 illustrated in FIG. 1B with partial dashed lines after the intersection), causing particles 102 to be lost from the sample flow.

An extremely slow voltage scan could allow some particles to be transmitted in the classified sample flow, but the rapid measurement of particles with mobilities that vary by more than an order of magnitude that the impermeable-electrode differential mobility classifier enables would not be possible. Since the mobility to be probed varies by orders of magnitude, such slow scans would require a long time to probe the desired particle size range, and, therefore, achieve little improvement in measurement time compared to the voltage-stepping mode of operation. Faster scans would lead to unacceptable particle losses and low transmission and detection efficiencies. One could vary the field or flow along the classification channel to allow particles to follow trajectories that are parallel to the electrodes for one exponential scan rate, but this would significantly complicate instrument design and operation. Hence, the OMAC has been limited to stepping mode operation to date.

SUMMARY OF THE INVENTION

Embodiments of the invention provide a scanning opposed-migration ion and aerosol classifier that overcomes the efficiency loss of operating with scanning voltage without complicating the OMIAC design with the addition of spatial variations of the voltages applied to the two electrodes or of the cross-flow velocities. The resulting instrument maintains the simplicity of the constant voltage OMIAC while attaining the improved time response and duty-cycle afforded by continuously scanning the voltage and continuously counting particles. This improvement was enabled by detailed understanding of the trajectories of particles as they travel through the OMIAC while the voltage difference between the electrodes is continuously varied with time. That understanding was enabled by detailed numerical simulations of the flow fields, time varying electric fields, and particle trajectories within a radial flow version of the OMIAC, which was labeled the ROMIAC.

BRIEF DESCRIPTION OF THE DRAWINGS

Referring now to the drawings in which like reference numbers represent corresponding parts throughout:

FIG. 1A illustrates the particle flow and opposing forces in an OMAC of the prior art;

FIG. 1B illustrates the particle flow and opposing forces in accordance with embodiments of the invention;

FIGS. 27A and 27B show the particle size distributions obtained from the same scanning ROMIAC data gathered in an experiment that measured the particle wall loss rate in the environmental chamber after inversion using these two different kernels in accordance with one or more embodiments of the invention;

DETAILED DESCRIPTION OF THE PREFERRED EMBODIMENTS

Figure 2A:
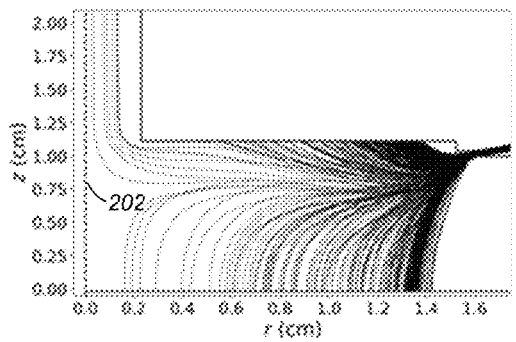
FIGS. 2A-2F show simulated trajectories for 20.8 nm particles during fast scans in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Particle Trajectory Simulation

Overview

Extensive numerical simulations of the ROMIAC of [Mui, Thomas, et al., 2013] revealed that the particle trajectories vary dramatically from particles that leave the classifier early in a scan to those that leave late, and that, owing to the nature of the sample entrance design, particles that enter the classifier at different times can exit, and be counted, at the same time. Scans with the voltage varying in an exponential ramp between 10 V and 9800 V (either increasing—up-ramp, or decreasing—down-ramp) were examined, with ramp times ranging from 100 s to as little as 3 s. These simulations revealed that the performance of the Scanning-ROMIAC was better than anticipated, with the reduction in peak transmission efficiency declining less than a factor of two, even in the fastest scans.

The transfer function of a DMA or OMIAC may be derived by dividing the instrument into three regions: (i) entrance region, where only particle loss is concerned; (ii) "extended classification region", where the time-varying electric field affects the particle motion; (iii) exit region, where the time-varying electric field does not affect the particle motion, but the residence time distribution and the penetration efficiency are both required for the size distribution data inversion. The diffusive particle trajectories in both the entrance region and the exit region may be simulated by applying the Monte Carlo method in COMSOL MULTIPHYSICS™, while the particle trajectories and the associated classification transfer function may be obtained using the Monte Carlo simulation in IGOR PRO, but with the steady fluid flow and quasi-steady electric field solution imported from the finite-element-analysis from COMSOL MULTIPHYSICS™. This method provides a comprehensive understanding and detail insight of the performances of each component of the instrument, but it poses challenges for further application given the difficulty of subdividing the instrument into multiple regions, and evaluating the instrument performance individually for each part.

In embodiments of the invention, the performance of the ROMIAC is evaluated in COMSOL MULTIPHYSICS™ as a whole, with the basic geometry described by [Mui, Mai, et al. 2017]. Since the ROMIAC is designed for classifying particles ranging from 1 to 100 nm in size, inertia effects can be assumed to have negligible influences on the diffusive particle trajectories; non-inertial particle simulations were performed using the "massless" formulation in the particle tracing module in COMSOL MULTIPHYSICS™. In contrast, embodiments of the invention may utilize a "Newtonian" formulation that takes particle inertia into account. Intuitively, neglecting inertia accelerates particle trajectory calculations, so long as the error tolerance level is not changed. Further, steady-state fluid flows and electric fields may be solved numerically using the laminar flow and electrostatic modules, respectively, for the operating parameters given in the Table A:

TABLE A

Operating parameters used for the scanning OMAC

| Parameter | Notation | Value |
|---|---|---|
| Polydisperse flow rate (LPM) | Qa, in | 1.00 |
| Monodisperse flow rate (LPM) | Qa, out | 1.00 |
| Incoming cross-flow flow rate (LPM) | Qc, in | 10.0 |
| Outgoing cross-flow flow rate (LPM) | Qc, out | 10.0 |
| Low electrode voltage (V) | $V_{low}$ | 10.0 |
| High electrode voltage (V) | $V_{high}$ | 9800 |

TABLE A-continued

Operating parameters used for the scanning OMAC

| Parameter | Notation | Value |
|---|---|---|
| Up/down scan times (s) | $t_{ramp,\,u/d}$ | 3, 6, 12, 25, 50, 100 |
| Holding time at $V_{low}$ (s) | $t_{low}$ | 6 |
| Holding time at $V_{high}$ (s) | $t_{high}$ | 6 |

The time-varying electric field is then defined as $E(x, y, z, t) = E_0(x, y, z)f(t)$, where $E_0(r, z)$ is the electric field obtained by finite element simulations at an electrode potential of $V_0 = 1$ V, and $f(t)$ is the time variation factor.

EQ. 1

$$f(t) = \begin{cases} \dfrac{V_{low}}{V_0}, & 0 \le t < t_{low} \\ \dfrac{V_{low}}{V_0} e^{\frac{t - t_{low}}{\tau_{s,u}}}, & t_{low} \le t < t_{low} + t_{ramp,u} \\ \dfrac{V_{high}}{V_0}, & t_{low} + t_{ramp,u} \le t < t_{low} + t_{ramp,u} + t_{high} \\ \dfrac{V_{high}}{V_0} e^{-\frac{t - t_{low} - t_{ramp,u} - t_{high}}{\tau_{s,d}}}, & t_{low} + t_{ramp,u} + t_{high} \le t_{low} + t_{ramp,u} + t_{high} + t_{ramp,d} \end{cases}$$

where $\tau_{s,u}$ and $\tau_{s,d}$ are the characteristic times for the increasing and decreasing voltage ramps, respectively. For simulations of 3, 6, 12, 25, 50, and 100 s, ramps between 10 and 9800 V, these characteristic ramp times are 0.44, 0.87, 1.81, 3.63, and 7.26 s, respectively. These times can be compared to the mean residence time of the particles within the classification region of the mobility classifier; this time is the ratio of the volume in the classification region, $V_{class}$, to the sample flow rate, $Q_a$. For the present embodiment of the invention, the classification region volume of the ROMIAC is $V_{class} = \pi(R_2^2 - R_1^2)b$ where $R_2$ and $R_1$ are the radii at the aerosol sample inlet, and that at the central sample outlet port, 1.61 cm and 0.24 cm respectively, and $b(=1$ cm) is the separation distance between the two permeable electrodes, which is 0.48 s for the embodiment considered in the simulations.

Eq. 1 can be incorporated into a COMSOL simulation by defining an Analytic function with 4 step functions under "Definitions" in the "Model Builder" interface. The 3-dimensional particle trajectories are then implemented with the mathematical particle tracing module by defining the particle velocity as follows:

$$v_\chi = u_\chi + E_{0,\chi} f(t) Z_p + \frac{g\sqrt{(2\mathcal{D}dt)}}{dt} \quad \text{EQ. 2}$$

where $\chi$ denotes one of the Cartesian coordinates, x, y or z, and $u_\chi$ and $E_{0,\chi}$ are the fluid flow velocity and the steady-state electric field intensity of $\chi$ coordinates from the finite element calculations. dt denotes the time step for the trajectory simulation, which is chosen to be 0.5 ms for the simulations shown.

To enable comparison with the prior-art stepping-mode approach, particle trajectories in the stepping mode ROMIAC are also simulated by setting the time variation factor f(t) as constant in the particle motion equation (Eq. (1.2)).

Mean Particle Trajectory

In order to show the instrument performance from an integrated perspective, the mean trajectory of the transmitted particles is introduced. The particle trajectories from the 3-dimensional COMSOL simulation are interpolated onto axisymmetric coordinates (r, z). To quantitatively compare the stepping mode to the scanning mode, mean trajectories for both modes of operation are calculated.

To get an unbiased representation of the mean trajectory of particles of a given mobility, all possible transmitted particle trajectories are collected. In the scanning mode, embodiments of the invention first release particles in each time interval and then identify all time intervals when any such particles are successfully transmitted through the instrument. These intervals for the scanning ROMIAC are shown in Table B for scan times $t_{ramp}$ ranging from 3 to 100 s for singly-charged particles of two sizes, $D_p$=2.67 and 20.8 nm. For the 2.67 nm particles, 100 particles are released at each time step, while for the 20.8 nm particle, only 50 particles are released per step since the transmission efficiency for 20.8 nm is around twice of that at 2.67 nm.

defining fast versus slow scans depends upon the dimensions of the instrument, the range of voltages scanned, and the flow rates employed. The ratio of the characteristic scan rate, $\tau_s$ (defined in EQ. 1 for up and down scans), to the average residence time during which the particle experiences the changing voltage, $\tau_R$, describes the relative change in the migration velocity experienced by a particle during its migration. The simulations reveal that slow scans for which the transfer function approaches that of constant voltage operation require that this dimensionless time, $\rho_\tau = \tau_s/\tau_r$, be greater than about 5, while scans with smaller values of $\rho_\tau$ produce transfer functions that differ significantly from that for constant voltage operation. The values of the dimensionless scan times for the conditions and scans of these simulations are summarized in Table C. Thus, this value, $\rho_\tau - \rho_\tau^* \approx 5$, serves as an approximate demarkation of fast versus slow scans for the present embodiment of the invention. The precise value of $\rho_\tau^*$ may differ somewhat for other embodiments of the invention.

TABLE B

Time intervals and time steps used for scanning ROMIAC particle trajectory generation; the data format is [Start time:Time step:End time]

| | $D_p$ = 2.67 nm | | $D_p$ = 20.8 nm | |
|---|---|---|---|---|
| $t_{ramp}$ (s) | up scan | down scan | up scan | down scan |
| 3 | [5.85:0.025:6.85] | [15.80:0.025:16.90] | [7.50:0.025:8.60] | [13.90:0.025:15.10] |
| 6 | [6.80:0.025:7.80] | [20.90:0.025:22.00] | [10.20:0.025:11.30] | [17.20:0.025:18.40] |
| 12 | [8.50:0.025:9.80] | [30.90:0.025:32.10] | [15.50:0.025:16.80] | [23.70:0.025:25.10] |
| 25 | [12.40:0.05:14.20] | [52.50:0.05:54.30] | [26.80:0.05:28.70] | [37.60:0.05:39.40] |
| 50 | [20.0:0.1:22.5] | [94.3:0.1:96.8] | [49.6:0.1:51.6] | [64.5:0.1:67.0] |
| 100 | [35.3:0.2:39.1] | [177.8:0.2:181.8] | [94.4:0.2:97.6] | [118.3:0.2:122.3] |

To generate an unbiased mean particle trajectory in the stepping mode, particle trajectories are simulated for different electrode voltages, at which any such particles are transmitted. For the 2.67 nm singly-charged particle, the voltage range is 81 to 97 V, which was simulated with voltage step of 2 V. For singly-charged, 20.8 nm particles, voltages ranging from 4700 to 5700 V were simulated, with voltage steps of 100 V.

Transfer Function

In view of the above, embodiments of the invention may define the scanning ROMIAC transfer function as:

$$\Omega^I_{ROMIAC}(Z_p(D_p), \phi), t) = \frac{Q_{a,out} N_{a,out}(t)}{Q_{a,in}} N_{a,in} \quad \text{EQ. 3}$$

where $Q_{a,\,in}$ and $Q_{a,\,out}$ are the flow rates of the polydisperse and the monodisperse aerosol, respectively, and $N_{a,\,in}$ and $N_{a,\,out}$ are the corresponding particle number concentrations.

Voltage ramp times of $t_{ramp}$=25, 50, and 100 s, for both up- and down-scans, were explored in simulations of 12 electrical mobility-equivalent particle sizes ranging from 1.61 nm (electrical mobility $Z_p$=8.03×10−5 m2/s/V) to 27.1 nm ($Z_p$=3.02×10−7 m2/s/V). Because fast scans, i.e., $t_{ramp}$=3, 6, and 12 s raise challenges for particle size distribution inversion, transfer functions are only explored for two particle sizes: 2.67 nm ($Z_p$=4.83×10−5 m2/s/V) and 20.8 nm ($Z_p$=5.01×10−7 m2/s/V). The absolute time scale

TABLE C

Scan Times, exponential ramp time constants, and dimensionless scan times for the conditions of the simulations ($V_{class} = \pi(R_2^2 - R_1^2)L = 7.96$ cm³, $\tau_R = V_{class}/Q_{a,\,in} = 0.48$ s).

| $t_{ramp}$ (s) | $\tau_R$ (s) | $\rho_\tau$ |
|---|---|---|
| 3 | 0.44 | 0.91 |
| 6 | 0.87 | 1.82 |
| 12 | 11.74 | 3.64 |
| 25 | 3.62 | 7.58 |
| 50 | 7.24 | 15.2 |
| 100 | 14.46 | 30.3 |

Results

Particle Trajectories in ROMIAC

Figure 2B:
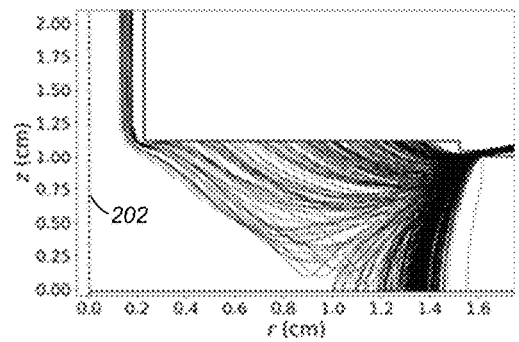
Figure 2C:
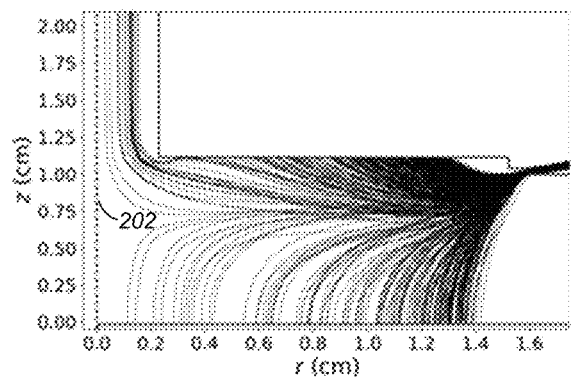
Figure 2D:
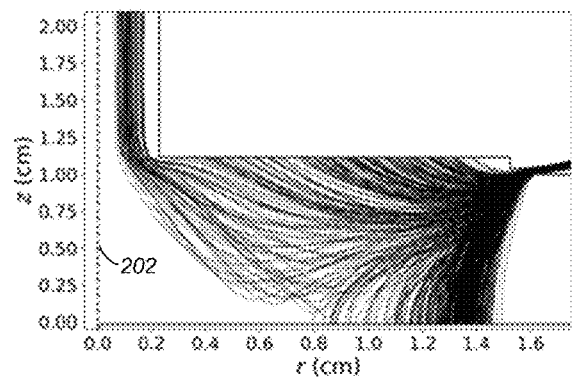
Figure 2E:
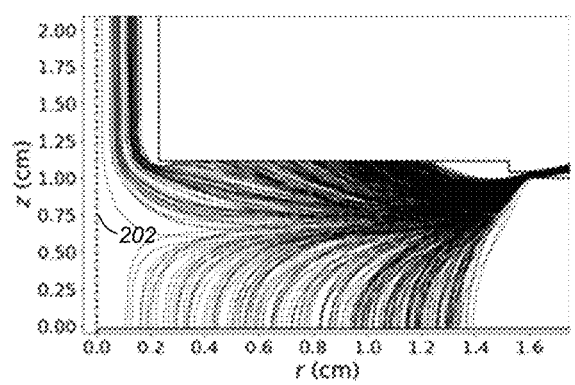
Figure 2F:
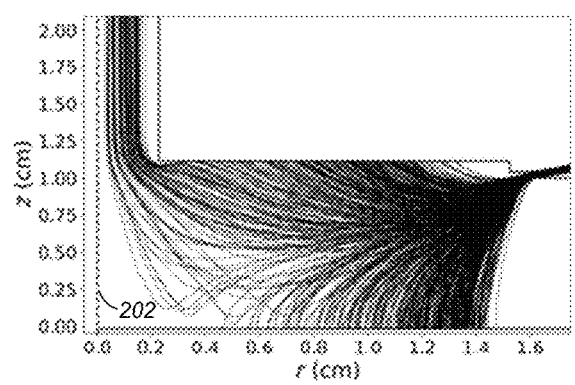

FIGS. 2A-2F show simulated trajectories for 20.8 nm (i.e., $D_p$=20.8 nm) particles during fast 3, 6, 12 s ROMIAC scans ($\tau_s$=0.436, 0.871, 1.74 s; $\tau_s/\tau_R$=0.48, 0.91, 1.82) in accordance with one or more embodiments of the invention. Specifically, FIG. 2A shows the upscan for 3 s, FIG. 2B shows the down scan for 3 s, FIG. 2C shows the up scan for 6 s, FIG. 2D shows the down scan for 6 s, FIG. 2E shows the up scan for 12 s, and FIG. 2F shows the down scan for 12 s. The particle trajectories are projected on the axisymmetric (r, z) coordinates for visualization purposes. For computational efficiency, simulations were conducted for a limited portion of the scans, centered about the time of peak transmission, and extending to early and late times at which the transmission efficiency had dropped to zero. For the up (increasing voltage) scans, particles initially migrate slowly and are, therefore, carried out of the classification region by the cross-flow which exits through the porous electrode adjacent to the aerosol sample inlet. As the voltage increases, migration slows particle motion toward that electrode, allowing some particles to approach the centerline 202 where the higher classified sample outflow velocity carries them out from the classification region. At even longer times, the migration speed exceeds that of the cross flow, so the particles migrate toward the counter electrode (on the cross flow inlet side of the classification region) where the may particles deposit and be lost. During the down (decreasing voltage) scan, particles first migrate rapidly toward the counter electrode, and away from the cross-flow outlet electrode where they might deposit by diffusion. The decreasing migration velocity then allows those particles to move toward the cross-flow outlet electrode and, eventually, toward the classified sample outlet at the center of the ROMIAC. In the fast scans, few particles are transmitted through the classified aerosol exit due to the large variation in the migration velocity during their transit through the classification region; most of the particles are deposited on the upper- or lower-electrodes, particularly for $t_{ramp}$=3 s ($\tau_s$=0.436 s), as shown in FIGS. 2A and 2B. As the scan time increases to 6 s ($\tau_s$=0.871 s; FIGS. 2C and 2D) and 12 s ($\tau_s$=1.74 s; FIGS. 2E and 2F), the relative change in migration velocity decreases, allowing increasing numbers of particles to be transmitted to the classified sample outlet flow.

Figure 3A:
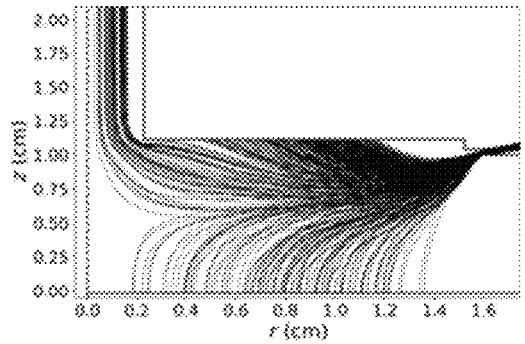
FIGS. 3A-3F show the simulated trajectories for 20.8 nm particles during slow scans in accordance with one or more embodiments of the invention.
Figure 3B:
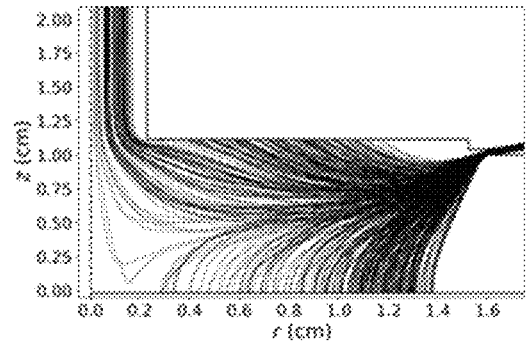
Figure 3C:
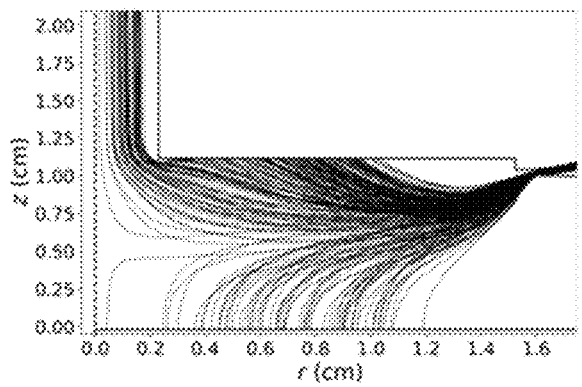
Figure 3D:
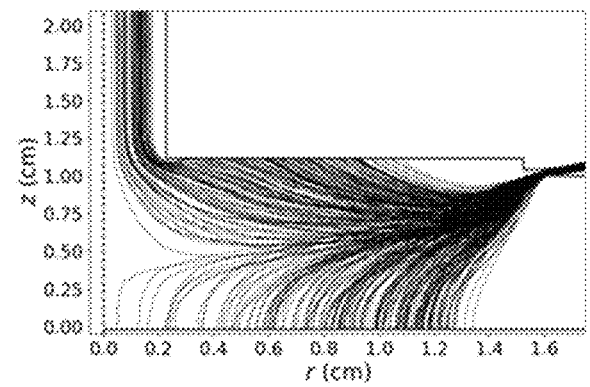
Figure 3E:
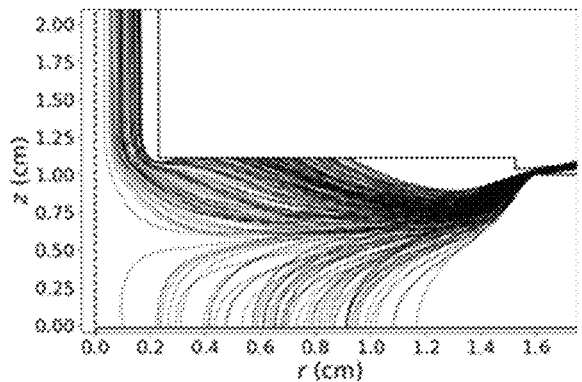
Figure 3F:
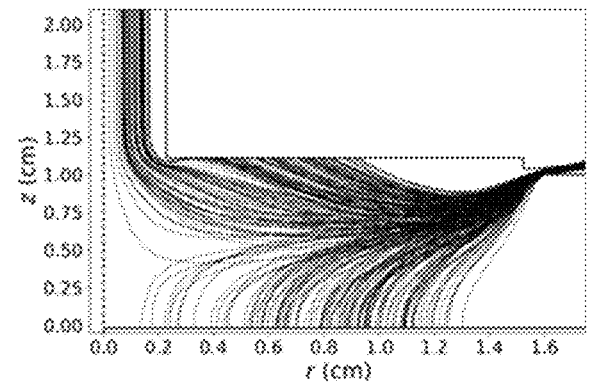

For the slow scans shown in FIGS. 3A-3F, the difference of trajectories between up- and down-scans, and between different scan rates, is less significant than that for the fast scans. In this regard, FIGS. 3A-3F the simulated trajectories for 20.8 nm diameter particles during slow 25, 50, 100 s ROMIAC scans ($\tau_s/\tau_R$=7.6, 15.2, 30.3). Specifically, FIG. 3A shows the up scan for 25 s, FIG. 3B shows the down scan for 25 s, FIG. 3C shows the up scan for 50 s, FIG. 3D shows the down scan for 50 s, FIG. 3E shows the up scan for 100 s, and FIG. 3F shows the down scan for 100 s.

Figure 4A:
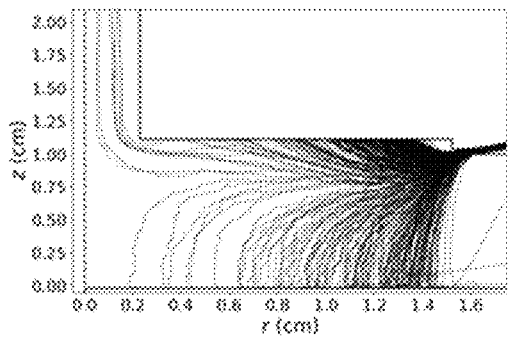
FIGS. 4A-4F illustrate simulated trajectories for 2.67 nm diameter particles during up and down fast scans in accordance with one or more embodiments of the invention.
Figure 4B:
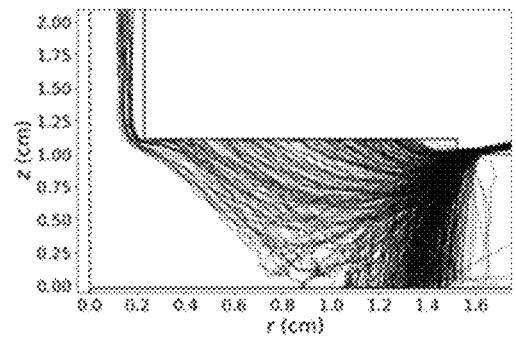
Figure 4C:
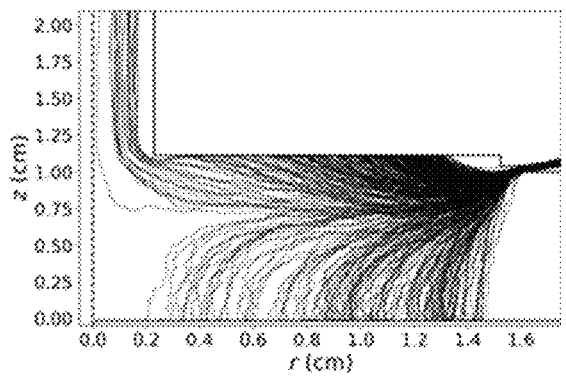
Figure 4D:
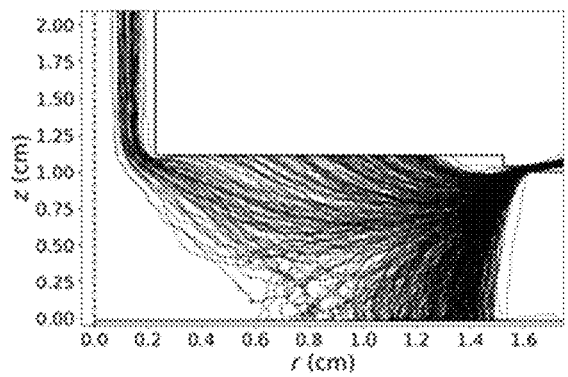
Figure 4E:
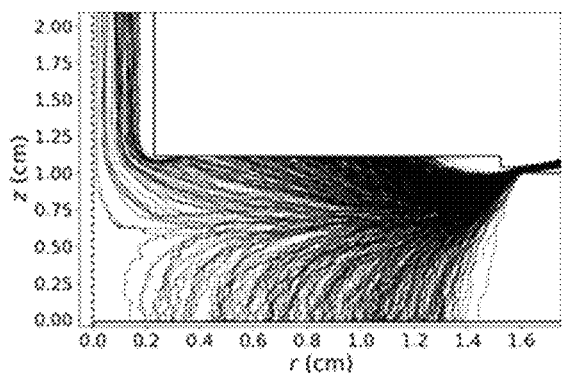
Figure 4F:
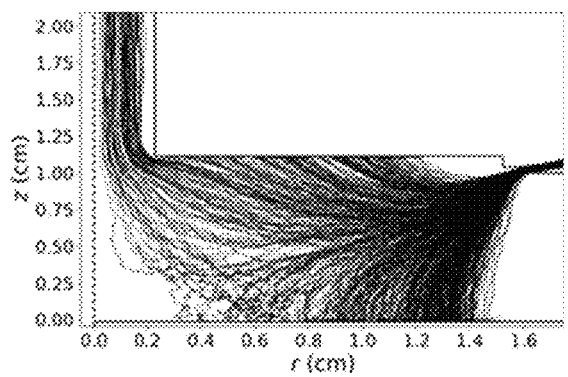
Figure 5A:
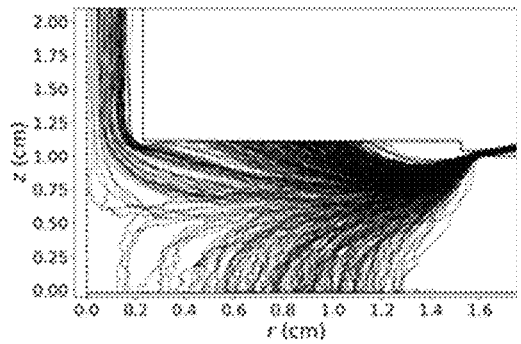
FIGS. 5A-5F illustrate simulated trajectories for 2.67 nm diameter particles during slow scans in accordance with one or more embodiments of the invention.
Figure 5B:
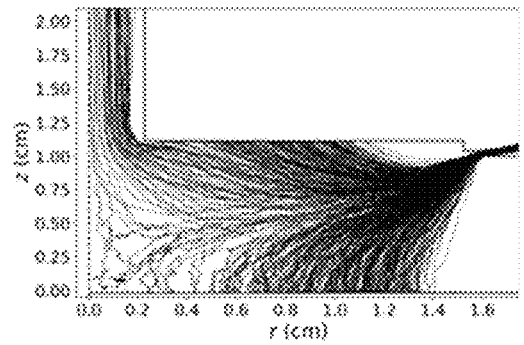
Figure 5C:
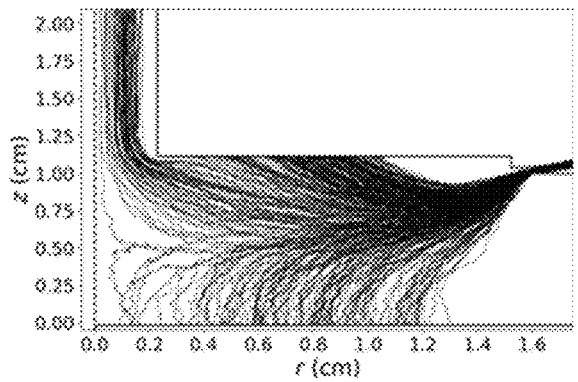
Figure 5D:
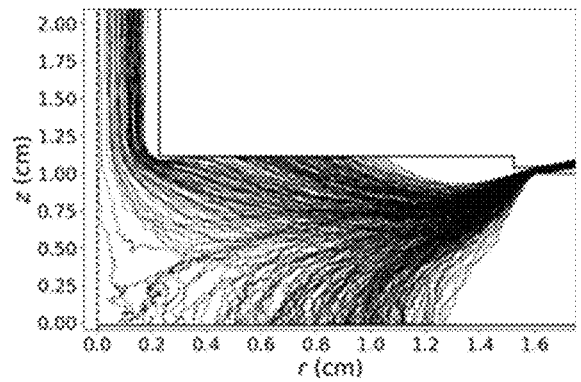
Figure 5E:
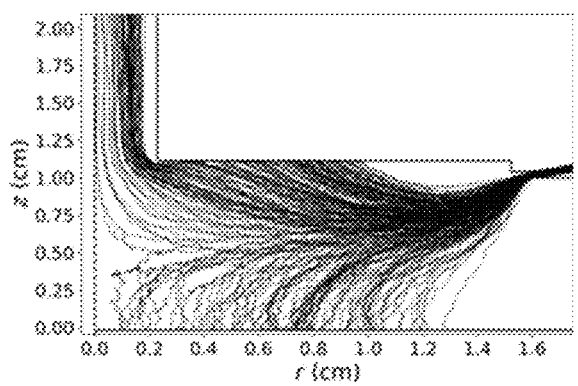
Figure 5F:
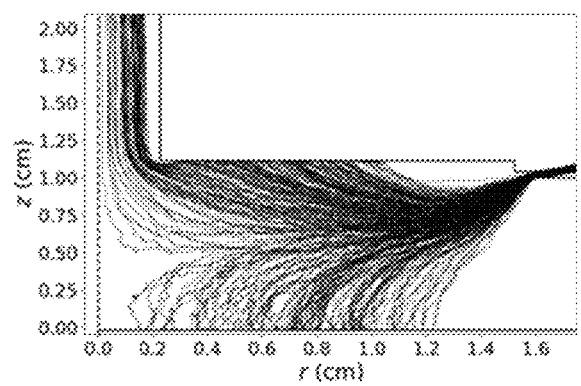

With the operating parameters given in Table A for the ROMIAC, singly-charged, $D_p$=20.8 nm particles can be considered to be non-diffusive since their trajectories closely follow the kinematic trajectories determined by the fluid motion and electric field. By comparison, particle trajectories for singly-charged, $D_p$=2.67 nm particles show the role of diffusion in the particle motion. The random, diffusive deviations of individual particles from the kinematic (non-diffusive) trajectories causes increased numbers of particles to reach and deposit on the porous electrodes. Such particle trajectories are shown in FIGS. 4A-4F and FIGS. 5A-5F for fast and slow scans respectively. Specifically, FIGS. 4A-4F illustrate simulated trajectories for 2.67 nm diameter particles during up and down fast 3 (FIGS. 4A [up] and 4B [down]), 6 (FIGS. 4C [up] and 4D [down]), 12 s ROMIAC scans (FIGS. 4E [up] and 4F [down]); $\tau_s/\tau_R$=0.48, 0.91, 1.82). FIGS. 5A-5F illustrate simulated trajectories for 2.67 nm diameter particles during slow 25 (FIG. 5A [up], FIG. 5B [down]), 50 FIG. 5C [up], FIG. 5D [down]), and 100 s (FIG. 5E [Up], FIG. 5F [down]) ROMIAC scans $\rho_\tau$=7.6, 15.2, 30.3).

Figure 6A:
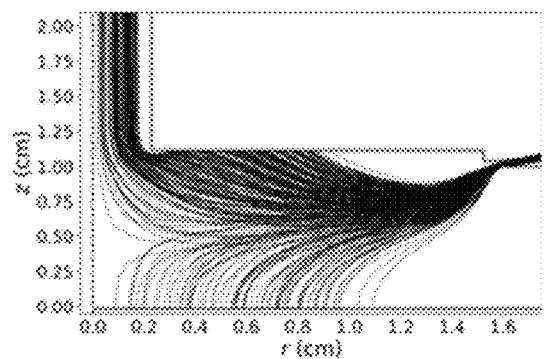
FIGS. 6A-6D illustrate simulated particle trajectories, both successful and unsuccessful, in the stepping-mode (constant voltage) ROMIAC.
Figure 6B:
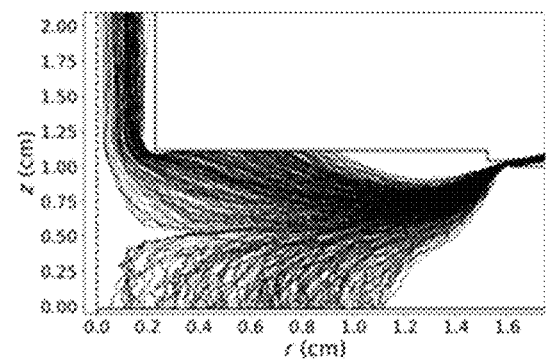
Figure 6C:
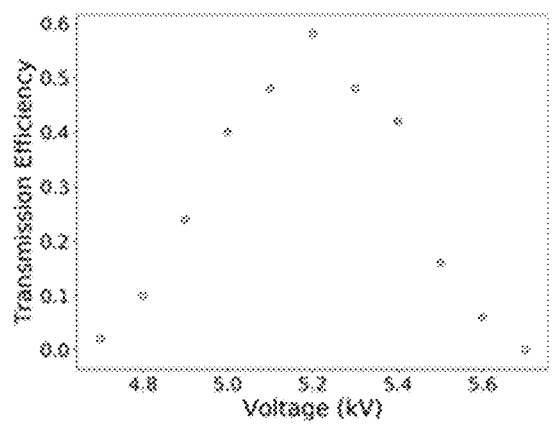
Figure 6D:
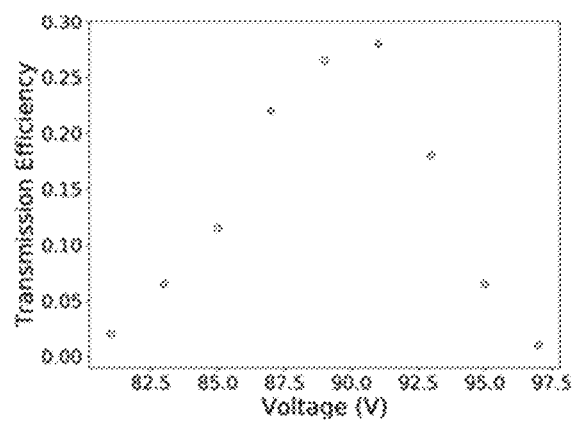

The particle trajectories for the stepping-mode ROMIAC are shown in FIGS. 6A-6D. Specifically, FIGS. 6A-6D illustrate simulated particle trajectories, both successful and unsuccessful, in the stepping-mode (constant voltage) ROMIAC for FIG. 6A $D_p$=20.8 nm and FIG. 6B $D_p$=2.67 nm; with the corresponding transfer functions shown in FIG. 6C $D_p$=20.8 nm and FIG. 6D $D_p$=2.67 nm. As illustrated, for a "non-diffusive" particle ($D_p$=20.8 nm), particle trajectories are simulated for 11 different voltages ranging from 4.7 kV to 5.7 kV, which approximately covers the full range of the stepping mode transfer functions as shown in FIG. 6C. The peak penetration efficiency is around 0.6 for $D_p$=20.8 nm particles, with an electrode voltage of 5.2 kV. For "diffusive" 2.67 nm particles, the peak penetration efficiency is about 0.3 as electrode voltage of 91 V.

Transmitted Particle Trajectories and Transfer Function of Scanning ROMIAC

Figure 7A:
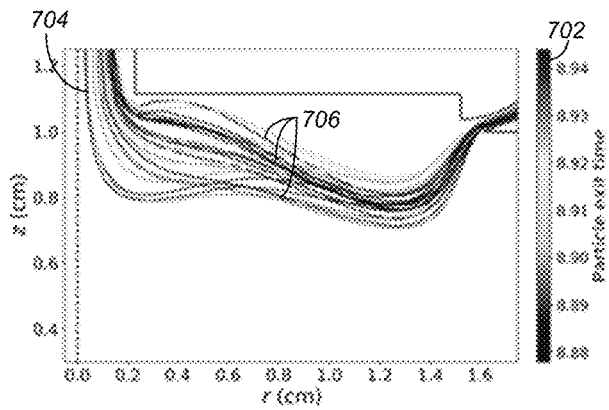
FIGS. 7A-7F illustrate simulated trajectories of 20.8 nm particles that were successfully transmitted during fast scans in accordance with one or more embodiments of the invention.
Figure 7B:
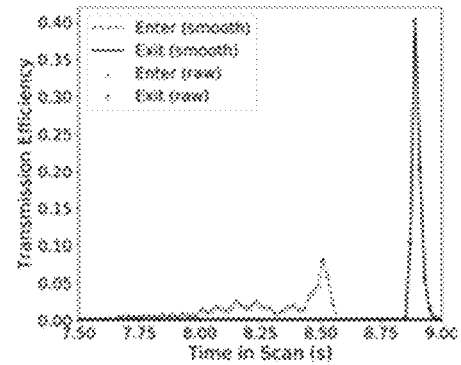
Figure 7C:
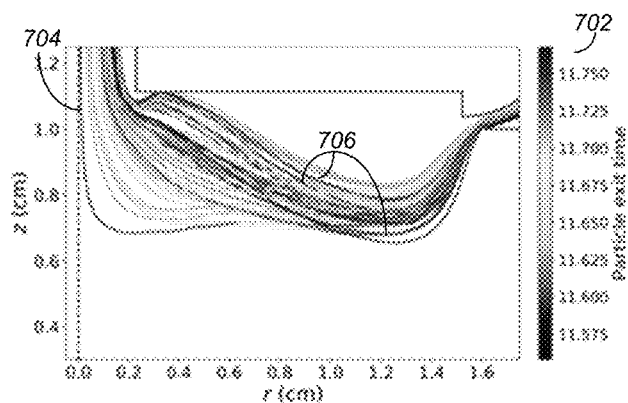
Figure 7D:
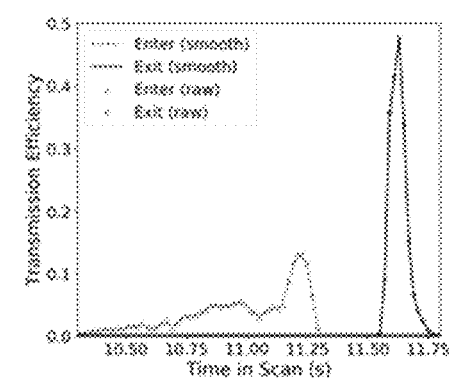
Figure 7E:
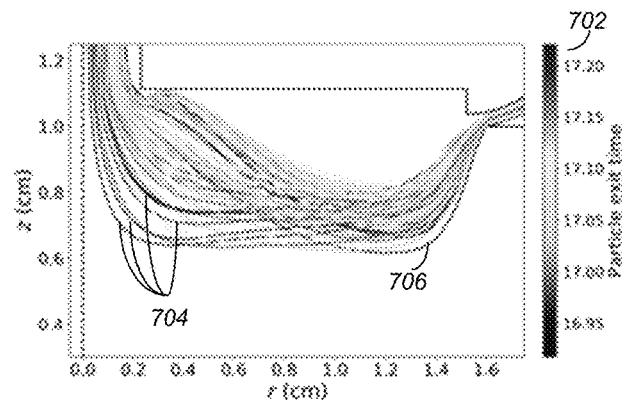
Figure 7F:
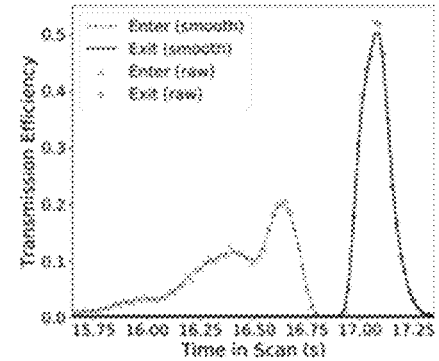
Figure 8A:
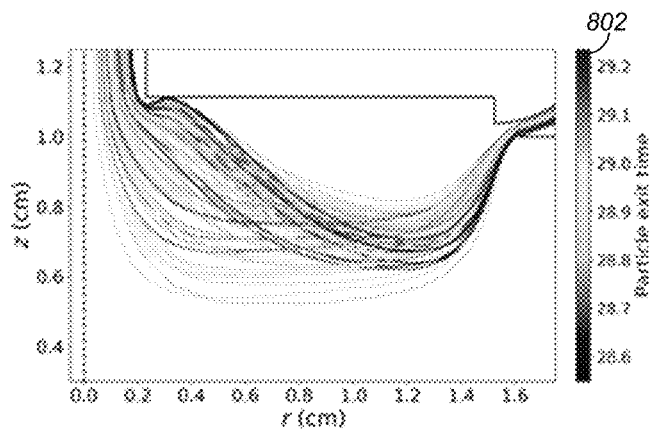
FIGS. 8A-8F show simulated trajectories of 20.8 nm particles that were successfully transmitted during slow scans in accordance with one or more embodiments of the invention.
Figure 8B:
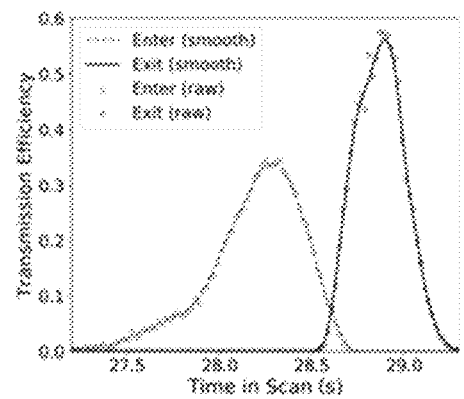
Figure 8C:
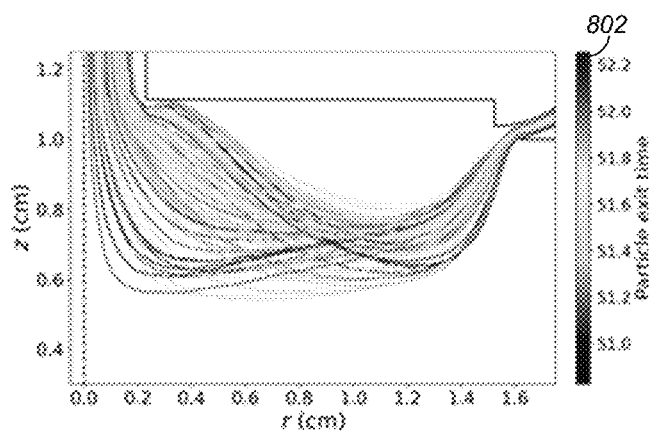
Figure 8D:
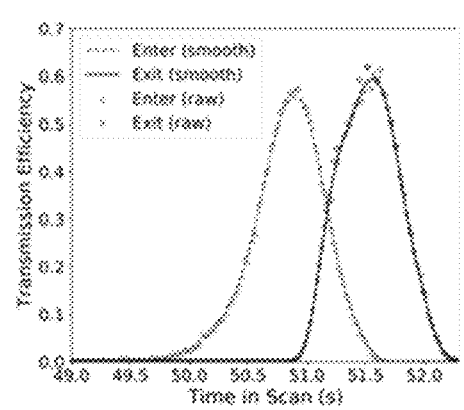
Figure 8E:
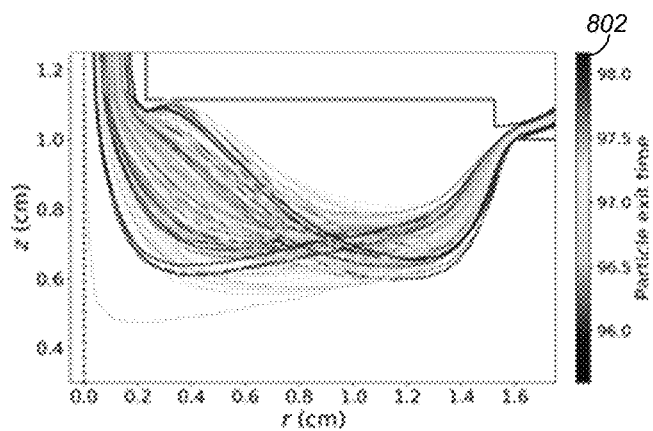
Figure 8F:
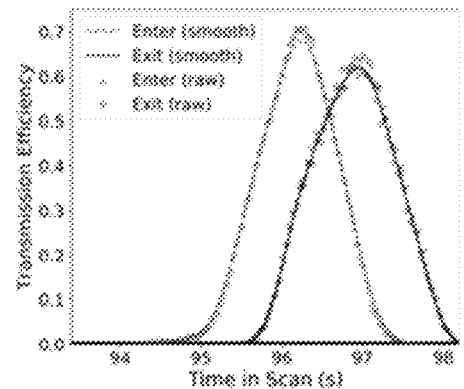
Figure 9A:
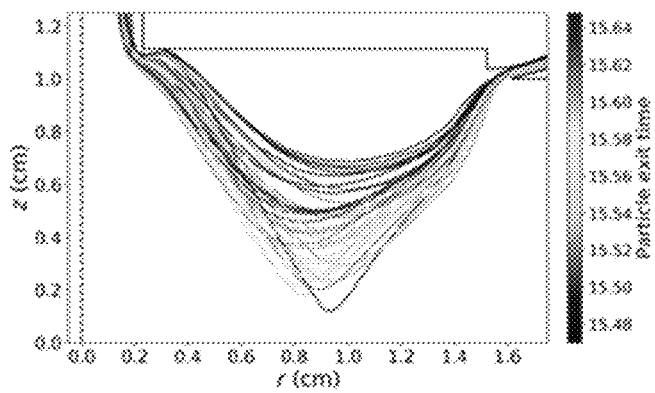
FIGS. 9A-9F illustrate simulated trajectories of 20.8 nm particles that were successfully transmitted during fast scans in accordance with one or more embodiments of the invention.
Figure 9B:
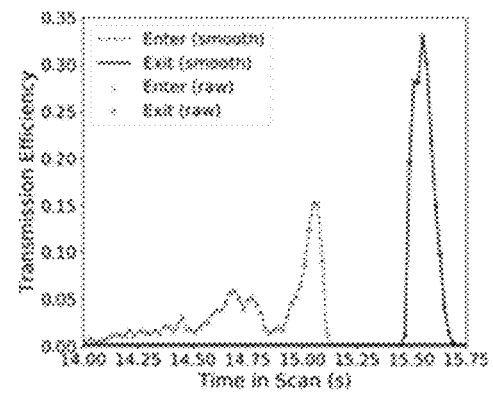
Figure 9C:
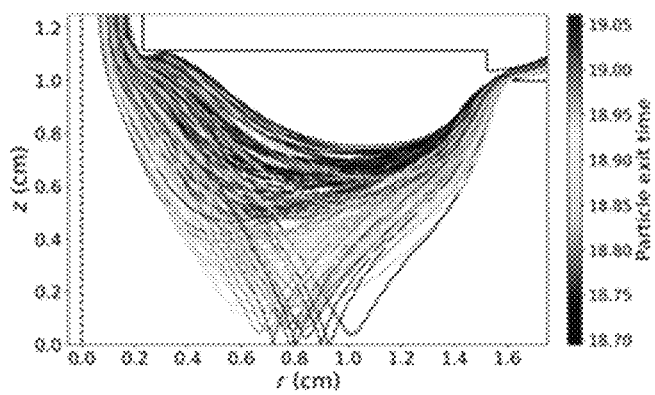
Figure 9D:
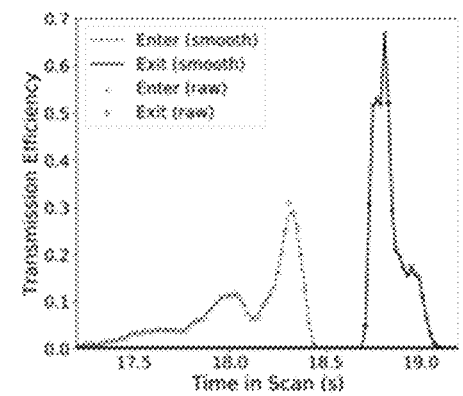
Figure 9E:
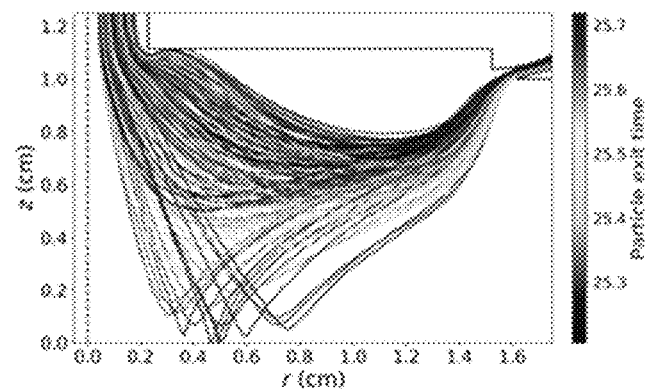
Figure 9F:
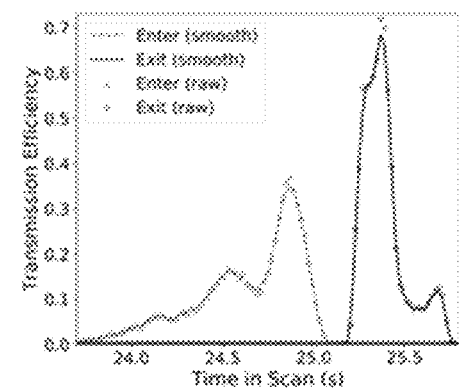
Figure 10A:
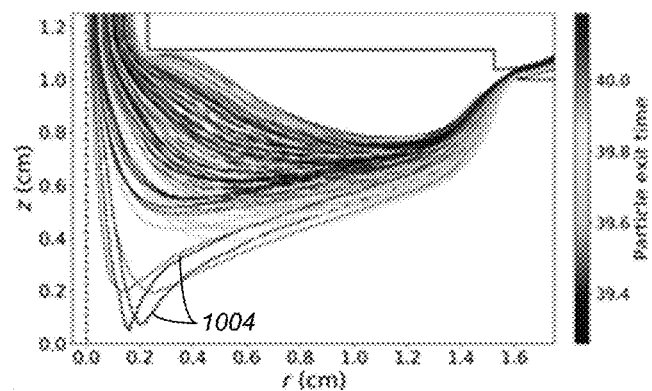
FIGS. 10A-10F illustrate simulated trajectories of 20.8 nm particles that were successfully transmitted during slow scans in accordance with one or more embodiments of the invention.
Figure 10B:
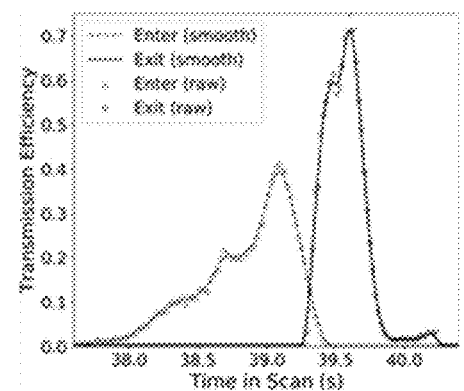
Figure 10C:
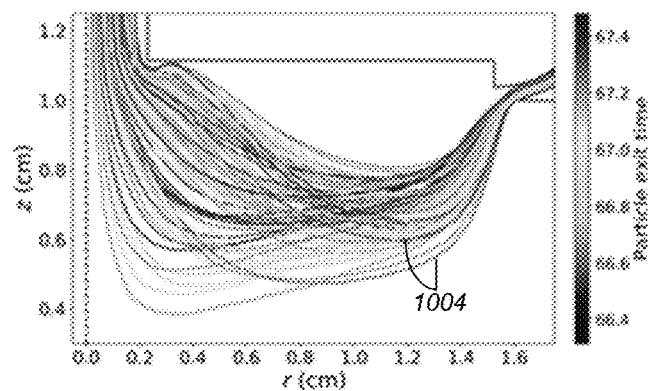
Figure 10D:
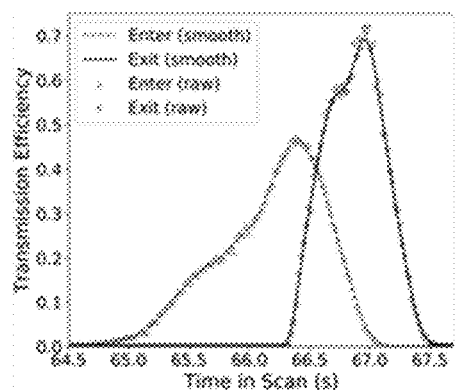
Figure 10E:
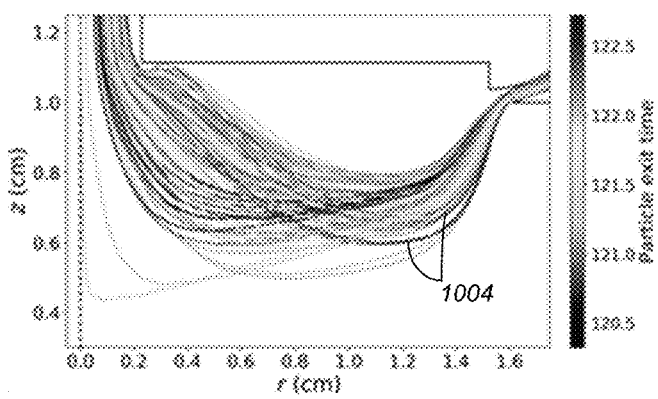
Figure 10F:
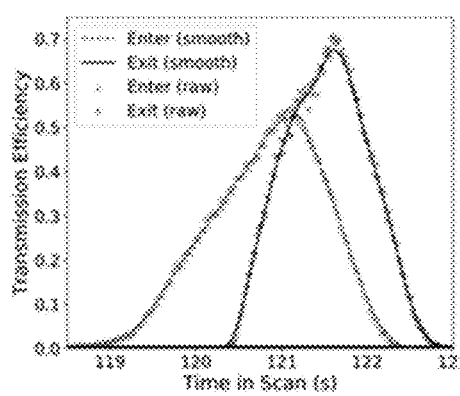

As the transmitted particles, rather the deposited ones, contribute to the classifier output signal, this section only describes the transmitted particle trajectories and the associated transfer function of the scanning ROMIAC. The times at which the transmitted particles enter and exit the scanning ROMIAC are recorded. FIGS. 7A-7F illustrate simulated trajectories of 20.8 nm particles that were successfully transmitted during fast $t_{ramp}$=(FIG. 7A) 3 s ($\rho_\tau$=0.91), (FIG. 7C)=6 s ($\rho_\tau$=1.82), and (FIG. 7E)=12 s ($\rho_\tau$=3.64) scans with the color/shade bar 702 denoting the time at which the particle exited the classification region. The corresponding up-scan transfer function are shown in (FIG. 7B) ($t_{ramp}$=3) $t_{ramp}$=3 s ($\rho_\tau$=0.91), (FIG. 7D) 6 s ($\rho_\tau$=1.82), (FIG. 7F) 12 s ($\rho_\tau$=3.64). FIGS. 7A and 7B show particle trajectories for the transmitted $D_p$=20.8 nm particles and the corresponding entrance and exit time distributions in the 3 s ($\rho_\tau$=0.91) up-scan, respectively. The particle trajectories are shaded by the time they leave the instrument (or particle exit time). FIGS. 7A-7F and FIGS. 8A-8F show the particle trajectories and the transfer functions for fast ($t_{ramp}$=3, 6, and 12 s; $\rho_\tau$=0.91, 1.82, 3.64) and slow ($t_{ramp}$=25, 50, and 100 s; $\rho_\tau$=7.58, 15.2, 30.3) up-scans, respectively. Specifically, FIGS. 8A-8F show simulated trajectories of 20.8 nm particles that were successfully transmitted during slow (FIG. 8A) 25 s ($\rho_\tau$=7.58), (FIG. 8C) 50 s ($\rho_\tau$=15.2), and (FIG. 8E) 100 s ($\rho_\tau$=30.3) up-scans; the color/shade bar 802 denotes the time at which the particle exited the classification region. The corresponding up-scan transfer functions are shown in FIG. 8B $t_{ramp}$=25, FIG. 8D $t_{ramp}$=50, FIG. 8F $t_{ramp}$=100 s.

The down-scan results are shown in FIGS. 9A-9F and 10A-10F for fast and slow scans, respectively. Specifically, FIGS. 9A-9F illustrate simulated trajectories of 20.8 nm particles that were successfully transmitted during fast $t_{ramp}$=(FIG. 9A) 3 s ($\rho_\tau$=0.91), (FIG. 9B) 6 s ($\rho_\tau$=1.83), (FIG. 9C), and (FIG. 9E) 12 ($\rho_\tau$=3.64) down-scans; the color bar denotes the time at which the particle exited the classification region. The corresponding down-scan transfer function are shown in (FIG. 9B) $t_{ramp}$=3, (FIG. 9D) $t_{ramp}$=6, (FIG. 9F) $t_{ramp}$=12 s. FIGS. 10A-10F illustrate simulated trajectories of 20.8 nm particles that were successfully transmitted during slow $t_{ramp}$=(FIG. 10A) 25 ($\rho_\tau$=7.58), (FIG. 10C) 50 ($\rho_\tau$=15.2), and (FIG. 10E) 100 ($\rho_\tau$=30.3) down-scans; the color bar denotes the time at which the particle exited the classification region. The corresponding up-scan transfer function are shown in (FIG. 10B) $t_{ramp}$=25, (FIG. 10D) $t_{ramp}$=50, (FIG. 10F) $t_{ramp}$=100 s.

The smoothed transfer functions in FIGS. 7A-F through FIGS. 10A-F 4.6—are obtained using locally-weighted regression and smoothing on the raw simulation data [Cleveland, 1979].

For 20.8 nm particles, the peak transmission efficiency increases from 0.4 to 0.5 as the scan time duration $t_{ramp}$ is increased from 3 s to 12 s, shown in FIG. 7. The peak transmission efficiency is around 0.6 for the slow $t_{ramp}$=25, 50 and 100 s ($\rho_\tau$=7.58, 15.2, and 30.3) conditions. For these slow scans, the transfer function contains only one mode. During both fast and slow up scans, particles that exit late in the scan (e.g., particle trajectories 704) tend to enter the ROMIAC classification region near the top boundary of the inlet. These particles also tend to leave the classification region near the center of the aerosol outlet. By contrast, those particles that exit early (e.g., particle trajectories 706) enter the classification region near the bottom boundary of the inlet. This particle trajectory pattern can be explained by the configuration of the ROMIAC. To avoid losses associated with the adverse potential gradient in DMAs, aerosol both enters and leaves the ROMIAC at the electrically grounded top electrode. The cross-flow enters from the bottom electrode (z=0 cm), and exits at the top electrode (z=1.14 cm). Thus, the counter-balanced electric force pushes particles away from the top electrode. As a result, particles that exit late are pulled towards the bottom electrode due to the high electric field strength late in the up-scan.

The down-scan transfer functions are distorted from the expected single-mode form, particularly for scan times of 6, 12, 25 and 50 s, as shown in FIGS. 9A-F and FIGS. 10A-F. This down-scan transfer function distortion can be explained with the corresponding particle trajectories. When $t_{ramp}$=25 s, the transfer function shows a long tail (FIG. 10B) that extends between 40.0 s and 40.5 s from the start of the scan, due to the late-exiting particles (e.g., (red) particle trajectories 1004). This group of particles first approaches the bottom, cross-flow inlet, permeable electrode within the classification region, and is then pushed toward the top, cross-flow outlet, permeable electrode as the electric field strength decreases in the down-scan. The rapid change of the electrostatic force leads to the abrupt change in particle motion in the z-direction, with particle trajectories initially approaching the bottom electrode but then reversing direction to exit through the classified aerosol outlet at the top. This effect is significant when $t_{ramp}$=6 and 12 s, with large fraction of "reverse" particle trajectories.

Mean Trajectory of Scanning ROMIAC

Figure 11A:
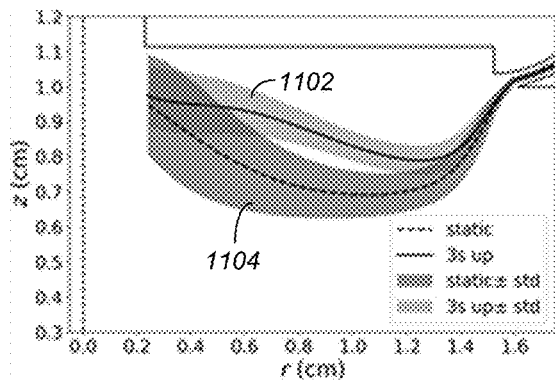
FIGS. 11A-F show the mean trajectories of the transmitted $D_p$=20.8 nm particles, and corresponding standard deviations for fast scans in accordance with one or more embodiments of the invention.
Figure 11B:
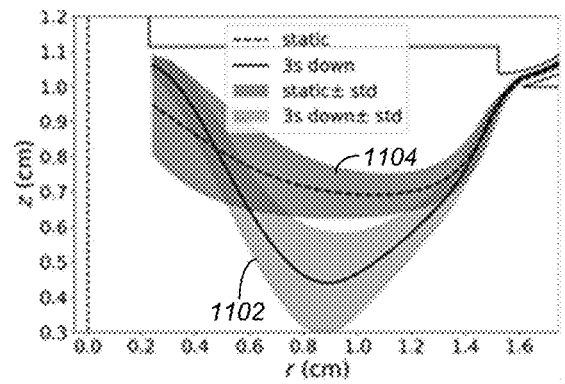
Figure 11C:
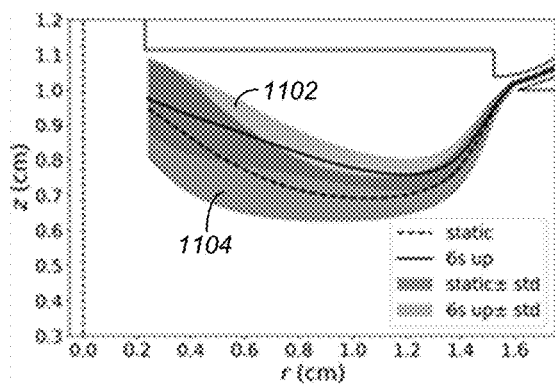
Figure 11D:
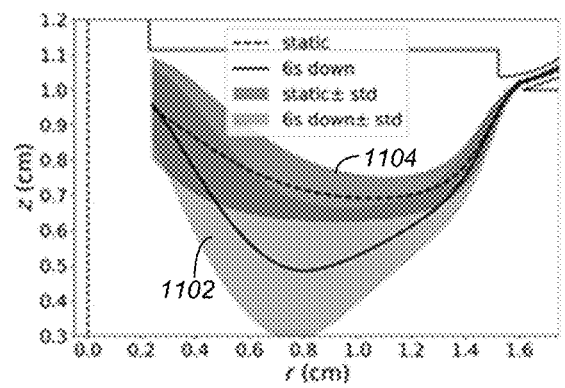
Figure 11E:
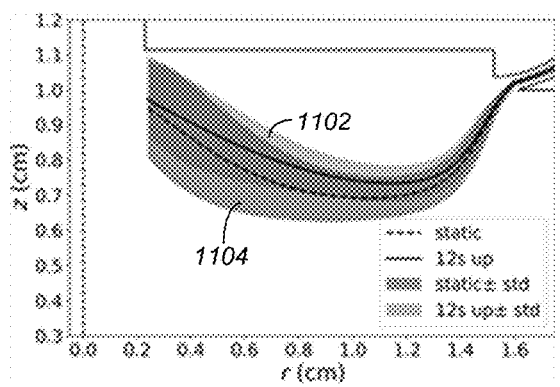
Figure 11F:
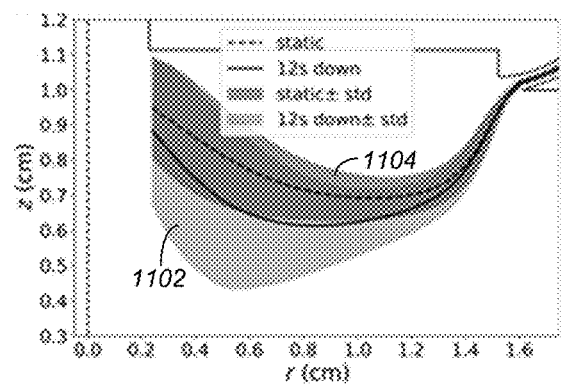
Figure 12A:
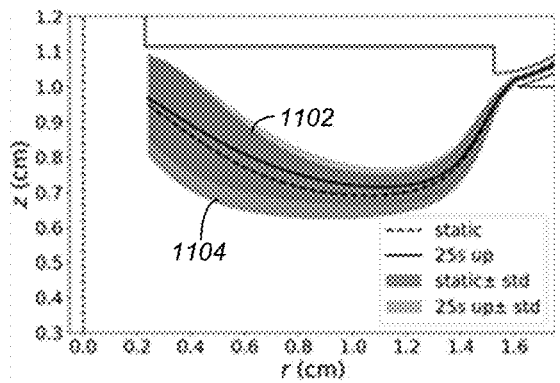
FIGS. 12A-F show the mean particle trajectories and corresponding standard deviations for 20.8 nm particles transmitted during slow scans in accordance with one or more embodiments of the invention.
Figure 12B:
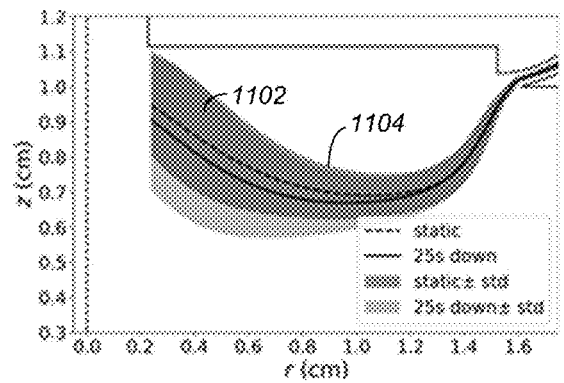
Figure 12C:
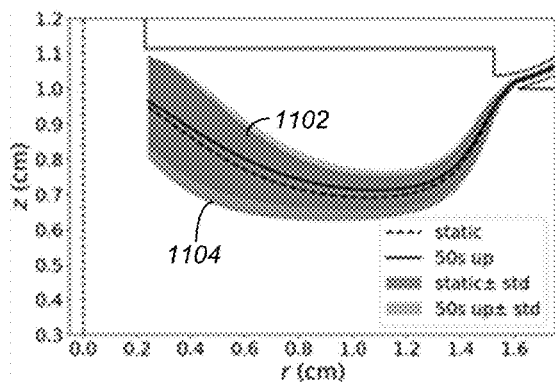
Figure 12D:
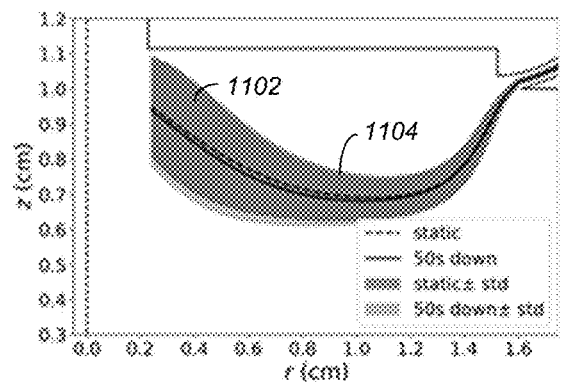
Figure 12E:
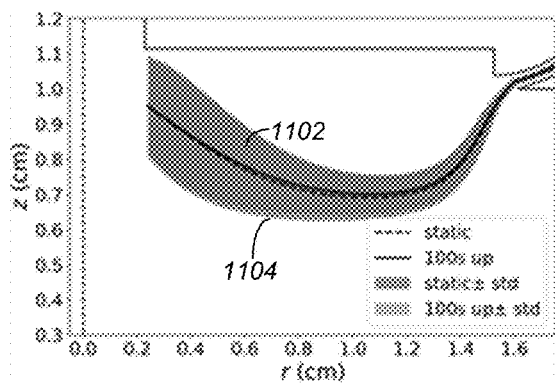
Figure 12F:
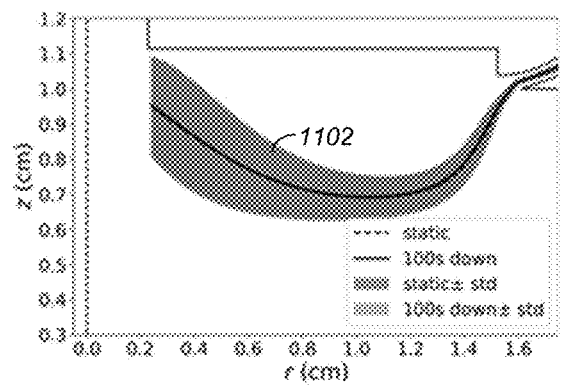
Figure 13A:
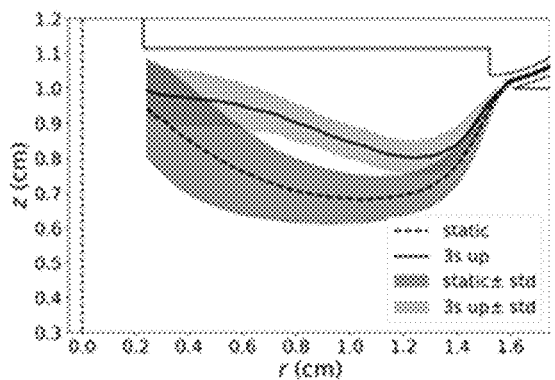
FIGS. 13A-F illustrate mean particle trajectories and corresponding standard deviations for 2.67 nm particles that were successfully transmitted during fast scans in accordance with one or more embodiments of the invention.
Figure 13B:
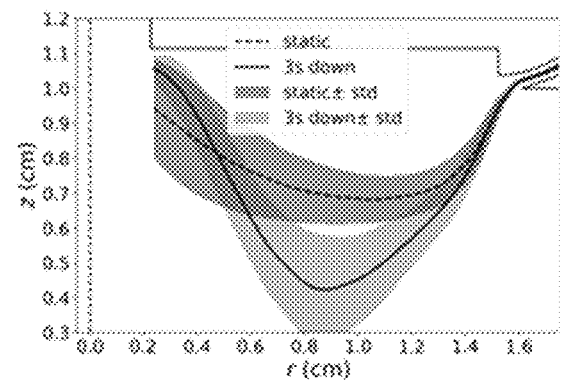
Figure 13C:
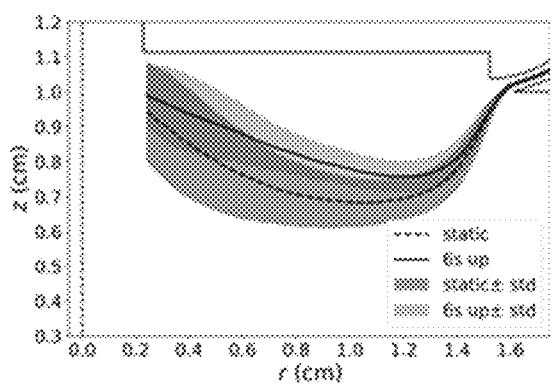
Figure 13D:
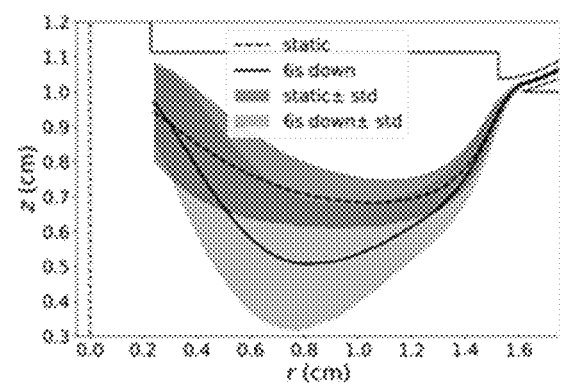
Figure 13E:
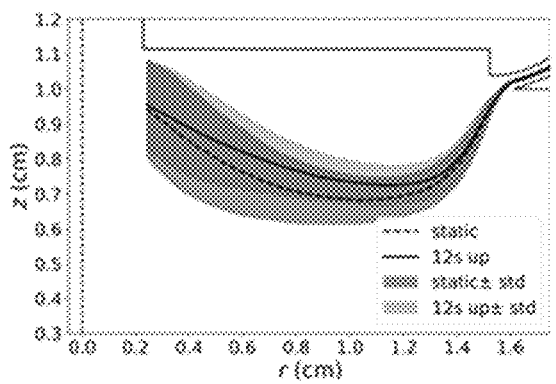
Figure 13F:
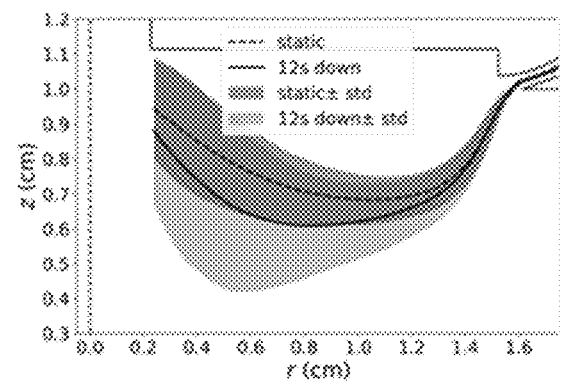
Figure 14A:
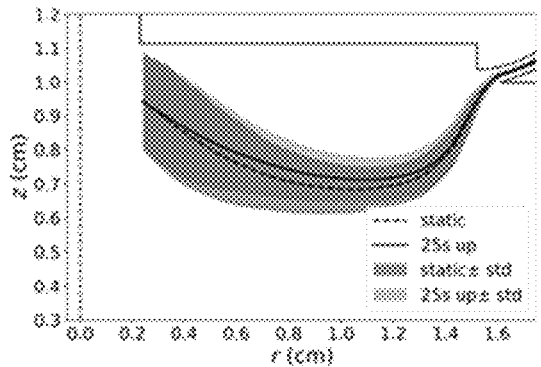
FIGS. 14A-F illustrate mean particle trajectories and corresponding standard deviations for 2.67 nm particles that were successfully transmitted during slow scans in accordance with one or more embodiments of the invention.
Figure 14B:
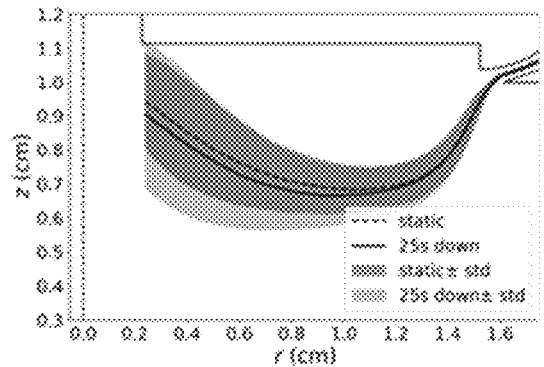
Figure 14C:
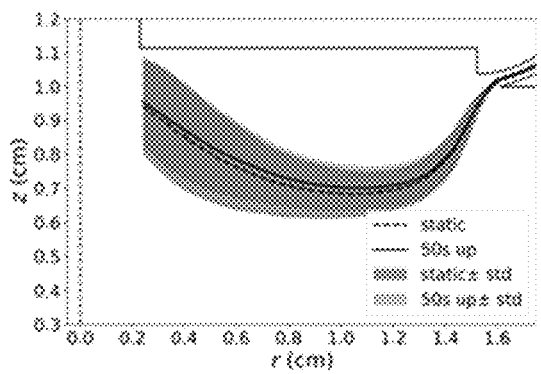
Figure 14D:
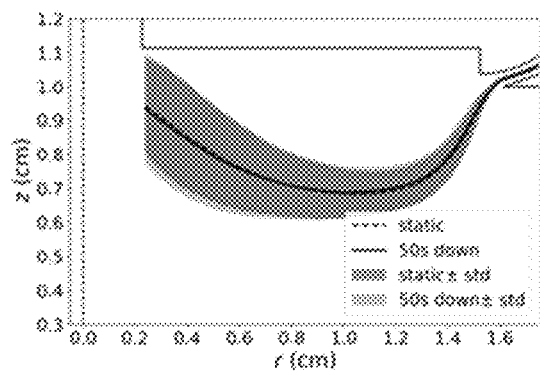
Figure 14E:
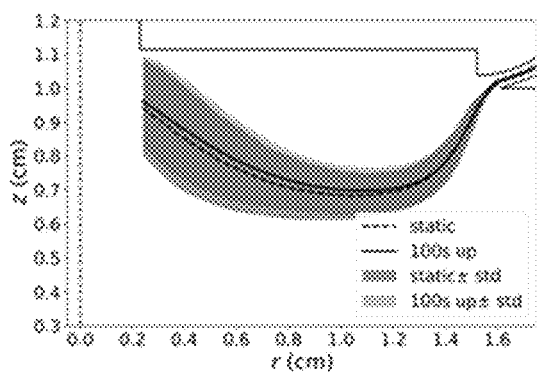
Figure 14F:
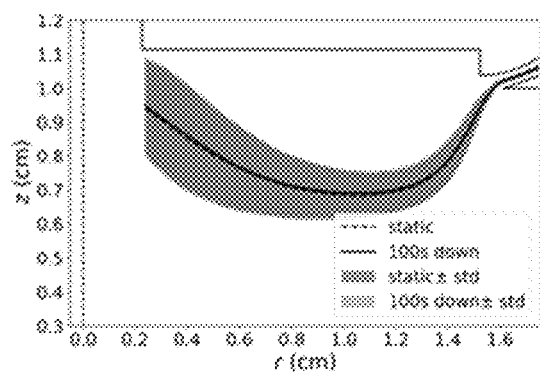

FIGS. 11A-F and FIGS. 12A-F show the mean trajectories (solid lines) of the transmitted $D_p$=20.8 nm particles, and the corresponding standard deviations (shaded areas 1102) for the fast and slow scans, respectively. In the fast up-scan, as shown in FIGS. 11A, 11C, and 11E, the mean particle trajectories are close to the top electrode due to the low electric field strength when the transmitted particles enter the classification region, particularly for $t_{ramp}$=3 s. By contrast, the mean particle trajectory is close to the bottom electrode for the fast down-scan, as shown in FIGS. 11B, 11D, and 11F. The mean particle trajectories in stepping-mode measurements are also shown for comparison. In this regard, the mean particle trajectories (dashed lines) and corresponding standard deviations (shaded area 1104) are illustrate in FIGS. 11A-11F. As expected, the mean particle trajectory during scanning approach that during stepping mode when the scan is slow (large $t_{ramp}/\tau_s$). This is clearly shown in FIGS. 12E and 12F for $t_{ramp}$=100 s during up- and down-ramps, respectively; in these very slow scans, the scanning-mode trajectory overlaps with that during stepping-mode (constant voltage) classification (i.e., the shading 1102 and 1104 overlap with increasing overlap as the scans increase in time).

Referring now to FIGS. 16A-16F, introduction of the sample flow into the classification region asymmetrically, i.e., through a port 1106, and extraction of the classified sample through a second port 1108 that is positioned closer to the cross-flow outlet permeable electrode 1110 than to the cross-flow inlet electrode 1112, allows particles to move along these highly curved trajectories and reach the classified sample outlet flow without contacting or being lost to either of the permeable electrodes. In the embodiment of the invention examined in these studies, both the sample inlet and the classified sample outlet flows are introduced through ports 1106 and 1108, respectively, on the cross-flow outlet 1110 side of the channel. In other embodiments of the invention, the sample inlet port 1106 and outlet flow port 1108 are placed on the cross-flow inlet 1112 side of the classification channel, or the sample inlet and outlet flows may be introduced on different sides of the classification channel, with the sample inlet flow 1106 introduced on the cross-flow-inlet side 1112 (or cross-flow-outlet side 1110), and the sample outlet flow 1108 exiting through a port on the cross-flow-outlet side of the channel 1110 (or cross-flow-inlet side 1112). Other asymmetric positioning of one or both of the sample flow ports 1106 and 1112 may be employed in other embodiments of the invention to achieve the asymmetry that allows space for the curved particle trajectories to transit from the sample inlet to the classified sample outlet without, or with minimal deposition on either of the permeable electrodes.

The standard deviation of the mean up-scan trajectory is smaller than that during the down-scan. We attribute this behavior to "reverse" particle trajectories that since the reversal increases the variability of the transmitted particle trajectories, which exacerbates the distortion of the down-scan transfer function. The increased variability in the mean particle trajectory is significant for $t_{ramp}$=6, 12 s ($\rho_\tau$=1.82, 3.64) down-scan operation, as shown in FIGS. 11D and 11F. Instrument design also contributes to the asymmetry in the ROMIAC transfer function between up- and down-scans, as the polydisperse aerosol is introduced close the top, cross-flow outlet electrode, thereby constraining the particle trajectories during up-scans.

The mean trajectory is also shown for the diffusive particles, i.e., ones with 2.67 nm electrical mobility equivalent diameter for both fast and slow scans in FIGS. 13A-F and FIGS. 14A-F, respectively. Specifically, FIGS. 13A-F illustrate mean particle trajectories (solid lines) and corresponding standard deviations (shaded area) for 2.67 nm particles that were successfully transmitted during fast $t_{ramp}$=(FIG. 13A) 3 s ($\rho_\tau$=0.91), (FIG. 13B) 6 s (1.82), and (FIG. 13E) 12 s (3.64) scans. For comparison, trajectories (dashed lines) and corresponding standard deviations (darker shaded area) from steady-state operation are plotted for each scan time rate. FIGS. 14A-F illustrate mean particle trajectories (solid lines) and corresponding standard deviations (lighter shaded area) for 2.67 nm particles that were successfully transmitted during slow $t_{ramp}$=(FIG. 14A) 25 s ($\rho_\tau$=7.58), (FIG. 14C) 50 s ($\rho_\tau$=15.2), and (FIG. 14E) 100 s ($\rho_\tau$=30.3) scans. For comparison, trajectories (dashed lines) and corresponding standard deviations (darker shaded area) from steady-state operation are plotted for each scan time scale.

As illustrated, the mean trajectory of the 2.67 nm diameter particles is less smooth less than that of 20.8 nm particles due to increased particle diffusion.

Average Transmission Efficiency of ROMIAC and DMA

Counting statistics, a major source of uncertainty in size distribution measurements, are aggravated by low transmission efficiencies at small particle size that result from diffusional losses in the entrance and exit regions of either the ROMIAC or the DMA. Any increase in the overall probability that the particles of given size are transmitted into the classified sample reduces this uncertainty by increasing the downstream particle counts. The average transmission efficiency is defined as the integral over the entire duration of the voltage ramp of the instantaneous fraction of particles that are transmitted, normalized with respect to the ramp time, $t_{ramp}$ $$\bar{\eta}(Z_p t_{ramp}) = \frac{\mathcal{R}_{nd} \int_0^{t_{end}} \Omega^I(Z_{ramp}(D_{p,\phi}), t) dt}{t_{ramp}} \quad \text{EQ. 4}$$

where $\Omega^I(Z_p(D_p), \varphi), t)$ is the instantaneous classifier transfer function (either up-scan or down-scan) for the scan classifier, and $t_{end}=t_{low}+t_{ramp,u}+t_{high}+t_{ramp,d}$. $R_{nd}$ is the non-diffusive resolution, defined as $R_{nd}=[\beta(1+|\delta|)]^{-1}$ [Flagan, 1999]. For the ROMIAC, $\beta=(Q_{a,in}+Q_{a,out})/(Q_{c,in}+Q_{c,out})$, $\delta=(Q_{a,out}-Q_{a,in})/(Q_{a,out}+Q_{a,in})$. For the DMA, $\beta=(Q_a+Q_c)/(Q_{sh}+Q_{ex})$, $\delta=(Q_c-Q_a)/(Q_c+Q_a)$ where $Q_a$, $Q_s$, $Q_{sh}$ and $Q_e$ are the aerosol inlet, aerosol outlet, sheath in and excess out flow rates in DMA. The average transmission is normalized with the scanning time duration $t_{ramp}$ since, in a long scan (increased $t_{ramp}$), the number of transmitted particles is also increased. The non-diffusive classifier resolution $R_{nd}$ also needs to be taken into account, since low resolution results in a broad transfer function, at least for stepping-mode operation, and increases the overall particle transmission efficiency. The transfer function can be determined from simulations of the particle trajectories, with the integral $\int_0^{t_{end}} \Omega^I(Z_p(D_p), \phi), t) dt$ being approximated by the summation based on Eq. 4:

$$\int_0^{t_{end}} \Omega^I(Z_p(D_p), \phi), t) dt \approx \frac{Q_{a,out}}{Q_{a,in} N_{a,in}} \sum_0^{t_{end}} N_{a,out}(t) \delta t = \quad \text{EQ. 5}$$

$$\frac{Q_{a,out} N_{transmitted} \delta t}{Q_{a,in} N_{a,in}},$$

where $N_{transmitted}$ is the total number of the transmitted particles in the simulation, and $\delta t$ is the time step of particle release in the simulation.

Figure 15A:
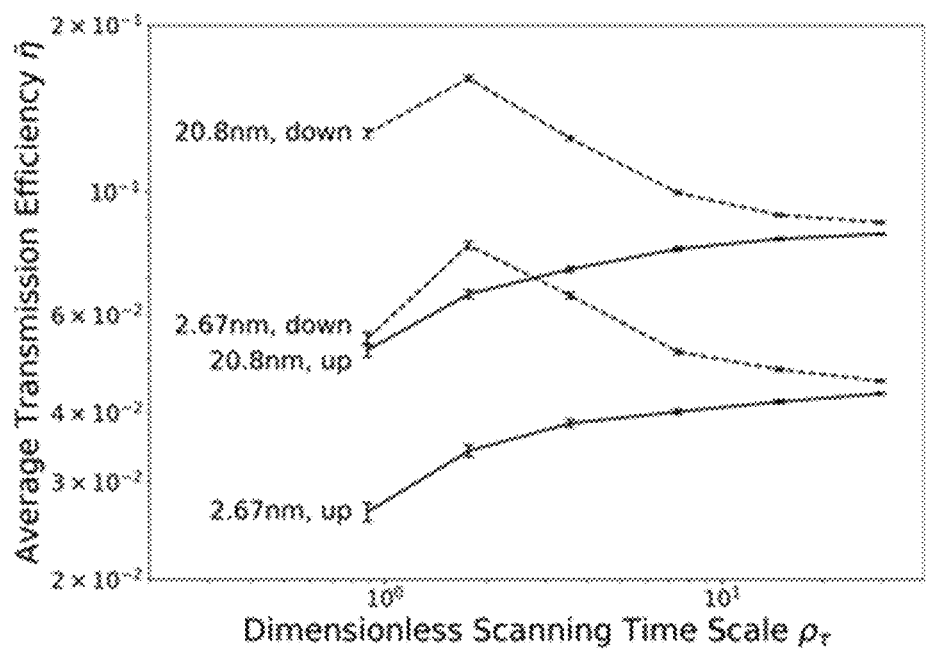
FIGS. 15A and 15B illustrate the average transmission efficiency $\bar{\eta}$ variation with the dimensionless scan time in accordance with one or more embodiments of the invention.
Figure 15B:
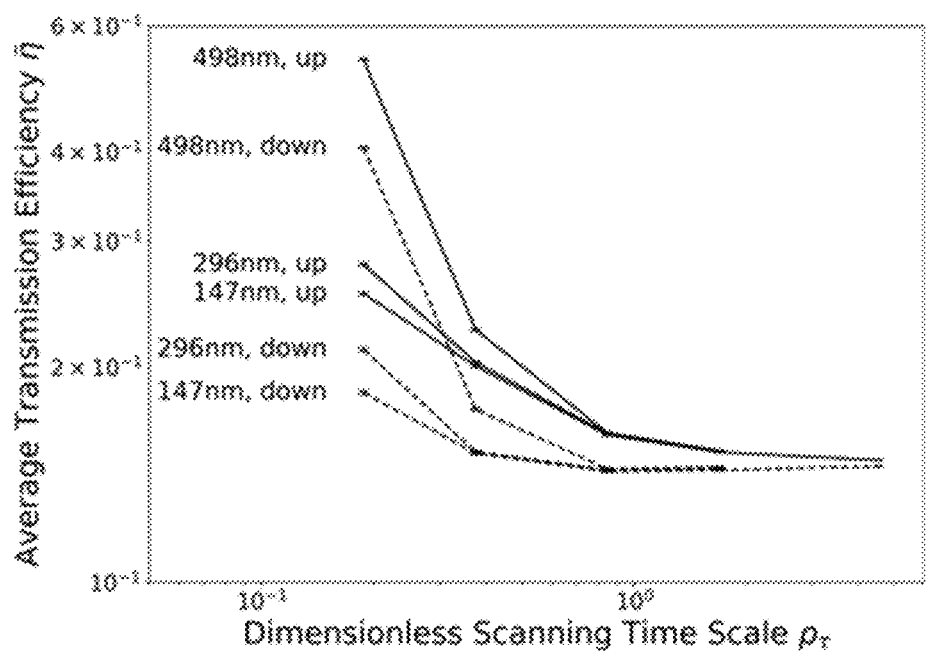

FIGS. 15A and 15B show the average transmission efficiencies for the OMAC (FIG. 15A) and the DMA (FIG. 15B), respectively, as a function of the dimensionless scan time scale, $\rho_\tau$.

For the ROMIAC, $V_{class}=\pi(R_2^2-R_1^2)b$, where R=1.613 cm and b=1 cm are the radius and the gap between two electrodes, respectively, and $Q_{class}=(Q_{a,in}+Q_{a,out})/2$. For the DMA, the volume of the classification region is $V_{class}=\pi(R_2^2-R_1^2)L$, and the effective flow rate is $Q_{class}=Q_a+Q_{sh}=Q_c+Q_{ex}$.

Figure 16A:
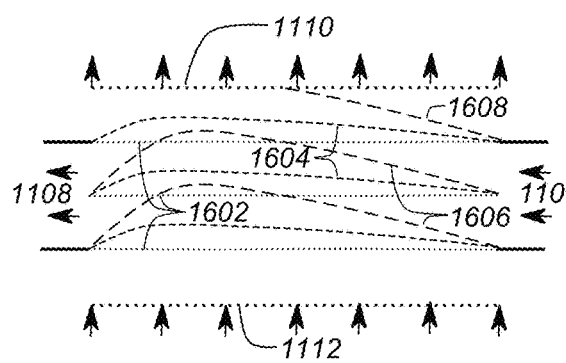
FIGS. 16A-16F illustrate the conceptual particle trajectories to illustrate the effects of scanning on the transmission efficiency in the scanning OMAC up scan and down scan in accordance with the prior art and one or more embodiments of the invention, and the scanning DMA up scan and down scan.

FIGS. 15A and 15B illustrate the average transmission efficiency $\bar{\eta}$ variation with the dimensionless scan time, $\rho_\tau=\tau_s/\tau_R$ for (FIG. 15A) the ROMIAC and (FIG. 15B) the DMA. Note that the absolute magnitude of the transmission efficiencies inn the ROMIAC and DMA cannot be directly compared due to differences in the range of times during which particles enter or exit the ROMIAC as compared to the DMA. Solid lines show up-scan results, while dashed lines show down-scan results. As illustrated, FIG. 15A shows the average transmission efficiency $\bar{\eta}$ for two different particle sizes, $D_p=2.67$ and 20.8 nm, with scan durations $t_{ramp}$ ranging from 3 s ($\rho_\tau=0.89$) to 100 s ($\rho_\tau=29.6$) for both up- and down-scans. For 20.8 nm singly-charged particles, the average transmission efficiency, $\bar{\eta}$, is consistently higher than that for 2.67 nm singly-charged particles due to the lower particle diffusivity of the 20.8 nm particles. The up-scan (down-scan) transmission efficiency of the ROMIAC decreases with decreasing $\rho_\tau$ since a large fraction of the particles deposit on the cross-flow outlet (inlet) electrode during fast scans (small $\rho_\tau$), as shown in FIG. 16A. The counter-balanced cross-flow and the electrical migration make it possible for particles to impinge on the electrode during a scan, even without diffusion.

FIGS. 16A-16F illustrate the conceptual particle trajectories to illustrate the effects of scanning on the transmission efficiency in the scanning OMAC of prior-art design in which the sample flow enters 1106 and the classified sample flow 1108 exits the classification region symmetrically with respect to the permeable cross-flow inlet 1112 and cross-flow outlet 1110 electrodes during (FIG. 16A) up scan and (FIG. 16B) down scan operation, and of one or more embodiments of the invention on which the sample entrance and exit flows are positioned asymmetrically with respect to the two permeable electrodes during (FIG. 16C) upscan and (FIG. 16D) downscan operation, and the scanning DMA (FIG. 16E) up scan and (FIG. 16F) down scan. In the limit of constant-voltage operation of the OMAC of the prior-art (FIG. 16A), the aerodynamic drag forces on particles are of mobility Z* are exactly balanced by the electrostatic force that acts in the opposite direction owing to the applied electric field, causing the particles to be carried parallel to the permeable electrodes by the small sample flow that passes from the sample entrance 1106 to the sample exit 1108, following trajectories 1602. During a slow, increasing-voltage scan (up-scan), particles initially migrate more slowly toward the cross-flow inlet electrode 1112 along trajectories 1604 than during the constant voltage operation of the prior art, but migration increases as the voltage rises during the scan, allowing particles to reach the classified aerosol outlet flow 1108.

In the prior art embodiment of the OMAC with symmetric introduction and extraction of the sample flows with respect to the permeable electrodes, here illustrated with the entrance occupying a portion of the space between the two electrodes in order to avoid electrical breakdown of the gas during high voltage operation, extremely slow scans may allow efficient transmission of particles as they migrate along trajectories 1604. However, during fast scans of the prior art OMAC, some of the particle trajectories 1608 intersect with the cross-flow outlet electrode during up-scans, causing them to be lost from the classification region. During the decreasing-voltage, down-scan of the prior art OMAC FIG. 16B, the high initial voltage causes particles to first migrate toward the cross-flow inlet electrode 1112. In slow scans most particles may escape deposition as they follow trajectories 1604, but in fast scans, some particles will migrate to the cross-flow inlet electrode 1112, where they will be lost from the classification region.

Figure 16B:
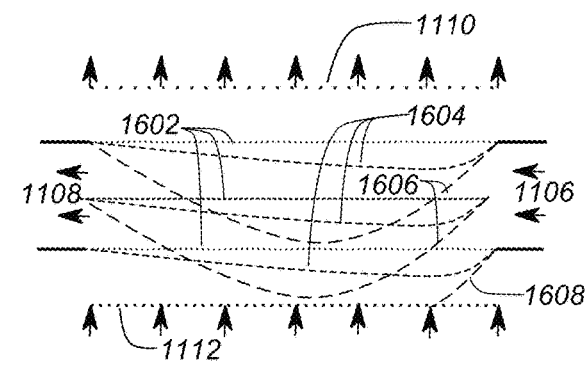
Figure 16C:
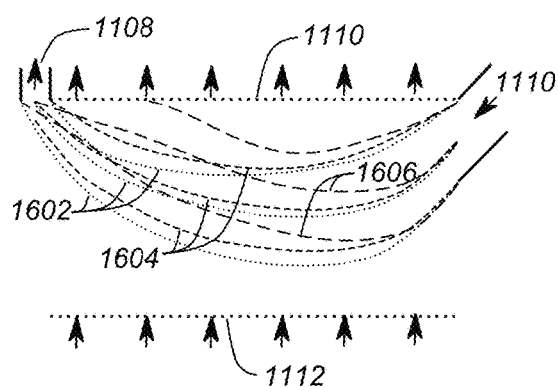
Figure 16D:
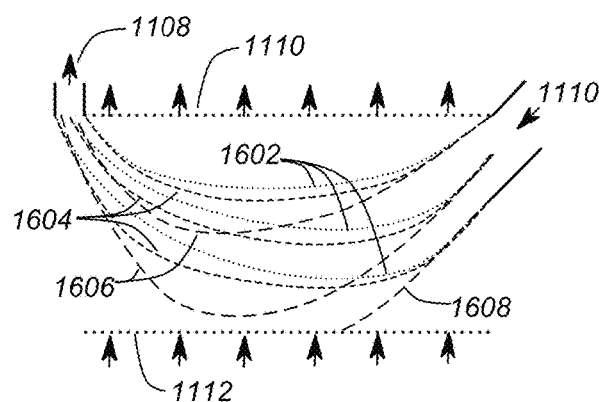

With the asymmetric positioning of the sample inlet 1106 and outlet 1108 flows of the invention FIG. 16C and FIG. 16D, in steady-state, particles follow curved trajectories 1602. For a slow up-scan FIG. 16C, particle trajectories 1604 flatten and shift toward the cross-flow outlet electrode 1110. For a fast up-scan, particles shift further toward electrode 1110, and some particles may intersect that electrode and be lost as they follow trajectories 1606. During down-scan operation FIG. 16D, particles initially migrate toward cross-flow inlet electrode 1112, but then reverse direction toward cross-flow outlet electrode 1110. For slow scans, the deviation of the particle particles may migrate across the channel along trajectories 1606. Some particles may follow trajectories 1608 that intersect with the cross-flow inlet electrode 1112 and be lost. During ROMIAC down-scans, the average transmission efficiency $\bar{\eta}$ increases as $t_{ramp}$ decreases from 100 s ($\rho_\tau=30.3$) to 6 s ($\rho_\tau=1.82$)

because the particle is introduced close to the upper electrode, allowing particles that enter over a wide range of times to be transmitted through the classifier owing to the large distance between the polydisperse sample inlet and the lower electrode. However, $\bar{\eta}$ decreases as $t_{ramp}$ decreases further from 6 s ($\rho_\tau$=1.78) to 3 s ($\rho_\tau$=0.91), since the lower electrode then becomes a constraint for the particle transmission, as shown in FIG. 16B. In contrast, the average transmissions for up- and down-scans asymptotically approaches that for constant voltage as the scan slows. For $D_p$=20.8 nm particle, $\bar{\eta}$=0.084 and 0.088 for slow up- and down-scan ($t_{ramp}$=100 s, $\rho_\tau$=29.6). For $D_p$=2.67 nm particle, $\bar{\eta}$=0.045 and 0.046 for slow up- and down-scan ($t_{ramp}$=100 s, $\rho_\tau$=29.6).

Figure 16E:
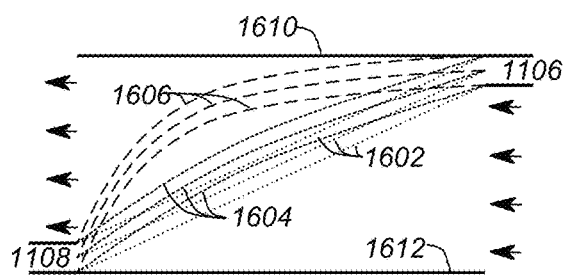
Figure 16F:
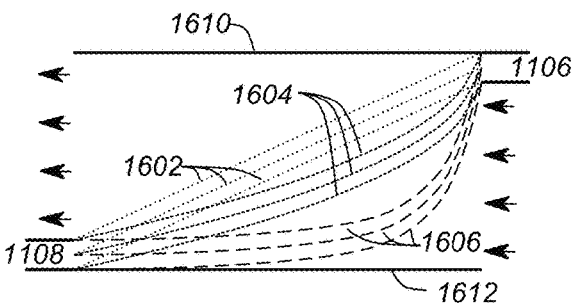

For comparison, one may also examine the average transmission efficiency for the widely-used DMA, as illustrated in FIG. 15B for three different, non-diffusive particle sizes, $D_p$=147, 296, 498 nm. Referring to FIGS. 16E and 16F, as with the ROMIAC, at constant voltage the particles follow trajectories 1602 that are confined to a narrow region within the space between the solid impermeable electrodes 1610 and 1612, corresponding to the flow rate ratio β.

In contrast, even with the same flow rate ratio, the particle trajectories occupy a larger fraction of the space between the permeable electrodes of the OMAC/OMIAC/ROMIAC. The narrow band of trajectories in the DMA increases its sensitivity to diffusion and, therefore, requires operation at higher voltages than for the OMAC. However, because particles quickly move from away from the electrode 1610 near the sample entrance 1612 and do not approach the counter electrode 1614 until they are near the sample extraction port 1616, diffusion degrades the resolution during steady-state or slow scan operation. However, during fast scans, particle trajectories remain close to electrode 1610 for an extended time during the up-scan, and to electrode 1614 during the down-scan, allowing diffusion to decrease transmission efficiency of small, diffusive particles during fast scans. The mean transmission efficiency of the DMA, $\bar{\eta}$, approaches the stepping-mode limit for slow scans, with the penetration efficiencies $\bar{\eta}$ ranging from 0.144 to 0.152 for the different particle sizes in the 240 s scan ($\rho_\tau$=4.51). The average transmission efficiency increases as the DMA scan is accelerated because some of the particles are transmitted during the transition between the ramp period and the constant-voltage periods at the beginning and end of the measurement cycle. This effect is observed at $\rho_\tau$<1 in the scanning DMA; the ROMIAC scans discussed above were relatively slow, $\rho_\tau$>0.89, though the absolute scan times are as short as 3 s owing to the different size/mobility range probed. As a result, any enhancement in the transmission efficiency of the ROMIAC should be small due to short residence time $\tau_R$ within the scanning ROMIAC under the conditions of the present embodiment. The differences in the transmission efficiency values of the DMA and the ROMIAC arise from differences in the range of during which successfully-classified particles of a given mobility enter or leave the classification regions of the two kinds of instruments.

In view of the above, embodiments of the invention utilize a sample flow distribution input channel and sample flow distribution output channel that are located asymmetrically with respect to a center of the classification channel such that trajectories of the one or more particles in the sample fluid deviate from constant voltage operation trajectories.

Conclusions

Embodiments of the invention demonstrate that the ROMIAC can be scanned enabling rapid classification of sub-nanometer particles approaching the molecular region. The trajectory of transmitted particles were simulated using Brownian dynamics, with the flow- and electric fields calculated with finite-element simulations; the results of these simulations provided the scanning ROMIAC transfer functions for both increasing and decreasing voltage scans. Distortions of the scanning ROMIAC transfer function from that at constant voltage, and asymmetric performance between up- and down-scans were determined using the individual trajectories of the transmitted particles.

Despite the non-ideality of the instrument transfer function, this analysis shows the scanning ROMIAC is able to classify particles in very fast scans, i.e., with $t_{ramp}$=3 s (corresponding to $\tau_s$=0.44 s, $\rho_\tau$=0.91), aided by the short residence time within the instrument. Thus, the scanning ROMIAC can measure the nanometer particles when high time-resolution is desired, as in atmospheric nucleation experiments or flight measurements.

Scanning Opposed Migration Aerosol Classifier (OMAC) System and Data Inversion

Overview

Embodiments of the invention provide a scanning opposed-migration ion and aerosol classifier that minimizes the efficiency loss of operating with scanning voltage without complicating the OMIAC design with the addition of spatial variations of the voltages applied to the two electrodes or of the cross-flow velocities. The resulting instrument maintains the simplicity of the constant voltage OMIAC while attaining the improved time response and duty-cycle afforded by continuously scanning the voltage and continuously counting particles. This improvement was enabled by detailed understanding of the trajectories of particles as they travel through the OMIAC while the voltage difference between the electrodes is continuously varied with time. That understanding was enabled by detailed numerical simulations of the flow fields, time varying electric fields, and particle trajectories within a radial flow version of the OMIAC, which was labeled the ROMIAC.

As described above, extensive numerical simulations revealed that the particle trajectories vary dramatically from particles that leave the classifier early in a scan to those that leave late, and that, owing to the nature of the sample entrance and exit designs, particles that enter the classifier at different times can exit, and be counted, at the same time. Scans with the voltage varying in an exponential ramp between 10 V and 9800 V (either increasing—up-ramp, or decreasing—down-ramp) were examined, with ramp times ranging from 100 s to as little as 3 s. These simulations revealed that the performance of the Scanning-ROMIAC was better than anticipated, with in peak transmission efficiency declining less than a factor of two, even in the fastest scans.

The Scanning-ROMIAC was implemented in the laboratory using the ROMIAC that was originally designed for static voltage operation and a two-stage condensation particle counter to detect particles in the 1.3 to 16 nm size range. The slow response of the CPC that was available caused us to limit the scan time to 50 s over the range from 20 V to 5000 V. To enable quantitative size distributions to be obtained from experimental scans, the instrument response function was determined in two ways: (i) using the simulation results, and (ii) from experimental calibration data. The resulting measurements showed close agreement between the two forms of the instrument response functions.

The scanning-ROMIAC has been used to measure the dynamics of the ultrafine aerosol in an environmental chamber that is used to elucidate the development of photochemical smog, and to determine how much of organic vapor present in the air ends up as so-called secondary organic aerosol as a result of those reactions. The scanning-ROMIAC provided the first estimates of the rates at which ultrafine (2-10 nm diameter) particles are lost to the chamber walls. This information is critical to obtaining rates of new-particle formation and growth from these experiments.

In view of the above, embodiments of the invention provide a new method and system for retrieval of the particle size distributions from scanning differential mobility measurement data. Embodiments of the invention derived the transfer function for the scanning differential mobility analyzer (DMA) by using finite element calculations to obtain the flow field and electric field within a real DMA, and then simulating particle trajectories within the instrument during scanning mobility measurements. That transfer function was integrated with an empirical model of the time response of a condensation particle counter (CPC) detection. The integrated DMA-CPC instrument response was validated with the experimentally measured instrument responses to monodisperse polystyrene latex (PSL) calibration particles. Although the simulated scanning mobility analyzer transfer function proved very effective at recovering the particle size distributions, the use of Brownian dynamics simulations renders the method impractical for routine use due to the high computational cost. Moreover, measuring the instrument response for a wide range of monodisperse PSL particles is also costly. While generating monodisperse aerosols may not be practical, a polydisperse aerosol can be generated in a number of ways, such as atomizing the salt solution, evaporation and condensation of semi-volatile or even refractory material in a furnace, or evaporation of metal from a hot wire. Any such stable source of particles can then be used with a tandem differential mobility classifier system to empirically deduce the integrated instrument transfer functions as will be shown in the chapter. Traditionally, differential mobility analyzers (DMAs) are employed in such tandem systems, but embodiments of the invention employ an alternate form of classifier such as the ROMIAC.

The tandem differential mobility analysis protocol of embodiments of the invention has been well established for DMA calibration and other instrument characterization studies, but embodiments of the invention deduce the instrument response function with sufficient fidelity to enable data inversion directly from the experimental results. The method for determining the instrument response function, and for extracting particle size distribution distributions involves the following steps: (i) measure the instrument response using mobility-classified particles from a polydisperse aerosol with known size distribution; (ii) compute the kernel for the size distribution inversion based on the data from step (i).

Embodiments of the invention demonstrate this method by determining the integrated instrument response function of the scanning ROMIAC (radial opposed migration ion and aerosol classifier, [Mui, Thomas, et al. (2013)] and [Mui, Mai, et al. (2017)] system. The polydisperse aerosol for measuring the instrument response is generated by heating a Nichrome wire to sufficiently high temperature that some of the wire material vaporizes and then forms particles as the vapors are cooled by the surrounding gas (hot wire particle source).

Methods

Scanning ROMIAC Size Distribution Measurement System

Figure 17:
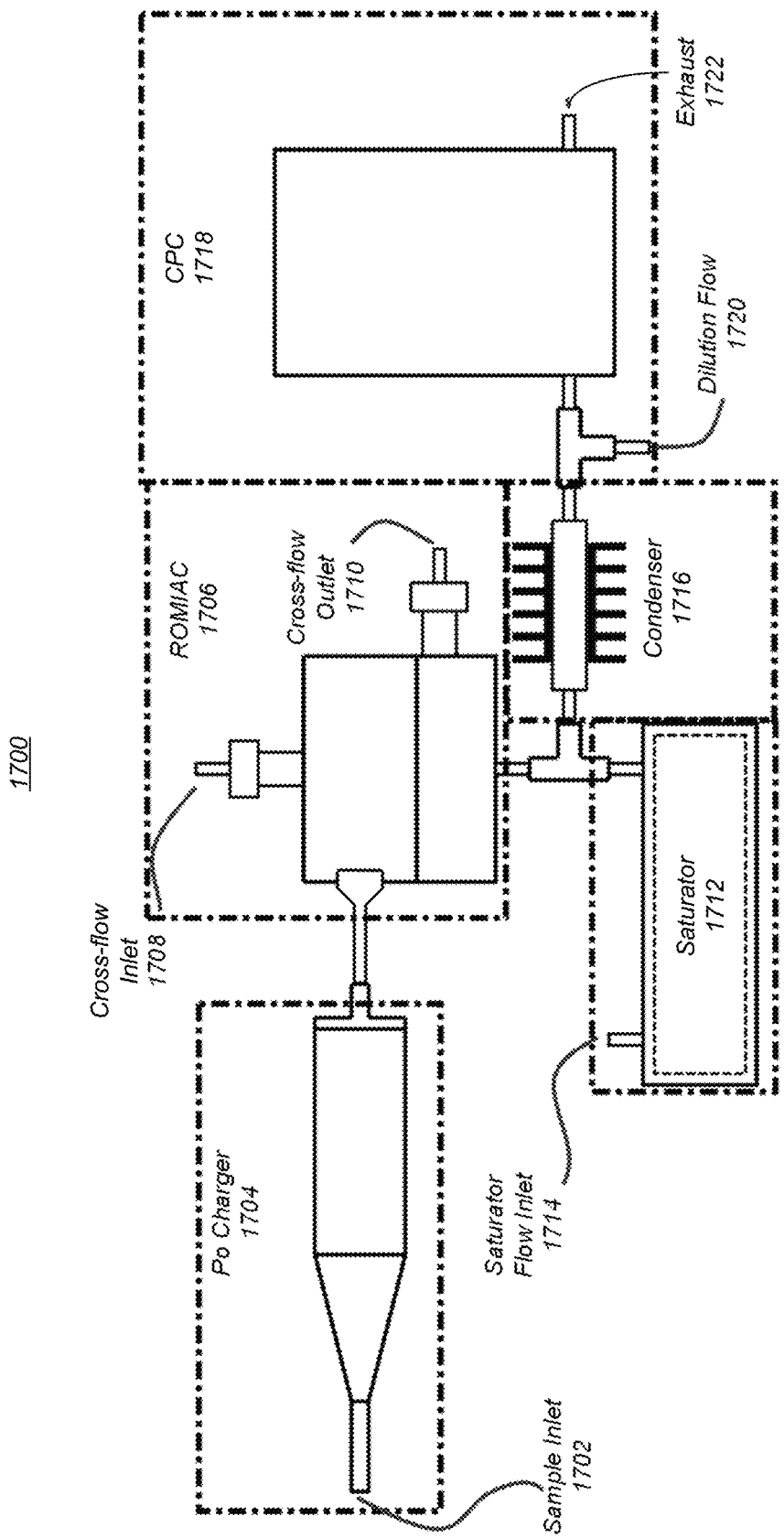
FIG. 17 shows an experimental system used for scanning ROMIAC particle size distribution measurement in the range of 1-20 nm in accordance with one or more embodiments of the invention.

FIG. 17 shows an experimental system used for scanning ROMIAC particle size distribution measurement in the range of 1-20 nm. See U.S. Pat. No. 6,567,157 which is incorporated by reference herein for a further description. Specifically, FIG. 17 illustrates an exemplary schematic of a scanning ROMIAC system with a two-stage CPC 1700 as the particle detector. The sample is passed through the sample inlet 1702 of the Po charger 1704 where the sample is then fed into the ROMIAC 1706. As described above, the cross-flow fluid is passed through inlet 1708 and flows out via outlet 1710.

The saturator 1712 in the first stage is used to provide diethylene glycol (DEG) vapor (received via saturator flow inlet 1714) for particle activation in the ROMIAC 1706. The particle size increases in the downstream condenser 1716 due to the DEG vapor condensation.

The ROMIAC 1706, which is described in detail in [Mui, Thomas, et al. (2013)] and [Mui, Mai, et al. (2017)], is used as the particle classifier in embodiments of the invention. The operating parameters of the ROMIAC 1706 are given in Table 3:

TABLE 3

Operation parameters of the scanning OMAC (balanced flow)

| Parameter | Notation | Value |
|---|---|---|
| Polydisperse flow rate (LPM) | $Q_{a,\,in}$ | 1.00 |
| Monodisperse flow rate (LPM) | $Q_{a,\,out}$ | 1.00 |
| Incoming cross-flow flow rate (LPM) | $Q_{c,\,in}$ | 10.0 |
| Outgoing cross-flow flow rate (LPM) | $Q_{c,\,out}$ | 10.0 |
| Low electrode voltage (V) | $V_{low}$ | 20.0 |
| High electrode voltage (V) | $V_{high}$ | 5000 |
| Up/down scan times (s) | $t_{ramp,\,u/d}$ | 50 |
| Holding time at $V_{low}$ (s) | $t_{low}$ | 6 |
| Holding time at $V_{high}$ (s) | $t_{high}$ | 6 |
| Time bin duration (s) | $t_c$ | 0.5 |

To detect nanometer particles to sizes below 3 nm in diameter, a two-stage CPC may be used as the particle counter [Iida, Stolzenburg, et al., 2009] The first-stage of the detector (that includes saturator 1712) uses diethylene glycol (DEG) as the working fluid to activate the sampled particles (i.e., in ROMIAC 1706). The activated sample particles are passed through a condenser 1716, where the particle size increases due to condensation of the DEG vapor on the activated particles. A CPC 1718 (e.g., a TSI 3760 CPC) is used as the second stage for further particle growth and the final particle detection.

Figure 18:
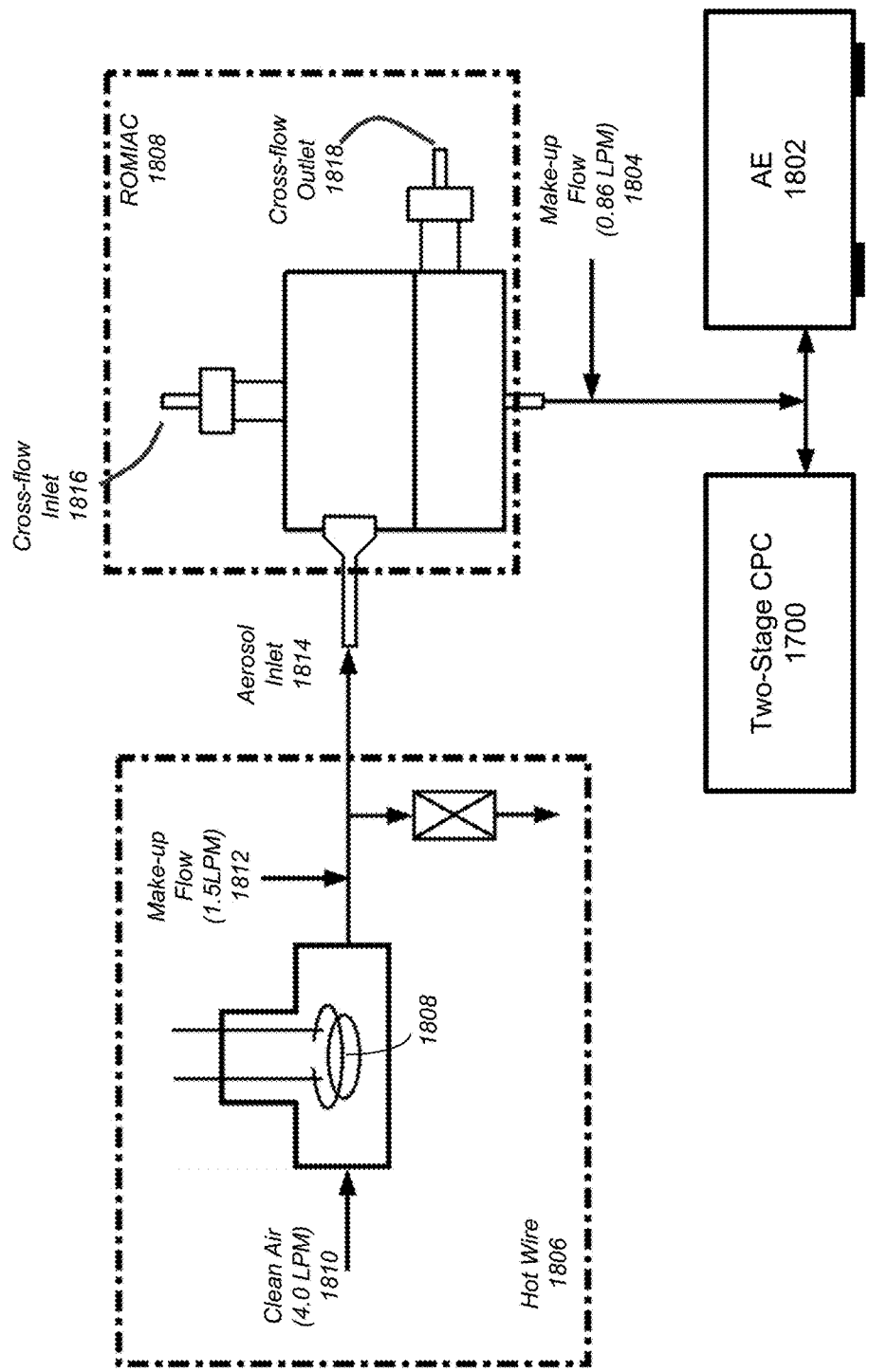
FIG. 18 illustrates an experimental set-up for CPC calibration in accordance with one or more embodiments of the invention.

FIG. 18 illustrates an experimental set-up for CPC calibration in accordance with one or more embodiments of the invention. In this regard, the detection efficiency of the two-stage CPC 1700 is calibrated with an aerosol electrometer 1802. The two-stage CPC 1700 and aerosol electrometer 1802 are each supplied with classified particles 1804 generated from the hot wire source 1806 and ROMIAC 1808. The hot wire source aerosol generator 1806 is powered by a DC power supply with voltage set at 7.5 V, and the current running through the Nichrome wire 1808 is around 5.2 A for this experiment. Clean air (4.0 LPM) 1810 is processed across the Nichrome wire 1808 to generate the make-up flow (1.5 LPM) 1812 which is then fed into the aerosol inlet 1814 of ROMIAC 1808.

Figure 19:
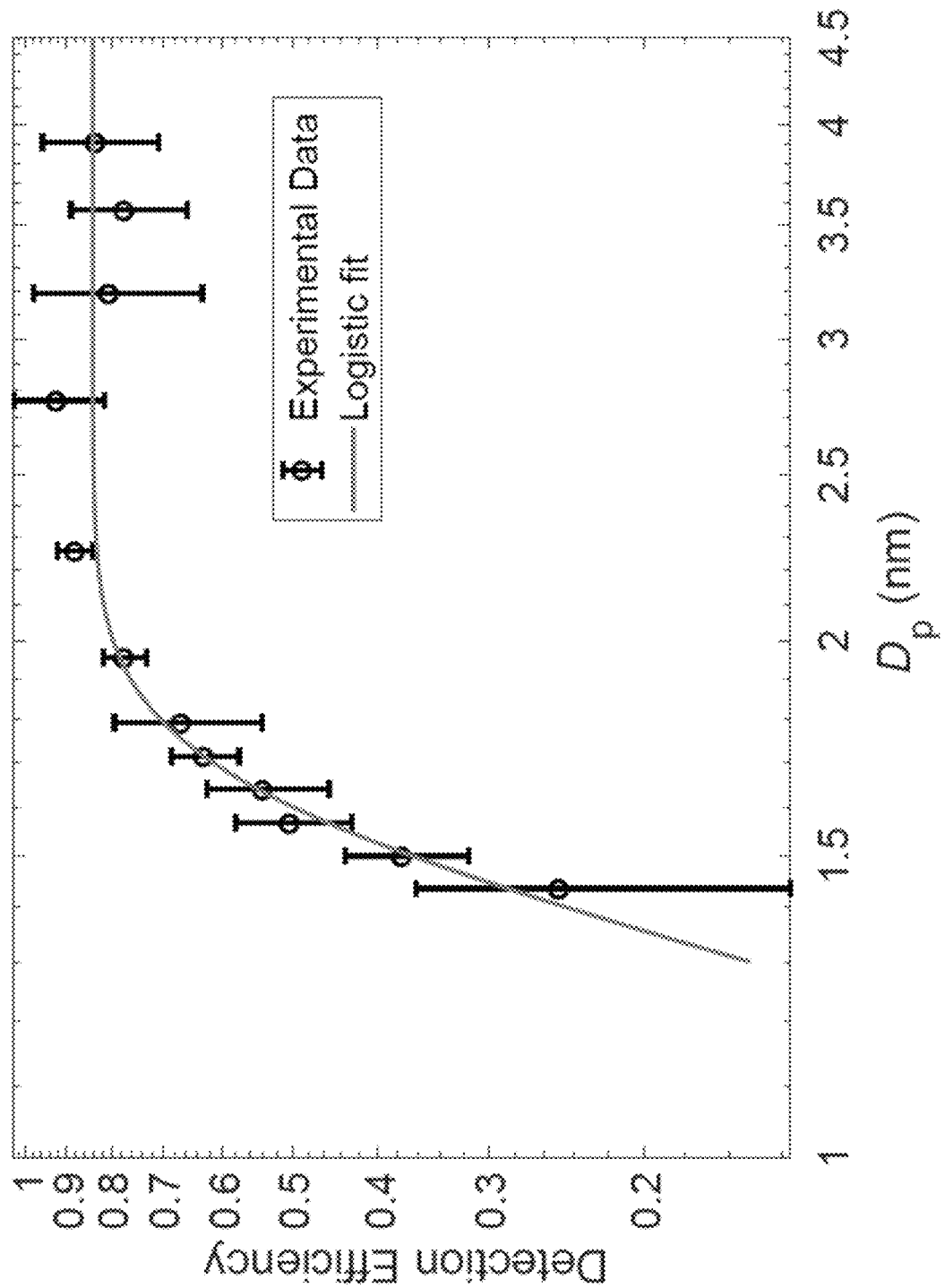
FIG. 19 illustrates the CPC counting efficiency relative to that of the aerosol electrometer in accordance with one or more embodiments of the invention.

The ROMIAC 1808 is operated with balanced (equal aerosol and classified sample) flow rates of $Q_a$=2.5 LPM; the cross-flow flow rate (via cross-flow inlet 1816 and cross-flow outlet 1818) is $Q_c$=35.5 LPM. The aerosol electrometer (AE) 1802 samples at 2.36 LPM, which is controlled by the critical orifice at its exhaust port. The two-stage CPC 1700 samples aerosol at 1.0 LPM; the saturator and condensor temperatures are 70° C. and 4° C., respectively. The CPC counting efficiency relative to that of the aerosol electrometer 1802 is shown in FIG. 19 for measurements of classified particles from the hot-wire source 1806. The 50% cut-off size is around 1.6 nm. The counting efficiency reaches a plateau for the electrical mobility equivalent particle sizes larger than 2.1 nm. The experimentally-measured, two-stage CPC counting efficiency has been fitted with logistic equation, i.e., $$\eta = \eta_{max} = \frac{\eta_{max}}{1 + e^{-k(D_p - D_{p,0})}} \quad \text{EQ. 7}$$

where $\eta_{max}=0.841$, $k=6.30$ nm$^{-1}$ and $D_{p,0}=1.54$ nm are the parameters determined by fitting.

Figure 20:
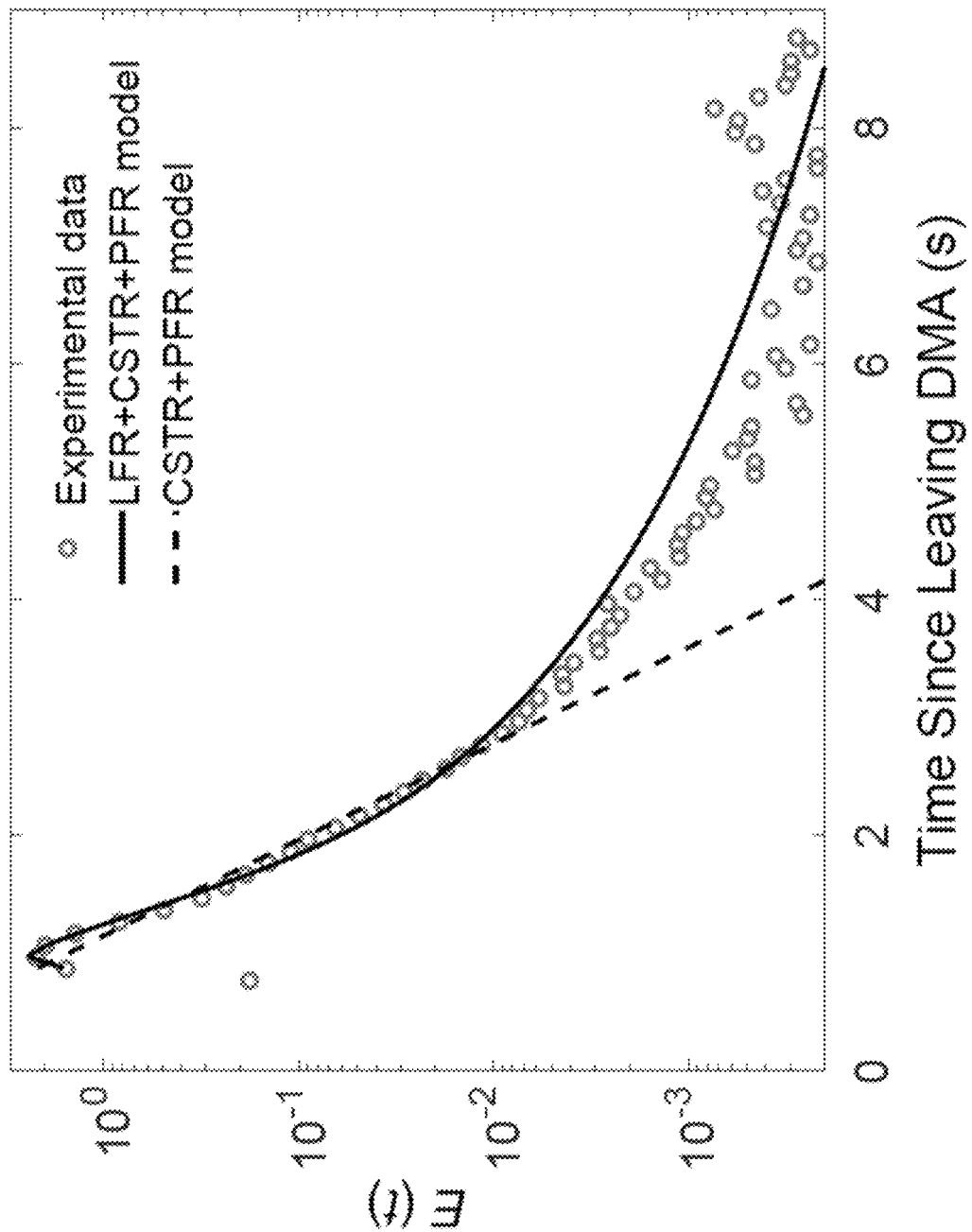
FIG. 20 illustrates experimentally measured residence time distribution, from a two-stage CPC in accordance with one or more embodiments of the invention.

The residence time distribution of the two-stage CPC is determined using the method of embodiments of the invention by measuring the particle counts following spark-pulse events. The experimentally measured residence time distribution, E(t), from the two-stage CPC is shown in FIG. 20; the mean residence time was found to be 1.183 s. As illustrated in FIG. 20, the CPC residence time distribution, E(t), has been fitted with two models. The first model describes the flow system as a plug flow reactor (PFR) in series with a continuous stirred-tank reactor (CSTR), with the residence time distribution function that is determined by the convolution of the time response functions of the two modules, i.e., $$E_{cp}(t) = E_p(t) * E_c(t) = \int_{-\infty}^{\infty} E_c(t')E_p(t-t')dt' = \begin{cases} 0, & t < \tau_p \\ \frac{1}{\tau_c}e^{-\frac{t-\tau_p}{\tau_c}}, & t \geq \tau_p \end{cases}, \quad \text{EQ. 8}$$

where $\tau_c$ and $\tau_p$ are the mean residence times of the CSTR and PFR, respectively. The optimized time scales determined using a weighted least-squares fit are $\tau_c=0.354$ s and $\tau_p=0.778$ s. The second model adds a laminar flow reactor (LFR) to the first model, with the following residence time distribution function:

$$E_{lcp}(t) = \quad \text{EQ. 9}$$

$$\begin{cases} 0, & t < \frac{n}{2} + \tau_p \\ \frac{\tau_1^2 \exp\left(-\frac{t-\tau_p}{\tau_c}\right)\left[Ei\left(\frac{t-\tau_p}{\tau_c}\right) - Ei\left(\frac{\tau_1}{2\tau_c}\right)\right]}{4\tau_c^3} + \\ \frac{4(t-\tau_p)^2\left(\tau_c + \frac{n}{2}\right)\exp\left(-\frac{t-\tau_p - \frac{\tau_1}{2}}{\tau_c}\right) - \tau_1^2(t+\tau_c-\tau_p)}{4\tau_c^2(t-\tau_p)^2}, & t \geq \frac{n}{2} + \tau_p \end{cases}$$

where $$Ei(x) = \int_{-\infty}^{x} \frac{e^u}{u} du$$

is the exponential integral, and $\tau_1$ is the residence time scale of the LFR. The fitted time scales of the LFR+CSTR+PFR model are $\tau_1=0.431$ s, $\tau_c=0.151$ s and $\tau_p=0.616$ s. The fitted residence-time-distribution models are compared with the observations in FIG. 20; model 2 captures the tail at a long time better than model 1.

Particle Size Distribution Inversion Kernel for the Scanning ROMIAC

The particle size distribution inversion for the scanning classifier is to retrieve the size distribution of the source particles n from the particle count sequence $r_{scan}=A_{scan}n$, where $A_{scan}$ is the inversion kernel for the scanning system. Embodiments of the invention may calculate the inversion kernel $A_{scan}$ by simulating the transfer function of the scanning aerosol classifier. Further, embodiments of the invention may calculate the inversion kernel $A_{scan}$ from the experimentally measured instrument response $r_{scan}$ and the source particle size distribution n. This method is applied to the scanning ROMIAC system described herein.

Figure 21A:
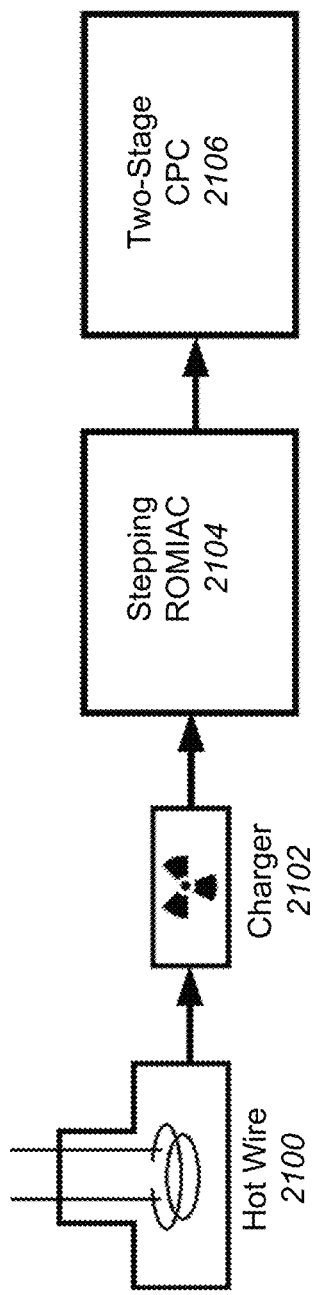
FIGS. 21A and 21B illustrate a stepping mode classifier and a scanning ROMIAC classifier that was used to measure the size distribution of the aerosol from the hot wire source in accordance with the prior art.
Figure 21B:
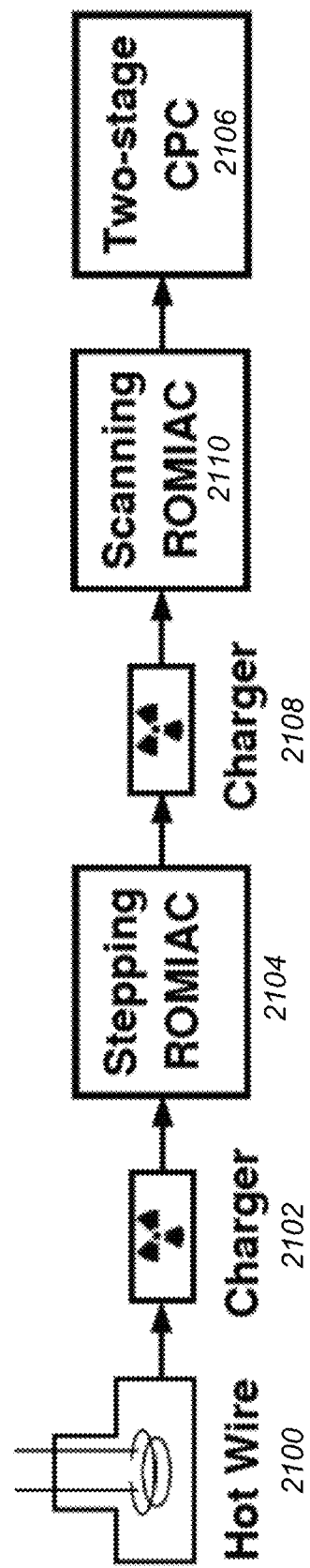

The experiment to measure the scanning ROMIAC instrument response $r_{scan}$ is completed in two steps. Referring to FIGS. 21A and 21B: (i) the stepping mode classifier (including the stepping ROMIAC 2104 and two-stage CPC 2106) was used to measure the size distribution of the aerosol from the hot wire source 2100 (and charger 2102 that charges the sample), as shown in FIG. 21A; (ii) the tandem ROMIAC system was used to measure the scanning ROMIAC 2110 instrument response $r_{scan}$ of the polydisperse aerosol with the size distribution n, as shown in FIG. 21B.

Particle Size Distribution Inversion for the Stepping ROMIAC

To measure the particle size distribution from the hot wire generator 2100, the ROMIAC is operated in stepping mode 2014, with an aerosol flow rate of $Q_a=1$ LPM, and a cross-flow flow rate of $Q_c=10$ LPM. The saturator and condenser temperatures for the DEG stage are 70° C. and 4° C., respectively. The hot wire 2100 particles generator for these experiments was operated under the same conditions as in the CPC detection efficiency measurements shown in FIG. 18.

The particle size distribution from the hot wire source 2100 is obtained with the ROMIAC operated in the stepping mode 2104, as shown in FIG. 21A. Assuming a steady-state size distribution from the hot wire source 2100 n(log $D_p$), the CPC 2106 counts recorded in a time bin with the classifier operated at constant voltage $V_i$ are $$R_{step,i} = Q_a t_c \quad \text{EQ. 10}$$

$$\int_{-\infty}^{\infty} n(\log D_p) \sum_\phi \Omega_{OMAC}(Z_p(D_p), \phi), Z_p^*(V_i), \beta, \delta) p_{charge}(D_p, \phi) \times$$

$$\eta_F(D_p, \phi)\eta_{CPC}(D_p, \phi) d \log D_p,$$

$$i = 1, 2, \ldots, I,$$

where $\Omega_{OMAC}(Z_p(D_p), \phi), Zp^*(V_i), \beta, \delta)$ is the transfer function of the ROMIAC 2014 when operated at constant voltage, $V_i$, with the entrance and exit penetration efficiencies taken into account [Mui, Mai, et al., 2017]. $t_c$ is the counting time of a time bin. $p_{charge}(D_p, \phi)$, $\eta_F(D_p, \phi)$, and $\eta_{CPC}(D_p, \phi)$ are the charging probability, penetration efficiency in the plumbing system, and CPC detection efficiency, respectively. A linear spline approximation of the source particle size distribution is applied on discretization points $u^*j=\log Dp^*$, j, j=1, 2, . . . , J. The particle size distribution is $$n(u) = n(u_j^\dagger) + \frac{n(u_{j+1}^\dagger) - n(u_j^\dagger)}{u_{j+1}^\dagger - u_j^\dagger}(u - u_j^\dagger) = \quad \text{EQ. 11}$$

$$n(u_j^\dagger)\frac{u_{j+1}^\dagger - u}{u_{j+1}^\dagger - u_j^\dagger} + n(u_{j+1}^\dagger)\frac{u - u_j^\dagger}{u_{j+1}^\dagger - u_j^\dagger}.$$

Following the derivation of the scanning DMA data inversion, the instrument response in the stepping ROMIAC 2104 can be obtained with the same method. The integral in Eq. 10 is approximated by summation over a finer grid $u_k$, k=1, 2, ..., K than that for the size distribution representation, and becomes $$R_{step,i} = \sum_{k=1}^{K} \Delta u_k g_i(u_k) n(u_k), \quad \text{EQ. 12}$$

where $$\Delta u_k = \begin{cases} \dfrac{u_2 - u_1}{2}, & k = 1 \\ \dfrac{u_{k+1} - u_{k-1}}{2}, & k = 2, 3, \ldots, K-1 \\ \dfrac{u_K - u_{K-1}}{2}, & k = K \end{cases} \quad \text{EQ. 13}$$

is the weighting factor arising from the trapezoidal integral. $g_i(u)$ denotes the kernel function for the stepping mode data inversion, which is defined as $$g_i(u) = \quad \text{EQ. 14}$$
$$Q_a t_c \sum_{\phi} \Omega_{OMAC}(u, u^*(V_i), \beta, \delta) p_{charge}(u, \phi) \eta_F(u, \phi) \eta_{CPC}(u, \phi).$$

The instrument response in the stepping mode becomes $$R_{step,i} = \sum_{k=1}^{K} \Delta u_k \left[ n(u_j^\dagger) \frac{u_{j+1}^\dagger - u_k}{u_{j+1}^\dagger - u_j^\dagger} + n(u_{j+1}^\dagger) \frac{u_k - u_j^\dagger}{u_{j+1}^\dagger - u_j^\dagger} \right] g_i(u_k), \quad \text{EQ. 15}$$

$$u_k \in [u_j^\dagger, u_{j+1}^\dagger).$$

Alternatively, the instrument response can be rewritten in a matrix form $$R_{step,i} = \sum_{j=1}^{J} A_{step,i,j} n(u_j^\dagger), \; i = 1, 2, \ldots, I \quad \text{EQ. 16}$$

where the kernel function $A_{i,j}$ is defined as $$A_{step,i,j} = \sum_{u_k \geq u_{j-1}^\dagger}^{u_k < u_j^\dagger} \Delta n_k \frac{u_k - u_{j-1}^\dagger}{u_j^\dagger - u_{j-1}^\dagger} g_i(u_k) + \sum_{u_k \geq u_j^\dagger}^{u_k < u_{j+1}^\dagger} \Delta u_k \frac{u_{j+1}^\dagger - u_k}{u_{j+1}^\dagger - u_j^\dagger} g_i(u_k). \quad \text{EQ. 17}$$

To solve the inversion problem $r_{step} = A_{step} n$ for the values of the size distribution parameters $n = [n(u_1^\dagger), n(u_2^\dagger), \ldots, n(u_j^\dagger)]^T$, with $r_{step} = [R_{step,1}, R_{step,2}, \ldots, R_{step,I}]^T$ as the array of the CPC data in the stepping mode measurement, a non-negative least squares algorithm [Merritt and Zhang, 2005] is used.

Instrument Response of Tandem ROMIAC and Scanning ROMIAC Data Inversion

In the tandem ROMIAC experiments (e.g., as illustrated in FIG. 21B), the size distribution of the particles downstream of the stepping-mode ROMIAC 2104 is $$n_{mc}(u) = n(u) \Omega_{OMAC}(u, u(V_i'), \beta, \delta) p_{charge}(u, \phi). \quad \text{EQ. 18}$$

where $V_i'$ is the voltage of the stepping mode ROMIAC. The subscript "mc" in $n_{mc}$ represents the mobility-classified particles that get transmitted through the stepping ROMIAC 2104. The downstream instrument response in the scanning mode is $r_{scan} = A_{scan} n_{mc}$, where $r_{scan} = [R_{scan,1}, R_{scan,2}, \ldots, R_{scan,I}]^T$ is the time series of the instrument response on the source particle distribution $n_{mc} = [n_{mc}(u_1^\dagger), n_{mc}(u_2^\dagger), \ldots, n_{mc}(u_j^\dagger)]^T$. While some embodiments of the invention calculate the kernel function of the scanning instrument $A_{scan}$ by simulating the scanning DMA transfer function and incorporating it with the CPC delay effect, other embodiments of the invention obtain the kernel function $A_{scan}$ given the instrument response $r_{scan}$ and the particle size distribution $n_{mc}$. To reduce the uncertainty of the calculated kernel function $A_{scan}$, it is desired to measure the instrument response $r_{scan}$ for various upstream particle size distribution $n_{mc}$. Assuming we have a number of L instrument responses that corresponds to L different upstream particle size distributions, the composite instrument matrix is $$R_{scan} = A_{scan} N_{mc}, \quad \text{(EQ. 19)}$$

where $R_{scan} = [r_{scan,1}, r_{scan,2}, \ldots, r_{scan,L}]$ is a I×L matrix (I instrument responses and L experiments). The $N_{mc} = [n_{mc,1}, n_{mc,2}, \ldots, n_{mc,L}]$ (J×L matrix) denotes the composite upstream particle size distributions for L experiments.

To retrieve the kernel matrix, $A_{scan}$, embodiments of the invention solve the inversion problem from the matrix-matrix multiplication relationship shown in Eq. 19. The non-negative least squares (NNLS) algorithm [Merritt and Zhang, 2005] that was introduced above aims to solve the inversion problem by matrix-vector multiplication. To utilize the NNLS inversion algorithm, Eq. 19 can be transformed into matrix-vector problems via the following decomposition, $$A_{scan} = \begin{bmatrix} A_{scan,1} \\ A_{scan,2} \\ \vdots \\ A_{scan,I} \end{bmatrix}, \; R_{scan} = \begin{bmatrix} R_{scan,1} \\ R_{scan,2} \\ \vdots \\ R_{scan,I} \end{bmatrix} \quad \text{EQ. 20}$$

where $A_{scan,i}$ is the ith row of matrix $A_{scan}$, and $R_{scan,i}$ is the ith row of matrix $R_{scan}$. With these decomposition, Eq. 19 becomes $$\begin{bmatrix} A_{scan,1} \\ A_{scan,2} \\ \vdots \\ A_{scan,I} \end{bmatrix} = \begin{bmatrix} R_{scan,1} N_{mc} \\ R_{scan,2} N_{mc} \\ \vdots \\ R_{scan,I} N_{mc} \end{bmatrix}. \quad \text{EQ. 21}$$

Thus, one can apply the NNLS algorithm for every inversion problem $A_{scan,i} = R_{scan,i} N_{mc}$ (or applying transpose for both sides to get the standard form of the inversion problem, $A_{scan,i}^T = N_{mc}^T R_{scan,I}^T$, i=1, 2, ..., I in EQ. 21

Results

Figure 22A:
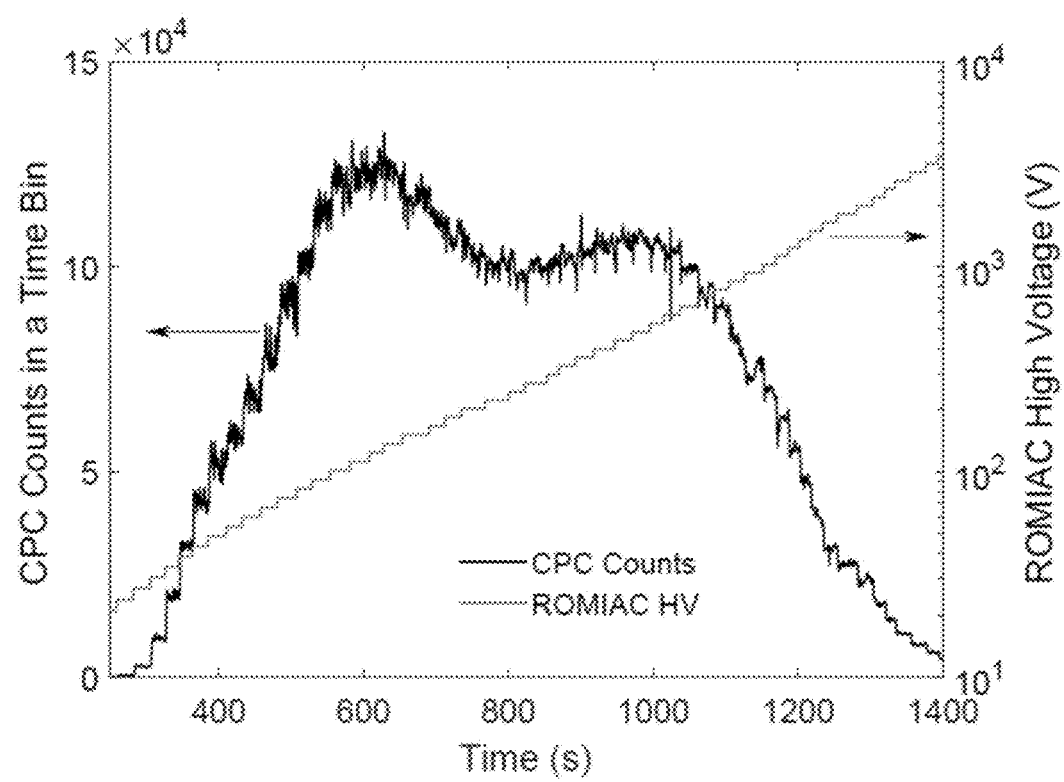
FIGS. 22A and 22B shows the CPC counts and the ROMIAC voltage as a function of time in the experiment in which the particle size distribution from the hot wire source generator was measured in accordance with the prior art.
Figure 22B:
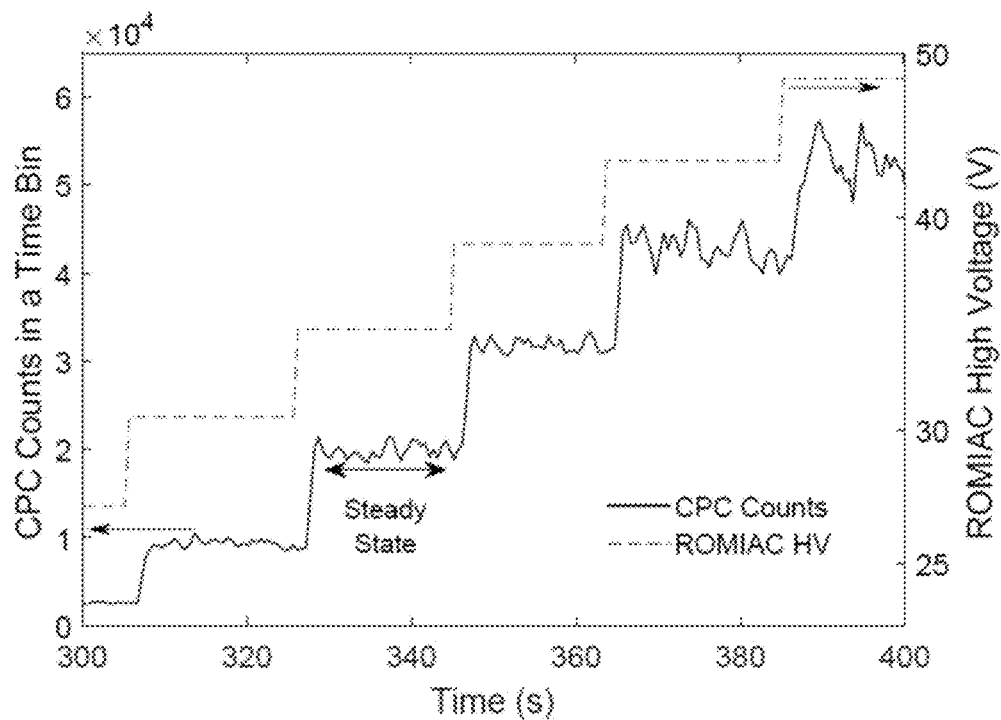
Figure 23A:
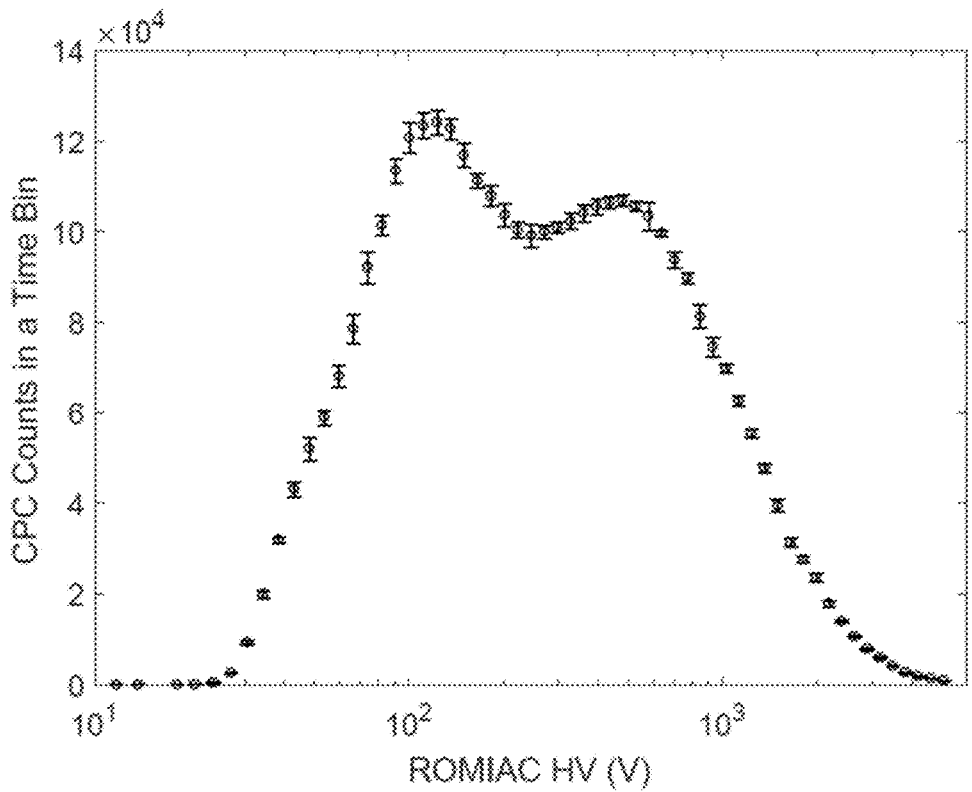
FIGS. 23A and 23B illustrate a plot of mean CPC counts in a time bin versus the ROMIAC voltage, and an inverted particle size distribution of the aerosol from the hot wire source generator in accordance with one or more embodiments of the invention.
Figure 23B:
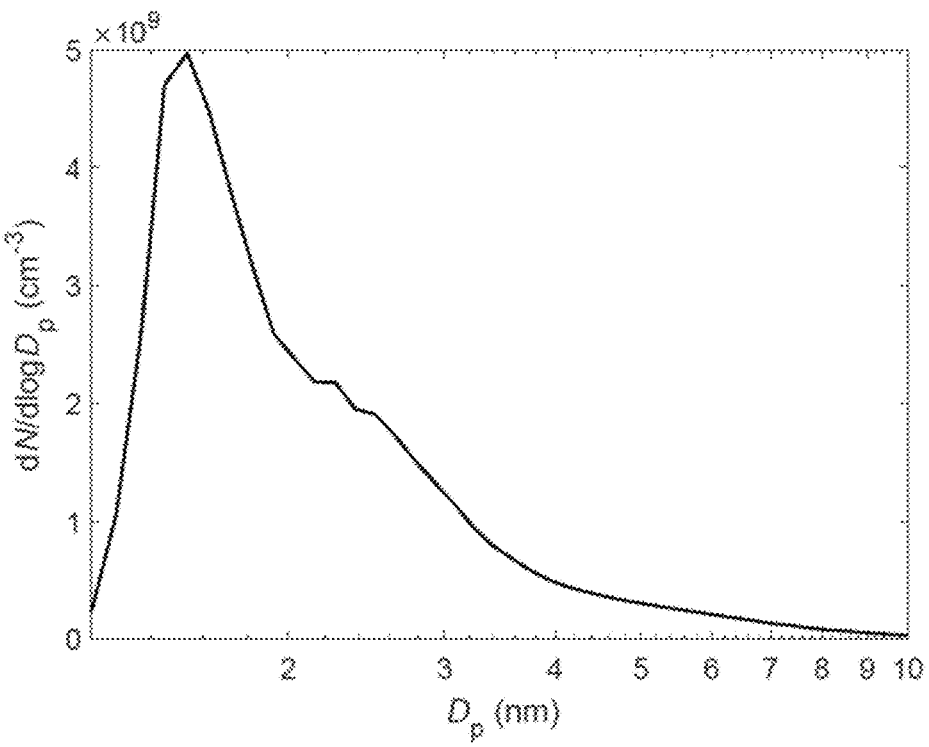

FIGS. 22A and 22B shows the CPC counts and the ROMIAC voltage as a function of time in the experiment in which the particle size distribution from the hot wire source generator was measured by stepping the voltage of the ROMIAC. The voltage of the ROMIAC was changed after 15 s of the steady-state CPC signal was acquired. To demonstrate the steady-state during the measurement, FIG. 22B shows the delay between the CPC counts and the ROMIAC voltage. Only the steady-state signal is extracted from the experimental data; it is averaged for each ROMIAC voltage. The mean CPC counts in a time bin are plotted versus the ROMIAC voltage (in this stepping mode measurement) in FIG. 23A; the error bar represents the standard error of the particle counts. Using the non-negative-least-squares algorithm [Merritt and Zhang, 2005], the inverted particle size distribution of the aerosol from the hot wire source generator is shown in FIG. 23B.

Figure 24:
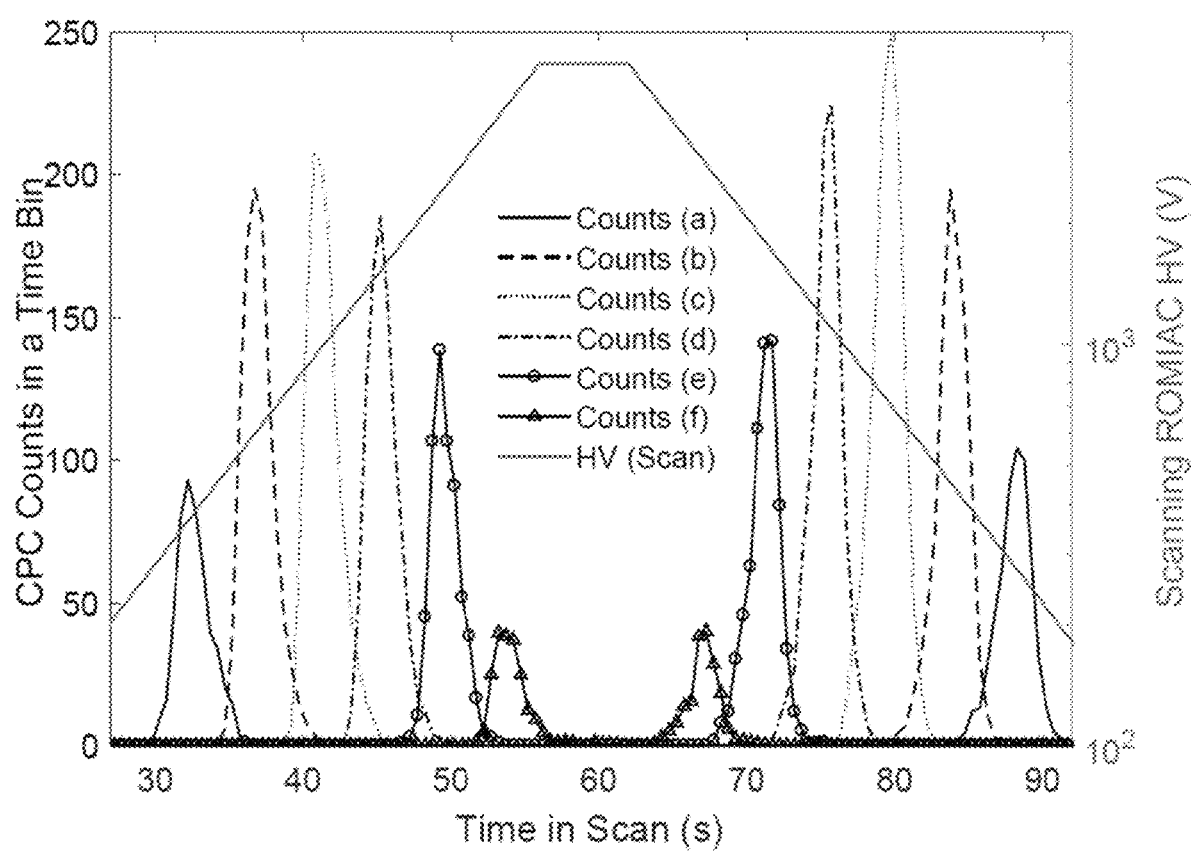
FIG. 24 illustrates an exemplary tandem ROMIAC instrument response in accordance with one or more embodiments of the invention.

The tandem ROMIAC instrument response is shown in FIG. 24, for the stepping mode ROMIAC set at voltages V=331, 529, 1349, 2154, and 3139 V. In the tandem ROMIAC experiment, flows in both classifiers were balanced, with an aerosol flow rate of $Q_a$=1 LPM and a cross-flow flow rate of $Q_c$=10 LPM.

Figure 25A:
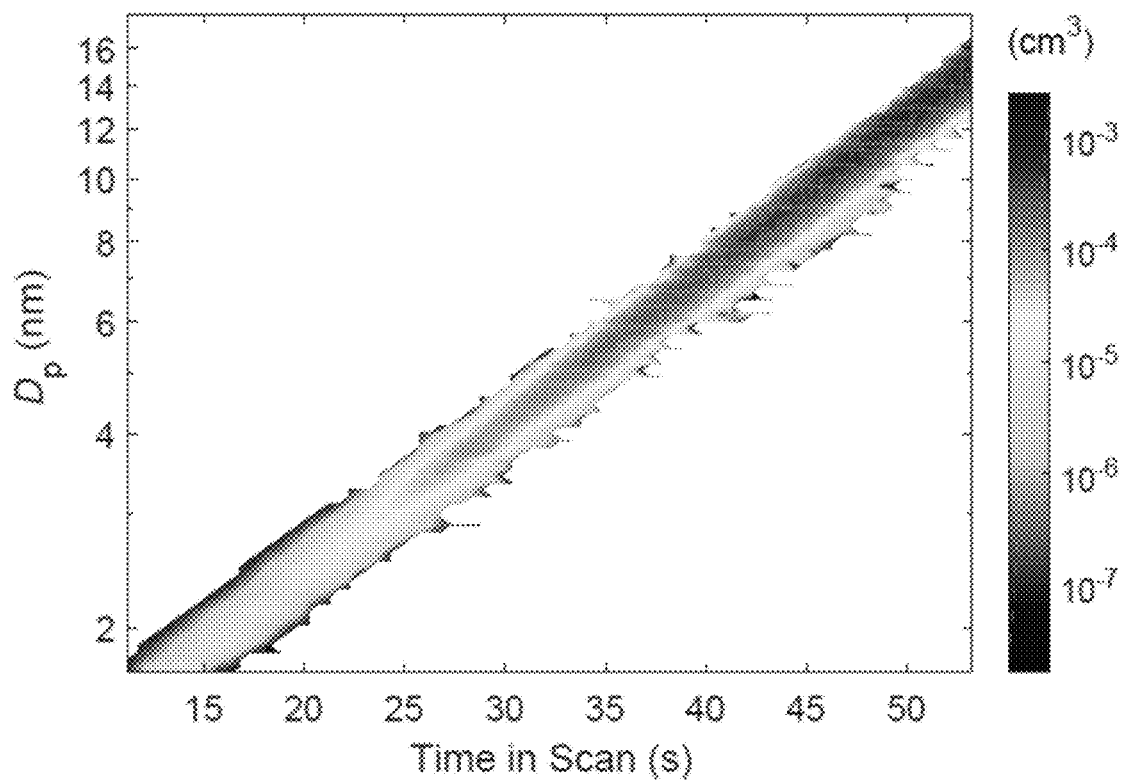
FIGS. 25A and 25B illustrate experimental instrument response measurements used to obtain inversion kernels in accordance with one or more embodiments of the invention.
Figure 25B:
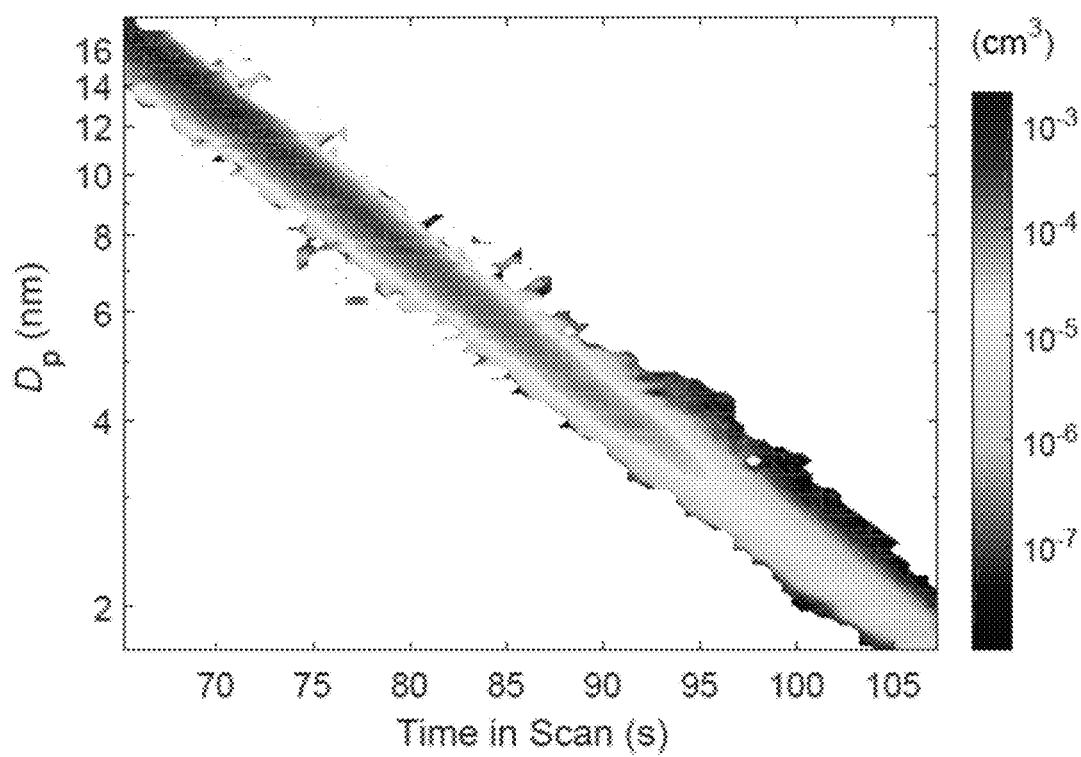
Figure 26A:
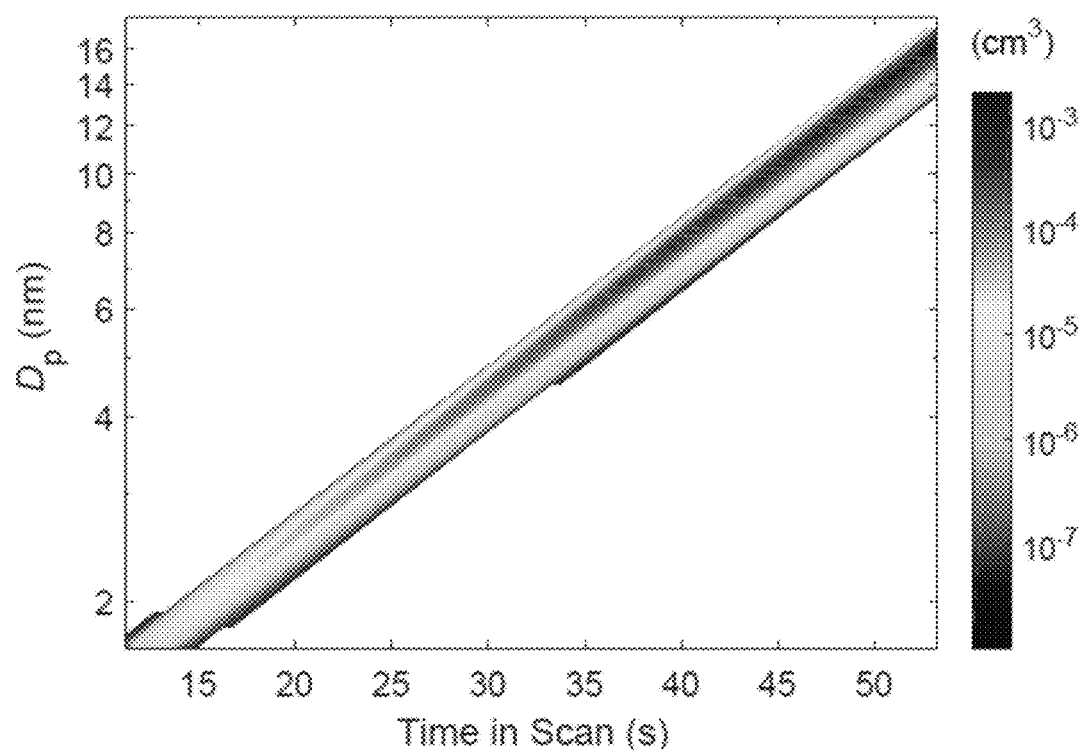
FIGS. 26A and 27B illustrated the inversion kernels obtained from finite-element simulated scanning ROMIAC transfer function in accordance with one or more embodiments of the invention.
Figure 26B:
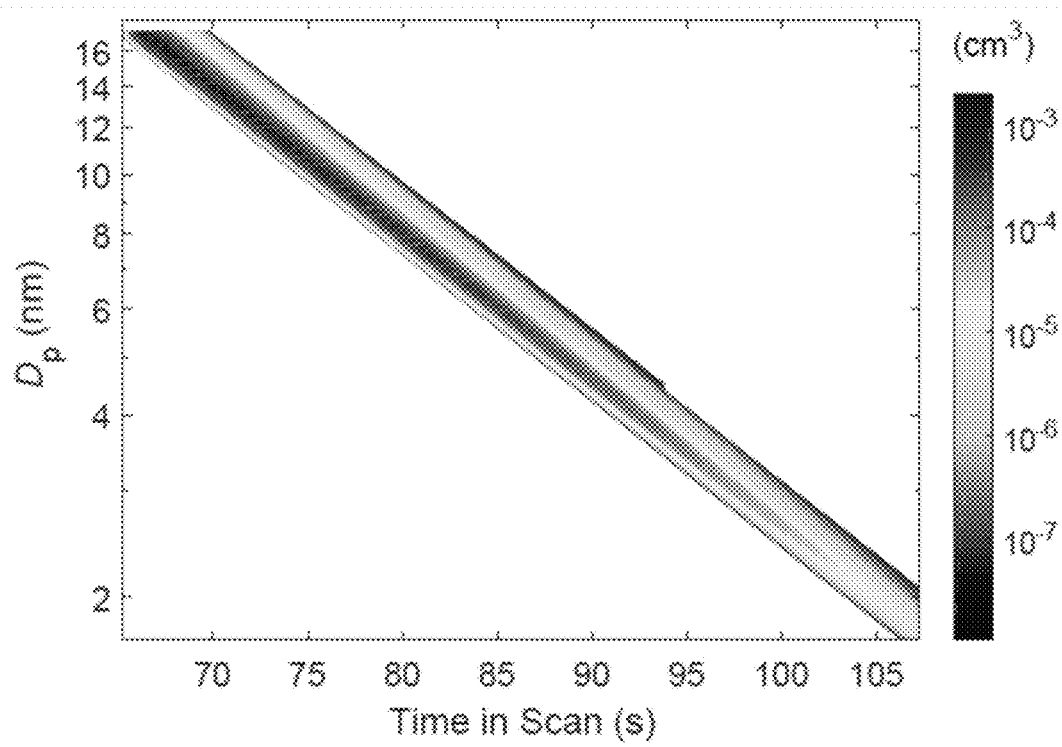

Inversion kernels were obtained from the experimental instrument response measurements, for both up- and down-scans, as shown in FIGS. 25A and 25B. Specifically, the contours of the inversion kernel based on the experimental instrument response are shown for up-scans in FIG. 25A and down-scans FIG. 25B. The inversion kernels obtained from finite-element simulated scanning ROMIAC transfer function are shown in FIGS. 26A and 26B for comparison (up scan in 26A and down scan in 26B). The experimental based inversion kernel is noisier than that based on the simulation owing to: (i) the intrinsic uncertainty in the experimental data, and (ii) the additional error that arises in deriving the kernel by inverting Eq. 21.

Figure 27A:
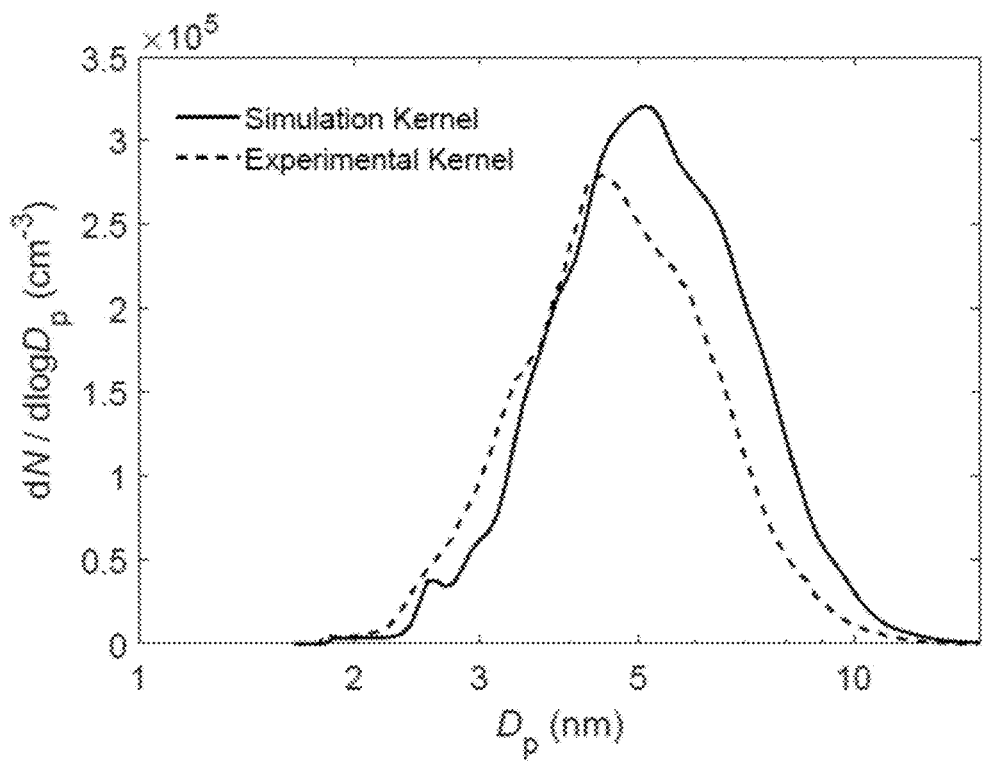
Figure 27B:
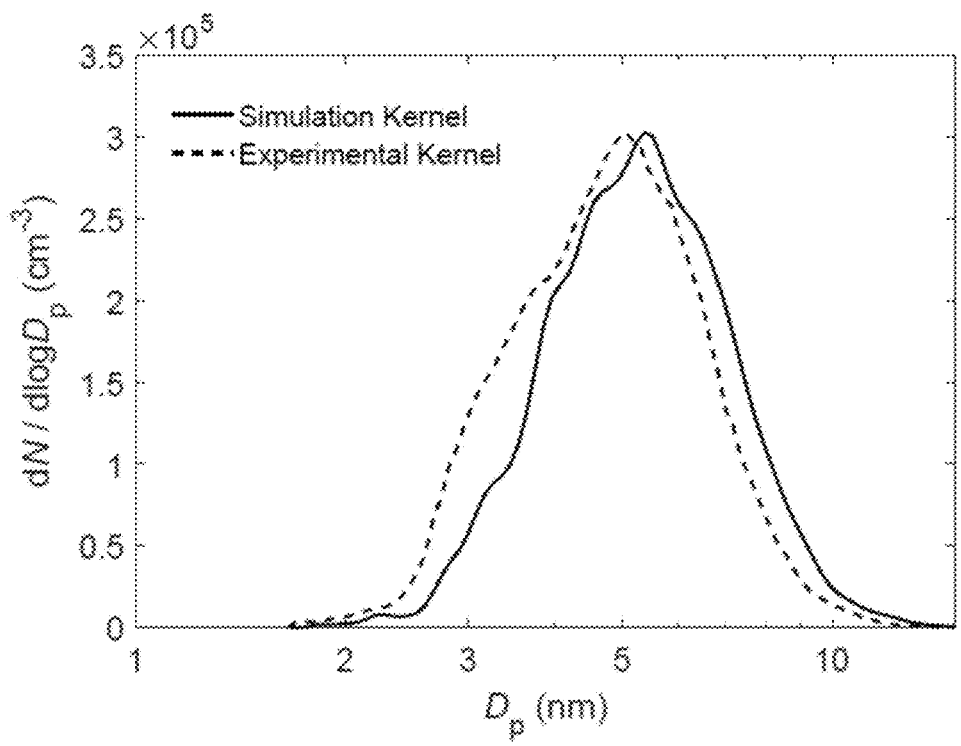
Figure 28A:
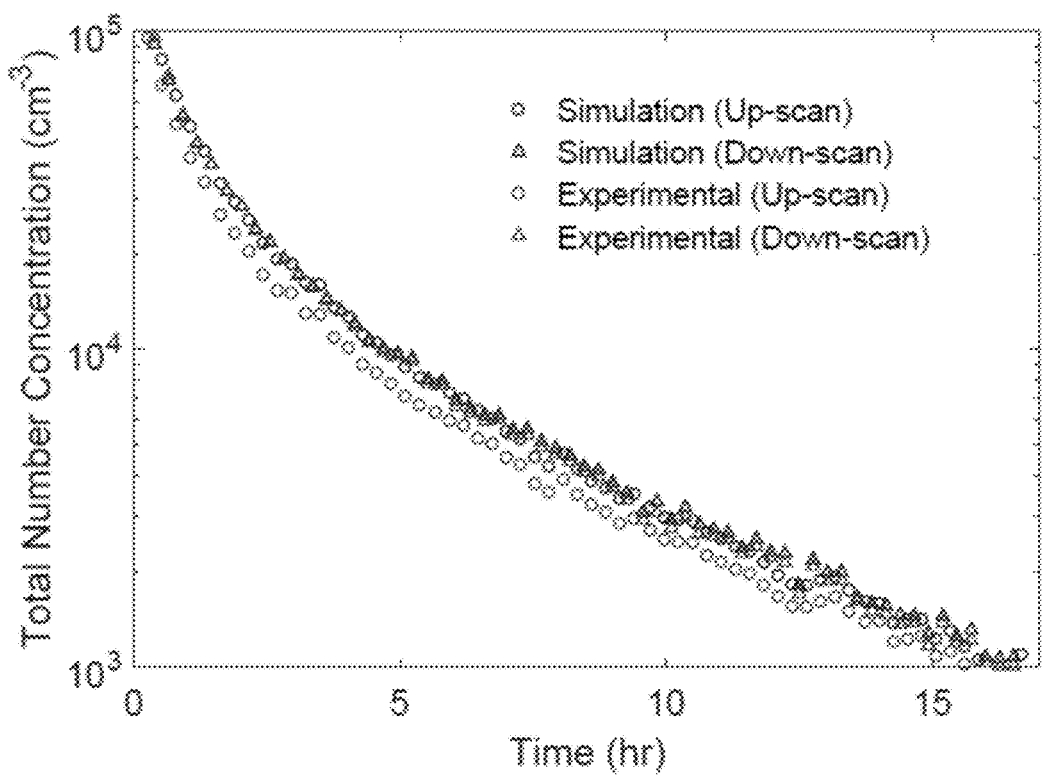
FIGS. 28A and 28B illustrate a total particle number concentration and the mean particle diameters in accordance with one or more embodiments of the invention.
Figure 28B:
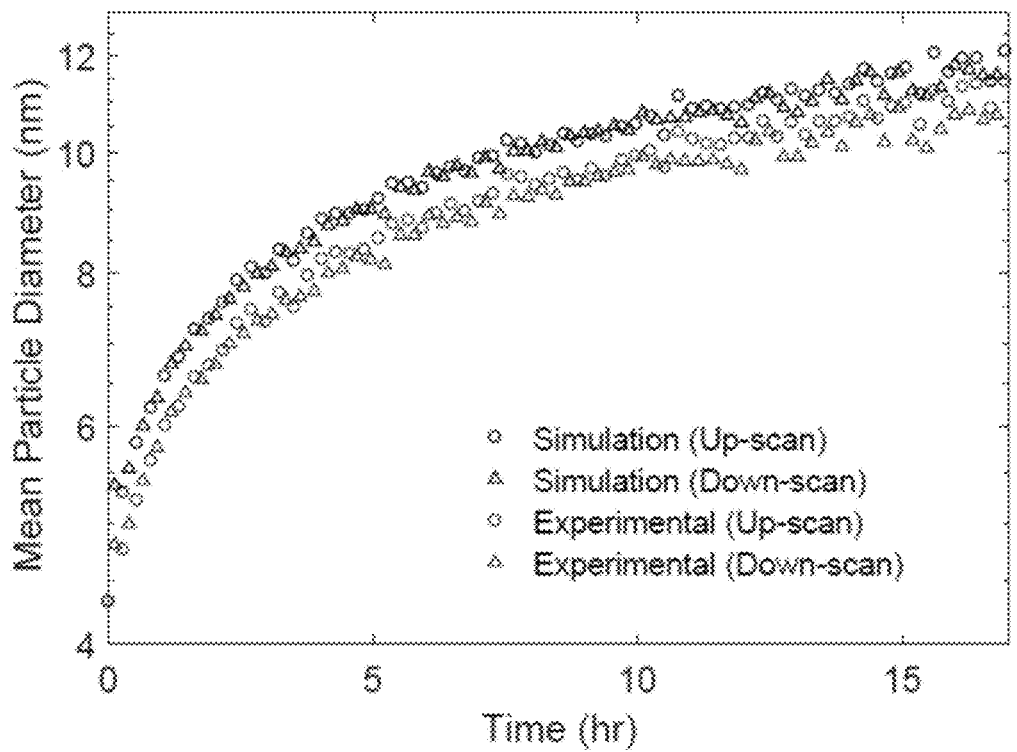

FIGS. 27A and 27B show the particle size distributions obtained from the same scanning ROMIAC data gathered in an experiment that measured the particle wall loss rate in the environmental chamber after inversion using these two different kernels (based on the simulated transfer function for up scans in FIG. 27A and down scans for FIG. 27B). The total particle number concentration and the mean particle diameters (i.e., the mean particle diameter biases between the experimental measured kernel inversion and the simulated kernel inversion) from this analysis are shown in FIGS. 28A and 28B respectively. The differences in the total particle number concentration and the mean particle using the experimentally generated inversion kernel are around 10%.

Discussion and Conclusion

The distortions of the scanning classifier transfer function, and the time delay effect associated with particle detection pose challenges for data inversion of scanning measurements. Embodiments of the invention may address these non-idealities using Brownian dynamics simulations of the exact scanning classifier transfer function, combined with experiment measurements of the residence-time-distribution of the particle counter. Instead of deriving the inversion kernel by using the computationally expensive Monte Carlo simulations, embodiments of the invention provide a method for determining the inversion kernel for scanning measurements via measurement of the instrument responses on mobility-classified particles from a polydisperse aerosol. Although embodiments of the invention may focus on particles in the nanometer domain, with particle diameters ranging from 1 to 20 nm, alternative embodiments of the invention can be applied to other size distribution measurement systems that probe other size ranges.

The particle size distribution obtained with this experimentally-measured kernel is compared with that derived using the kernels based on computational simulations. Uncertainties on the order of 10% were observed in both total particle number concentration estimates and the mean particle diameter. This error can be attributed to uncertainties in determining the inversion kernel from experimental measurements. First, the method in one or more embodiments may require a steady size distribution of the source particles. This assumption could be compromised given the time it takes to complete the whole experiment. Second, the inversion kernel may be derived by measuring the instrument response by counting particles into finite time bin, followed by least-squares data inversion. Additional embodiments may improve the accuracy of the methods described herein by measuring the size distribution of the source particles periodically during the experiment. The uncertainty can be also reduced by increasing the instrument measurement signal. For example, particle chargers can be removed in the experiment set-up, which increases the number of transmitted particles in the downstream instrument.

Opposed Migration Classifier

Figure 29:
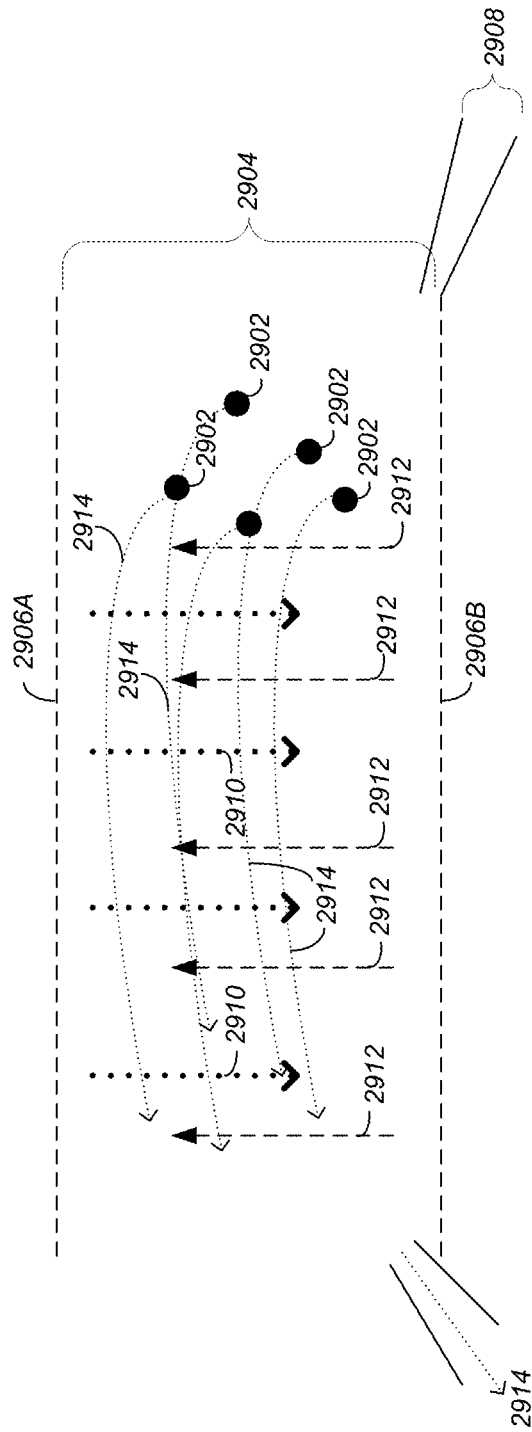
FIG. 29 illustrates a schematic overview of an opposed migration classifier utilized in accordance with one or more embodiments of the invention.

As described above, one or more embodiments of the invention provide an opposed migration classifier. FIG. 29 illustrates a schematic overview of an opposed migration classifier utilized in accordance with one or more embodiments of the invention. The shape of the classifier may be radial, defined using parallel plates or may be defined by a coaxial cylinder or other geometrical configuration.

As described above, one or more embodiments of the invention provide a sample inlet port 2908 and a sample outlet port 2914 that are asymmetrically located with respect to the center of the classification channel 2904 between the permeable electrodes 2906, specifically with both ports 2908 and 2914 located on the same side of the channel 2904 as the permeable electrode 2906B through which the cross-flow 2912 enters the classification region. Other embodiments of the invention may locate one or both of the ports 2906/2914 on the cross-flow outlet side of the classification channel.

A sample of one or more particles 2902 suspended in a sample fluid are passed through a classification channel 2904. The classification channel 2904 is defined by a first wall 2906A and a second wall 2906B (collectively referred to as permeable walls 2906) that are both permeable to a flow of fluid.

A flow distributor channel 2908 is used to introduce the sample into the classification channel 2904.

A cross flow fluid 2910 enters the classification channel 2904 through one of the permeable walls 2906 and flows at a first velocity and exists in a first direction through the other permeable wall 2906. The cross-flow fluid rate may be uniform.

An imposed field 2912 is applied that causes the particles 2902 to migrate in a direction opposite to that of the cross-flow fluid 2910, at a velocity that at times during the scan is not equal to that of the cross-flow fluid 2910, such that the particles are carried 2914 along the channel 2904 between the permeable walls 2906. The particles 2902 in the sample are classified in the channel 2904 based on their mobility. The mobility is a migration velocity per unit of applied force. The imposed field 2912 is created by a time varying field imposed in a direction moral to the permeable walls 2906. The time-varying field may be an electric field created by a scanning voltage on one of the permeable walls.

In one or more embodiments, the first velocity of the cross-flow fluid may vary with time. In such embodiments (i.e., when the cross-flow fluid velocity varies with time), the imposed field may be gravity.

Further, the sample fluid enters through or within a first (defined/predefined) threshold distance of one of the permeable walls 2906, travels through the channel 2904, and the classified particles 2902 exit 2914 through or within a second (defined/predefined) threshold distance of the same permeable wall 2906. In this regard, the threshold distance at the entrance 2908 and exit 2914 may the same or different threshold distances. Within such a scope, the sample fluid may enter/exit through the permeable wall 2906 itself or near the wall (i.e., within a threshold distance of the wall).

Logical Flow

Figure 30:
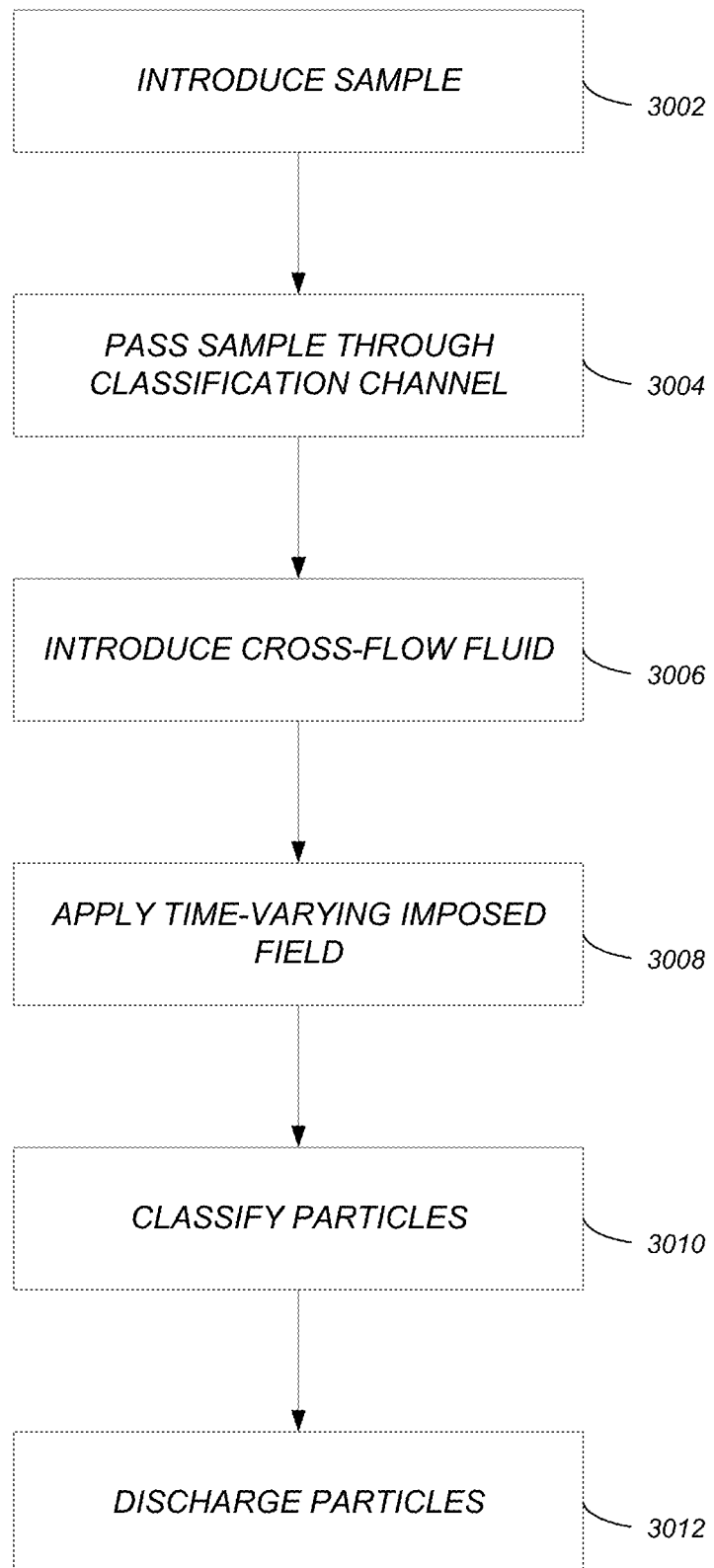
FIG. 30 illustrates the logical flow for separating particles in accordance with one or more embodiments of the invention.

FIG. 30 illustrates the logical flow for separating particles in accordance with one or more embodiments of the invention.

At step 3002, a sample is introduced from a flow distributor channel into a classification channel. The sample consists of one or more particles suspended within a sample fluid.

At step 3004, the sample is passed through the classification channel. The classification channel is defined by a first wall and a second wall that are both permeable to a flow of fluid.

At step 3006, a cross-flow fluid is introduced to the classification channel through one of the permeable walls, and flows at a first velocity and exists in a first direction through the other permeable wall.

At step 3008, an imposed field is applied to the particles. The imposed field causes the particles to migrate in a direction opposite to that of the cross-flow fluid, at a second velocity that at times during a scan is not equal to the first velocity of the cross-flow fluid, such that the particles are carried along the channel between the permeable walls. The imposed field may be created by a time varying field imposed in a second direction normal to the permeable walls. Alternatively, in one or more embodiments, the cross-flow fluid velocity varies with time and the imposed field is gravity.

At step 3010, the particles are classified in the channel based on their mobility. The mobility is defined/consists of a migration velocity per unit of applied force. Further, the sample fluid enters that or within a first threshold distance of one of the permeable walls, travels through the channel, and the classified particles exit through or within a second threshold distance of the same permeable wall.

At step 3012, the particles that travel through the classification channel are discharged.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Cleveland, William S (1979)] "Robust locally weighted regression and smoothing scatterplots". In: *Journal of the American Statistical Association* 74.368, pp. 829-836;

[Flagan, Richard C. (1999)]. "On differential mobility analyzer resolution". In: *Aerosol Sci Tech* 30.6, pp. 556-570.

[Flagan, Richard C. (2004)]. "Opposed Migration Aerosol Classifier (OMAC)". In: *Aerosol Science and Technology* 38.9, pp. 890-899. doi: 10.1080/027868290505242. eprint: https://doi.org/10.1080/027868290505242.

[Iida, Kenjiro, Mark R Stolzenburg, and Peter H McMurry. 2009. "Effect of Working Fluid on Sub-2 Nm Particle Detection with a Laminar Flow Ultrafine Condensation Particle Counter." *Aerosol Science and Technology* 43 (1): 81-96. doi:10.1080/02786820802488194.]

[Mai, Huajun and Richard C. Flagan (In Review)]. "Scanning DMA Data Analysis I. Classification Transfer Function". In: *Aerosol Science and Technology*.

[Mai, Huajun, Weimeng Kong, John H. Seinfeld, and Richard C. Flagan (In Review)]. "Scanning DMA data analysis. II. Integrated DMA-CPC instrument response and data inversion". In: *Aerosol Science and Technology*.

[Mui, Wilton, Huajun Mai, et al. (2017)]. "Design, simulation, and characterization of a radial opposed migration ion and aerosol classifier (ROMIAC)". In: *Aerosol Science and Technology* 51.7, pp. 801-823.

[Mui, Wilton, Daniel A. Thomas, et al. (2013)]. "Ion Mobility-Mass Spectrometry with a Radial Opposed Migration Ion and Aerosol Classifier (ROMIAC)". In: *Analytical Chemistry* 85.13. PMID: 23730869, pp. 6319-6326. doi: 10.1021/ac400580u. eprint: https://doi.org/10.1021/ac400580u.url: https://doi.org/10.1021/ac400580u.

[Wang, Shih Chen and Richard C. Flagan (1990)]. "Scanning Electrical Mobility Spectrometer". In: *Aerosol Science and Technology* 13.2, pp. 230-240.

[Merritt, M. and Y. Zhang (2005)]. "Interior-Point Gradient Method for Large-Scale Totally Non-negative Least Squares Problems". In: *Journal of Optimization Theory and Applications* 126.1, pp. 191-202.

What is claimed is:

1. An opposed migration classifier comprising:
   (a) a classification channel through which passes a sample comprising one or more particles suspended within a sample fluid, the classification channel comprising a first wall and a second wall that are both permeable to a flow of fluid;
   (b) a sample flow distribution input channel and sample flow distribution output channel that are located asymmetrically with respect to a center of the classification channel wherein a voltage applied to a channel wall varies during a transit of the one or more particles in the sample fluid such that trajectories of the one or more particles deviate from constant voltage operation trajectories;
   (c) a cross-flow fluid that enters the classification channel through one of the permeable walls, wherein the cross-flow fluid flows at a first velocity and exits in a first direction through the other permeable wall;
   (d) an imposed field that is applied causes one or more particles to migrate in a direction opposite to that of the cross-flow fluid, at a second velocity that at times during the scan is not equal to the first velocity of the cross-flow fluid, such that the one or more particles are carried along the classification channel between the permeable walls, wherein:
      (i) the particles in the sample are classified in the classification channel based on their mobility;
      (ii) the mobility comprises a migration velocity per unit of applied force;
      (iii) the imposed field is created by a time varying field imposed in a second direction normal to the permeable walls; and
      (iv) the sample fluid enters through or within a first threshold distance of one of the permeable walls, travels through the classification channel, and the classified particles exit through or within a second threshold distance of the same permeable wall.

2. The opposed migration classifier of claim 1, wherein the cross-flow fluid rate is uniform.

3. The opposed migration classifier of claim 1, wherein the time varying field is an electric field created by a scanning voltage on one of the permeable walls.

4. The opposed migration classifier of claim 1, wherein a shape of the opposed migration classifier is radial.

5. The opposed migration classifier of claim 1, wherein a shape of the opposed migration classifier is defined using parallel plates.

6. The opposed migration classifier of claim 1, wherein a shape of the opposed migration classifier is defined by a coaxial cylinder.

7. An opposed migration classifier comprising:
(a) a classification channel through which passes a sample comprising one or more particles suspended within a sample fluid, the classification channel comprising a first wall and a second wall that are both permeable to a flow of fluid;
(b) a sample flow distribution input channel and sample flow distribution output channel that are located asymmetrically with respect to a center of the classification channel wherein a voltage applied to a channel wall varies during a transit of the one or more particles in the sample fluid such that trajectories of the one or more particles deviate from constant voltage operation trajectories;
(c) a cross-flow fluid that enters the classification channel through one of the permeable walls, wherein the cross-flow fluid flows at a first velocity and exits in a first direction through the other permeable wall, wherein the first velocity varies with time;
(d) an imposed field that is applied causes one or more particles to migrate in a direction opposite to that of the cross-flow fluid, at a second velocity that at times during the scan is not equal to the first velocity of the cross-flow fluid, such that the one or more particles are carried along the classification channel between the permeable walls, wherein:
  (i) the particles in the sample are classified in the classification channel based on their mobility;
  (ii) the mobility comprises a migration velocity per unit of applied force; and
  (iii) the sample fluid enters through or within a threshold distance of one of the permeable walls, travels through the classification channel, and the classified particles exit through or within the threshold distance of the same permeable wall.

8. The opposed migration classifier of claim 7, wherein the imposed field is gravity.

9. The opposed migration classifier of claim 7, wherein a shape of the opposed migration classifier is radial.

10. The opposed migration classifier of claim 7, wherein a shape of the opposed migration classifier is defined using parallel plates.

11. The opposed migration classifier of claim 7, wherein a shape of the opposed migration classifier is defined by a coaxial cylinder.

12. A method for separating particles comprising:
(a) introducing a sample, comprising one or more particles suspended within a sample fluid, from a sample flow distribution input channel into a classification channel, wherein the sample flows through the classification channel and exits via the sample flow distribution output channel, and wherein the sample flow distribution input channel and sample flow distribution output channel are located asymmetrically with respect to a center of the classification channel wherein a voltage applied to a channel wall varies during a transit of the one or more particles in the sample fluid such that trajectories of the one or more particles deviate from constant voltage operation trajectories;
(b) passing the sample through the classification channel, wherein the classification channel comprises a first wall and a second wall that are both permeable to a flow of fluid;
(c) introducing a cross-flow fluid to the classification channel through one of the permeable walls, wherein the cross-flow fluid flows at a first velocity and exits in a first direction through the other permeable wall;
(d) applying an imposed field on the one or more particles, wherein the imposed field causes the one or more particles to migrate in a direction opposite to that of the cross-flow fluid, at a second velocity that at times during a scan is not equal to the first velocity of the cross-flow fluid, such that the one or more particles are carried along the classification channel between the permeable walls, wherein:
  (i) the particles in the sample are classified in the classification channel based on their mobility;
  (ii) the mobility comprises a migration velocity per unit of applied force;
  (iii) the imposed field is created by a time varying field imposed in a second direction normal to the permeable walls; and
  (iv) the sample fluid enters through or within a first threshold distance of one of the permeable walls, travels through the classification channel, and the classified particles exit through or within a second threshold distance of the same permeable wall; and
(e) discharging the particles that travel through the classification channel.

13. The method of claim 12, wherein the cross-flow fluid rate is uniform.

14. The method of claim 12, wherein the time varying field is an electric field created by a scanning voltage on one of the permeable walls.

15. The method of claim 12, wherein a shape of a system performing the method is radial.

16. The method of claim 12, wherein a shape of a system performing the method is defined using parallel plates.

17. The method of claim 12, wherein a shape of a system performing the method is defined by a coaxial cylinder.

* * * * *